(12) United States Patent
Okunishi et al.

(10) Patent No.: US 11,992,982 B2
(45) Date of Patent: May 28, 2024

(54) METHOD FOR MANUFACTURING RESIN MOLDED PRODUCT

(71) Applicant: TOWA Corporation, Kyoto (JP)

(72) Inventors: Yoshito Okunishi, Kyoto (JP);
Fuyuhiko Ogawa, Kyoto (JP);
Hideyuki Sakai, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 181 days.

(21) Appl. No.: 17/602,285

(22) PCT Filed: Feb. 27, 2020

(86) PCT No.: PCT/JP2020/008028
§ 371 (c)(1),
(2) Date: Oct. 8, 2021

(87) PCT Pub. No.: WO2020/217702
PCT Pub. Date: Oct. 29, 2020

(65) Prior Publication Data
US 2022/0161475 A1     May 26, 2022

(30) Foreign Application Priority Data

Apr. 25, 2019 (JP) ................................ 2019-084786

(51) Int. Cl.
*B29C 45/02* (2006.01)
*B29C 33/12* (2006.01)
(Continued)

(52) U.S. Cl.
CPC .............. *B29C 45/02* (2013.01); *B29C 33/12* (2013.01); *B29C 45/021* (2013.01);
(Continued)

(58) Field of Classification Search
None
See application file for complete search history.

(56) References Cited

U.S. PATENT DOCUMENTS

| | | | |
|---|---|---|---|
| 7,829,004 B2 * | 11/2010 | Ho ........................ | B29C 45/561 |
| | | | 425/116 |
| 8,727,757 B2 * | 5/2014 | Maekawa ............... | H01L 24/97 |
| | | | 425/89 |
| 2022/0161469 A1* | 5/2022 | Okunishi .............. | B29C 45/376 |

FOREIGN PATENT DOCUMENTS

| | | |
|---|---|---|
| CN | 201659668 | 12/2010 |
| CN | 104210067 | 12/2014 |

(Continued)

OTHER PUBLICATIONS

"Office Action of China Counterpart Application", dated Oct. 14, 2022, with English translation thereof, p. 1-p. 13.

(Continued)

*Primary Examiner* — Benjamin A Schiffman
(74) *Attorney, Agent, or Firm* — JCIPRNET

(57) ABSTRACT

Provided is a resin molding apparatus that can suppress a molding problem caused by a variation in a thickness of an object to be molded or suppress a variation in a thickness of a resin molded part, and can perform a mold releasing operation. A resin molding apparatus includes: a molding mold having one mold and the other mold; one mold wedge mechanism; and one mold cavity block driving mechanism. In a state that a height position of one mold cavity block is set using the one mold cavity block driving mechanism and a position in a direction away from the other mold in the one mold cavity block having been moved to the height position is fixed to be limited using the one mold wedge mechanism, a mold releasing operation can be performed using the one mold wedge mechanism and the one mold cavity block driving mechanism.

8 Claims, 56 Drawing Sheets

(51) Int. Cl.
   *B29C 45/14* (2006.01)
   *B29C 45/36* (2006.01)
   *B29C 45/40* (2006.01)
   *B29C 45/56* (2006.01)
   *B29C 45/64* (2006.01)
   *B29C 45/80* (2006.01)
   *B29C 45/37* (2006.01)
   *B29C 45/66* (2006.01)

(52) U.S. Cl.
   CPC ........ *B29C 45/14065* (2013.01); *B29C 45/36* (2013.01); *B29C 45/4005* (2013.01); *B29C 45/56* (2013.01); *B29C 45/64* (2013.01); *B29C 45/80* (2013.01); *B29C 45/14639* (2013.01); *B29C 2045/14663* (2013.01); *B29C 45/376* (2013.01); *B29C 2045/569* (2013.01); *B29C 2045/664* (2013.01)

(56) References Cited

FOREIGN PATENT DOCUMENTS

| | | |
|---|---|---|
| CN | 105283289 | 1/2016 |
| CN | 107170694 | 9/2017 |
| CN | 109093895 | 12/2018 |
| JP | 85667210 | 6/1981 |
| JP | H01201927 | 8/1989 |
| JP | 2006319226 | 11/2006 |
| JP | 2013028087 | 2/2013 |
| JP | 2017056739 | 3/2017 |
| JP | 2017162888 | 9/2017 |
| KR | 20110074019 | 6/2011 |
| KR | 20150089205 | 8/2015 |

OTHER PUBLICATIONS

"International Search Report (Form PCT/ISA/210) of PCT/JP2020/008028", dated May 19, 2020, with English translation thereof, pp. 1-4.

"Written Opinion of the International Searching Authority (Form PCT/ISA/237) of PCT/JP2020/008028," dated May 19, 2020, with English translation thereof, pp. 1-6.

"Office Action of Korea Counterpart Application" with English translation thereof, dated Aug. 5, 2022, p. 1-p. 13.

* cited by examiner

METHOD FOR MANUFACTURING RESIN MOLDED PRODUCT

CROSS-REFERENCE TO RELATED APPLICATION

This application is a 371 application of the international PCT application serial no. PCT/JP2020/008028, filed on Feb. 27, 2020, which claims the priority benefits of Japan application no. 2019-084786, filed on Apr. 25, 2019. The entirety of each of the above-mentioned patent applications is hereby incorporated by reference herein and made a part of this specification.

BACKGROUND OF THE INVENTION

Field of the Invention

The present invention relates to a resin molding apparatus and a method for manufacturing a resin molded product.

DESCRIPTION OF THE RELATED ART

A resin molding apparatus having a molding mold is used for manufacturing a resin molded product.

For example, Patent literature 1 describes a technique in which before a mold resin is injected into a cavity, an upper mold driving portion 7 of a cavity height variable mechanism moves a first movable taper block 25 forward and backward to push and move an upper mold insert member (a cavity piece 23) in a mold opening/closing direction, a lower mold driving portion 8 of a plate thickness variable mechanism moves a second movable taper block 39 forward and backward to push and move a lower mold insert member (a work support portion 37) in the mold opening/closing direction, and thereby the cavity height variable mechanism is set according to a height of a semiconductor chip 5 and the plate thickness variable mechanism is set according to a thickness of a substrate 1 to form a molded article ([0032], [0033], [0045], [0049], and FIG. 2(A) in Patent literature 1).

LITERATURE OF RELATED ART

Patent Literature

Patent literature 1: Japanese Patent Laid-Open No. 2017-56739

BRIEF SUMMARY OF THE INVENTION

However, the technique described in Patent literature 1 has the following problems. For example, in the configuration shown in FIG. 2, the cavity piece 23 forming a bottom of the cavity is suspended and supported by an upper chase block 22 via a spring 24. Therefore, the cavity piece 23 cannot be fixed, and it is difficult to adjust an appropriate height of a cavity recess 32 according to a variation in a thickness of the object to be molded. In addition, because the cavity piece 23 cannot be fixed, a thickness of a resin molded part may vary. Furthermore, because Patent literature 1 does not describe the details of a mold releasing operation, the specific mold releasing operation is unknown. For example, in Patent literature 1, when there is a variation in the thickness of the object to be molded, a normal mold releasing operation may not be performed.

Thus, an objective of the present invention is to provide a resin molding apparatus and a method for manufacturing a resin molded product, which can suppress a molding problem caused by a variation in a thickness of an object to be molded or suppress a variation in a thickness of a resin molded part and can perform a mold releasing operation.

In order to achieve the objective, a resin molding apparatus of the present invention includes:
a molding mold;
one mold wedge mechanism; and
one mold cavity block driving mechanism;
wherein the molding mold includes: one mold, and the other mold;
the one mold includes: one mold cavity frame member, and one mold cavity block;
the one mold cavity block is movable in the one mold cavity frame member in a mold opening/closing direction of the molding mold;
one mold cavity is formed by a surface of the one mold cavity block facing the other mold and an inner surface of the one mold cavity frame member;
the one mold cavity block is moved in the mold opening/closing direction using the one mold cavity block driving mechanism;
a position of the one mold cavity block in the mold opening/closing direction is fixed using the one mold wedge mechanism; and
in a state that a height position of the one mold cavity block is set using the one mold cavity block driving mechanism and a position in a direction away from the other mold in the one mold cavity block having been moved to the height position is fixed to be limited using the one mold wedge mechanism, a mold releasing operation is enabled using the one mold wedge mechanism and the one mold cavity block driving mechanism.

A method for manufacturing a resin molded product of the present invention uses the resin molding apparatus of the present invention and includes:
a resin molding process in which a resin molding is performed using the molding mold; and
a mold releasing process in which a molded resin is released from the molding mold after the resin molding process;
wherein the mold releasing process is a process in which in a state that a height position of the one mold cavity block is set using the one mold cavity block driving mechanism and a position in a direction away from the other mold in the one mold cavity block having been moved to the height position is fixed to be limited using the one mold wedge mechanism, a mold releasing operation is performed using the one mold wedge mechanism and the one mold cavity block driving mechanism.

According to the present invention, a resin molding apparatus and a method for manufacturing a resin molded product, which can suppress a molding problem caused by a variation in a thickness of an object to be molded or suppress a variation in a thickness of a resin molded part and can perform a mold releasing operation, can be provided.

BRIEF DESCRIPTION OF THE SEVERAL VIEWS OF THE DRAWING(S)

DETAILED DESCRIPTION OF THE INVENTION

Figure 1:
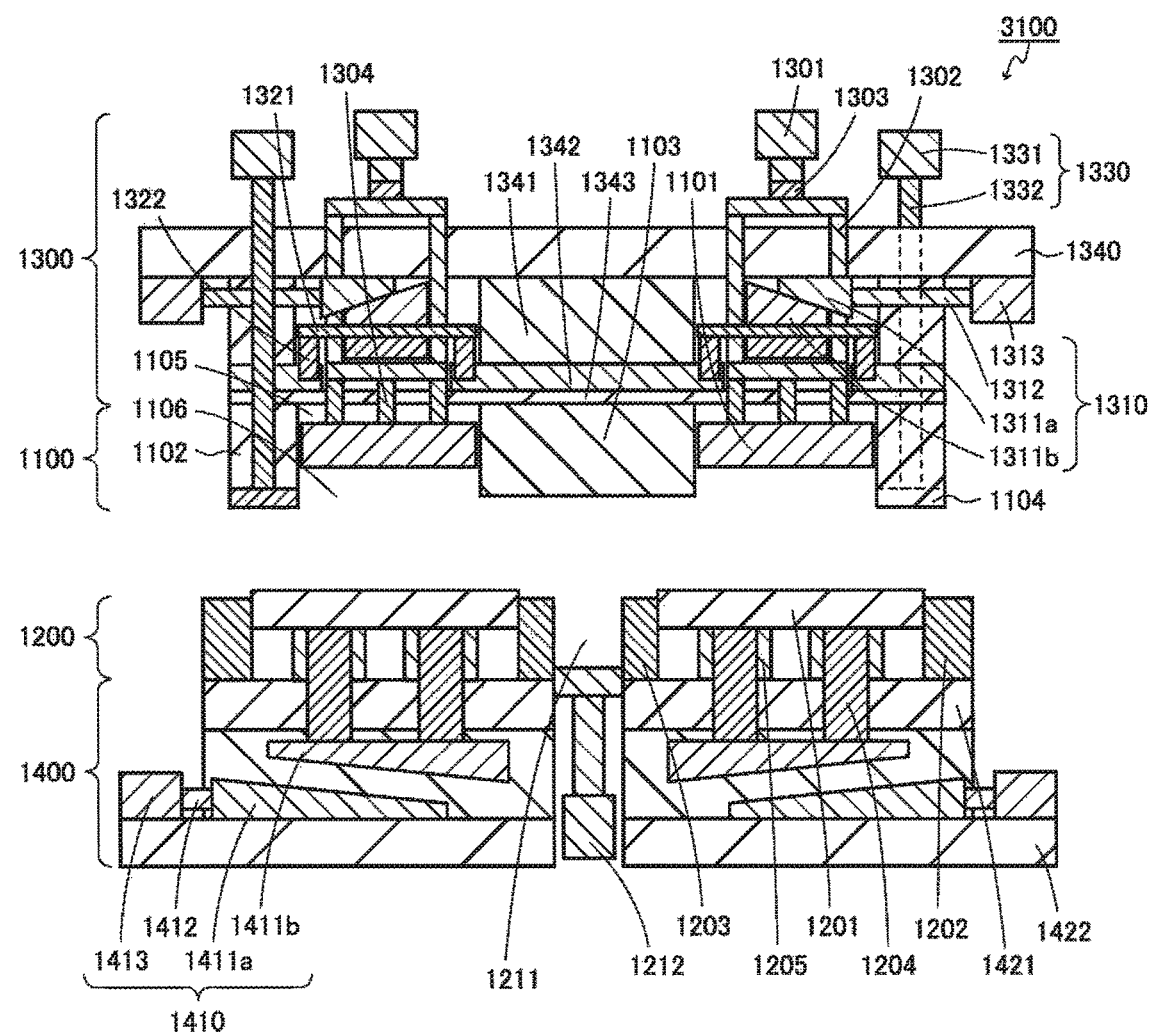
FIG. 1 is a cross-sectional view schematically showing an example of a resin molding apparatus of the present invention.

Next, the present invention is described in more detail with reference to examples. However, the present invention is not limited by the following description.

For example, in the resin molding apparatus of the present invention, a height position of the one mold cavity block may be set in a state that a part of an object to be molded is clamped by the one mold cavity frame member and the other mold.

For example, the resin molding apparatus of the present invention may further have a plunger, and has a pot that can accommodate a resin, and in the mold releasing operation, after the plunger is separated from an unnecessary resin portion in the pot, the plunger may be moved to a position where the plunger can support the unnecessary resin portion in the pot.

For example, the resin molding apparatus of the present invention may further include a mold clamping mechanism;
   resin molding may be performed in a state that the one mold and the other mold are clamped by the mold clamping mechanism; and
   after the plunger is moved to the position where the plunger can support the unnecessary resin portion in the pot, the other mold may be moved in a mold opening direction of the molding mold using the mold clamping mechanism, and thereby the one mold cavity block may be moved in a mold clamping direction of the molding mold.

For example, in the resin molding apparatus of the present invention, after the other mold is moved in the mold opening direction of the molding mold using the mold clamping mechanism, the one mold cavity block may be moved in the mold clamping direction of the molding mold using the one mold cavity block driving mechanism.

For example, in the resin molding apparatus of the present invention, after the one mold cavity block is moved in the mold clamping direction of the molding mold using the one mold cavity block driving mechanism, the one mold wedge mechanism may be operated to make the one mold cavity block movable in the mold opening direction of the molding mold.

For example, in the resin molding apparatus of the present invention, after the one mold wedge mechanism is operated to make the one mold cavity block movable in the mold opening direction of the molding mold, the one mold cavity block may be moved in the mold opening direction of the molding mold using the one mold cavity block driving mechanism.

For example, in the resin molding apparatus of the present invention, after the one mold cavity block is moved in the mold opening direction of the molding mold using the one mold cavity block driving mechanism, the other mold may be moved in the mold opening direction of the molding mold to be in a mold-opened state by the mold clamping mechanism.

For example, a resin molding apparatus of the present invention may include:
   a molding mold;
   one mold wedge mechanism; and
   one mold cavity block driving mechanism;
   the molding mold may include one mold and the other mold;
   the one mold may include one mold cavity frame member and one mold cavity block;
   the one mold cavity block may move in the one mold cavity frame member in a mold opening/closing direction of the molding mold;
   one mold cavity may be formed by a surface of the one mold cavity block facing the other mold and an inner surface of the one mold cavity frame member;
   the one mold cavity block may be moved in the mold opening/closing direction using the one mold cavity block driving mechanism;
   a position of the one mold cavity block in the mold opening/closing direction may be fixed using the one mold wedge mechanism; and
   a part of an object to be molded may be clamped by the one mold cavity frame member and the other mold, and in a state that a height position of the one mold cavity block is set using the one mold cavity block driving mechanism and a position in a direction away from the other mold in the one mold cavity block in which the height position has been set is fixed to be limited using the one mold wedge mechanism, a resin may be injected into the one mold cavity, and thereafter the one mold wedge mechanism and the one mold cavity block driving mechanism may be used to change a depth of the one mold cavity to perform resin molding.

For example, the resin molding apparatus of the present invention may further have a plunger, and has a pot that can accommodate a resin, and in a state that the one mold wedge mechanism is fixed, the resin in the pot may be injected into the one mold cavity by pushing the plunger into the pot.

For example, in the resin molding apparatus of the present invention, in order to make the one mold wedge mechanism operable, the plunger may be pulled out in a direction opposite to the inside of the pot, and the one mold cavity block may be made movable in a direction away from the other mold.

For example, in the resin molding apparatus of the present invention, after the height position of the one mold cavity block is set, by pushing the plunger into the pot and injecting the resin in the pot into the one mold cavity, the one mold cavity block may be moved in a direction away from the other mold, and the depth of the one mold cavity may be increased.

For example, in the resin molding apparatus of the present invention, after the height position of the one mold cavity block is set, the one mold cavity block may be moved in a direction approaching the other mold, and the depth of the one mold cavity may be reduced.

For example, the resin molding apparatus of the present invention may further include a mold clamping mechanism, and resin molding may be performed in a state that the one mold and the other mold are clamped by the mold clamping mechanism.

For example, in the resin molding apparatus of the present invention, resin molding may be performed in a state that a cavity surface of the one mold cavity is covered with a mold releasing film and the resin is filled in the one mold cavity via the mold releasing film.

For example, the resin molding apparatus of the present invention may further include a mold releasing film adsorption mechanism.

For example, in the resin molding apparatus of the present invention,
the one mold wedge mechanism may include a pair of one mold wedge members;
the pair of one mold wedge members may include one mold first wedge member and one mold second wedge member;
the one mold first wedge member and the one mold second wedge member may have a tapered surface respectively, and be arranged in a manner that the tapered surfaces face each other; and
by moving at least one of the one mold first wedge member and the one mold second wedge member, a length of the pair of one mold wedge members in the mold opening/closing direction when the one mold first wedge member and the one mold second wedge member come into contact with each other may be changed. Moreover, the direction in which at least one of the wedge members is moved may be, for example, a front end direction or a rear end direction of the wedge of the wedge member to be moved.

For example, in the resin molding apparatus of the present invention,
the resin molding apparatus may further include the other mold wedge mechanism;
the other mold may include the other mold cavity block; and
a position of the other mold cavity block in the mold opening/closing direction may be fixed using the other mold wedge mechanism.

For example, in the resin molding apparatus of the present invention,
the other mold wedge mechanism may include a pair of the other mold wedge members;
the pair of the other mold wedge members may include the other mold first wedge member and the other mold second wedge member;
the other mold first wedge member and the other mold second wedge member may have a tapered surface respectively, and be arranged in a manner that the tapered surfaces face each other; and
by moving at least one of the other mold first wedge member and the other mold second wedge member, a length of the pair of the other mold wedge members in the mold opening/closing direction when the other mold first wedge member and the other mold second wedge member come into contact with each other may be changed. Moreover, the direction in which at least one of the wedge members is moved may be, for example, a front end direction or a rear end direction of the wedge of the wedge member to be moved.

For example, in the resin molding apparatus of the present invention, by changing the length of the pair of one mold wedge members in the mold opening/closing direction when the one mold first wedge member and the one mold second wedge member come into contact with each other, the position of the one mold cavity block in the mold opening/closing direction may be changed.

For example, in the resin molding apparatus of the present invention, by moving at least one of the one mold and the other mold in the mold clamping direction of the molding mold, the object to be molded may be sandwiched between the one mold and the other mold, by moving the one mold cavity block toward the object to be molded using the one mold cavity block driving mechanism, the object to be molded may be pressed by the one mold cavity block via the mold releasing film, and thereafter, the position of the one mold cavity block in the mold opening/closing direction may be fixed using the one mold wedge mechanism.

For example, in the resin molding apparatus of the present invention, after the position of the one mold cavity block is fixed, at least one of the one mold and the other mold may be moved in the mold opening direction of the molding mold, and thereafter, the position of the one mold cavity block may be changed and fixed using the one mold cavity block driving mechanism and the one mold wedge mechanism.

For example, in the resin molding apparatus of the present invention, the one mold may be an upper mold and the other mold may be a lower mold. In addition, for example, on the contrary, in the resin molding apparatus of the present invention, the one mold may be a lower mold and the other mold may be an upper mold.

For example, the resin molding apparatus of the present invention may be a device for transfer molding. In addition, the resin molding apparatus of the present invention is not limited thereto, and may be, for example, a device for compression molding or the like.

For example, a method for manufacturing a resin molded product of the present invention may use the resin molding apparatus of the present invention, and include:
a clamping process for an object to be molded of clamping a part of the object to be molded by the one mold cavity frame member and the other mold;
a height position setting process of setting a height position of the one mold cavity block using the one mold cavity block driving mechanism in a state that a part of the object to be molded is clamped;
a fixing process of the one mold cavity block in which a position in a direction away from the other mold in the one mold cavity block in which the height position has been set is limited to be fixed using the one mold wedge mechanism;

a resin injection process of injecting the resin into the one mold cavity; and a resin molding process of performing resin molding by changing the depth of the one mold cavity using the one mold wedge mechanism and the one mold cavity block driving mechanism after the resin injection process.

For example, the method for manufacturing a resin molded product of the present invention may further include one mold surface covering process of covering a mold surface of the one mold with a mold releasing film.

For example, the method for manufacturing a resin molded product of the present invention may further include: a pressing process for an object to be molded of pressing the object to be resin-molded by the one mold cavity block via a mold releasing film.

For example, the method for manufacturing a resin molded product of the present invention may further include the other mold cavity block position change process of changing the position of the other mold cavity block in the mold opening/closing direction.

For example, in the method for manufacturing a resin molded product of the present invention, the resin molding apparatus is the resin molding apparatus of the present invention, and the resin molding apparatus of the present invention may further include the other mold wedge mechanism.

For example, the method for manufacturing a resin molded product of the present invention may further include:
 a clamping process for an object to be molded in which the object to be molded is sandwiched and fixed by the one mold and the other mold by moving at least one of the one mold and the other mold in the mold clamping direction of the molding mold;
 a pressing process for an object to be molded of pressing the object to be molded by the one mold cavity block via a mold releasing film; and
 a fixing process of the one mold cavity block of fixing the position of the one mold cavity block;
 wherein in the one mold cavity block position change process, the one mold cavity block is moved toward the object to be molded using the one mold cavity block driving mechanism;
 in the pressing process for the object to be molded, the object to be molded is pressed by the one mold cavity block via the mold releasing film using the one mold cavity block driving mechanism; and
 after the object pressing process for the object to be molded, in the fixing process of the one mold cavity block, the position of the one mold cavity block in the mold opening/closing direction may be fixed using the one mold wedge mechanism.

For example, the method for manufacturing a resin molded product of the present invention may include: one mold cavity block second position change process in which after the fixing process of the one mold cavity block, at least one of the one mold and the other mold is moved in the mold opening direction of the molding mold, and thereafter, the position of the one mold cavity block is changed using the one mold cavity block driving mechanism; and one mold cavity block second fixing process of fixing the position of the one mold cavity block using the one mold wedge mechanism.

For example, in the method for manufacturing a resin molded product of the present invention, the object to be molded may be resin-molded by transfer molding in the resin molding process. In addition, the method for manufacturing a resin molded product of the present invention is not limited thereto, and for example, the object to be molded may be molded by compression molding or the like in the resin molding process.

For example, in the method for manufacturing a resin molded product of the present invention, the object to be molded may include a plurality of substrates and may be resin-molded by sealing the substrates with a resin.

Moreover, in the present invention, the "molding mold" is, for example, a metallic mold, but is not limited thereto, and may be, for example, a ceramic mold or the like.

In the present invention, the resin molded product is not particularly limited, and may be, for example, a resin molded product obtained by simply molding a resin, or a resin molded product in which a component such as a chip or the like is resin-sealed. In the present invention, the resin molded product may be, for example, an electronic component or the like.

In the present invention, a resin material before molding and a resin after molding are not particularly limited, and may be, for example, a thermosetting resin such as an epoxy resin, a silicone resin, or the like, or may be a thermoplastic resin. In addition, the resin material before molding and the resin after molding may be a composite material partially containing a thermosetting resin or a thermoplastic resin. In the present invention, examples of the form of the resin material before molding include a granular resin, a liquid resin, a sheet resin, a tablet resin, a powder resin, and the like. Moreover, in the present invention, the liquid resin may be liquid at room temperature, or may be a molten resin which is melted to be liquid by heating.

In addition, generally, the "electronic component" may refer to a chip before being resin-sealed or a state that the chip is resin-sealed. However, in the present invention, unless otherwise specified, the simple term "electronic component" refers to an electronic component in which the chip is resin-sealed (an electronic component as a finished product). In the present invention, "chip" refers to a chip before being resin-sealed, and specific examples thereof include chips such as an IC, a semiconductor chip, a semiconductor element for power control, and the like. In the present invention, the chip before being resin-sealed is referred to as "chip" for convenience in order to be distinguished from the electronic component after being resin-sealed. However, the "chip" in the present invention is not particularly limited as long as the "chip" is a chip before being resin-sealed, and the "chip" may not be in the form of a chip.

In the present invention, "flip chip" refers to an IC chip having a hump-shaped protruding electrode called a bump on an electrode (a bonding pad) on an IC chip surface portion, or such a chip form. The chip is mounted downward (facing down) on a wiring portion of a printed substrate or the like. The flip chip is used as, for example, a chip for wireless bonding or one of mounting methods.

In the present invention, for example, a resin molded product may be manufactured by resin-sealing (resin molding) a component (for example, a chip, a flip chip, or the like) mounted on a substrate. In the present invention, the substrate (also referred to as an interposer) is not particularly limited, and may be, for example, a lead frame, a wiring substrate, a wafer, a glass epoxy substrate, a ceramic substrate, a resin substrate, a metal substrate, or the like. The substrate may be, for example, a mounting substrate on which chips are mounted on one side or both sides as described above. A method for mounting the chip is not particularly limited, and examples thereof include wire bonding, flip chip bonding, and the like. In the present invention, for example, an electronic component in which the chip is resin-sealed may be manufactured by resin-sealing the mounting substrate. In addition, the use of the substrate resin-sealed by a resin sealing device of the present invention is not particularly limited, and examples thereof include a high-frequency module substrate for a mobile communication terminal, a module substrate for power control, a substrate for equipment control, and the like.

Hereinafter, specific embodiments of the present invention are described with reference to the drawings. For convenience of description, each drawing is schematically drawn by omitting or exaggerating as appropriate.

Embodiment 1

In the embodiment, an example of the resin molding apparatus of the present invention and an example of a method for manufacturing a resin molded product using the same are described.

A cross-sectional view of FIG. 1 schematically shows a configuration of the resin molding apparatus in the embodiment. Moreover, FIGS. 1 to 54 mainly illustrate a part of the resin molding apparatus that performs resin molding using a molding mold (hereinafter, referred to as a "press portion"). However, as described later, the resin molding apparatus of the present invention may include any constituent element other than the press portion. As shown in FIG. 1, a press portion 3100 of the resin molding apparatus includes, as main constituent elements, a molding mold including an upper mold (one mold) 1100 and a lower mold (the other mold) 1200, an upper mold cavity block position change mechanism installation portion (one mold cavity block position change mechanism installation portion) 1300, and a lower mold cavity block position change mechanism installation portion (the other mold cavity block position change mechanism installation portion) 1400. In addition, the resin molding apparatus having the press portion 3100 further includes a mold releasing film adsorption mechanism (not shown in FIG. 1) and an air vent opening/closing mechanism 1330 as main constituent elements. In the embodiment, as described later, the air vent opening/closing mechanism 1330 is one of constituent elements of the upper mold cavity block position change mechanism installation portion 1300, but the present invention is not limited thereto. For example, the air vent opening/closing mechanism 1330 may be one of constituent elements of the press portion 3100 or the resin molding apparatus which is different from the upper mold cavity block position change mechanism installation portion 1300.

The upper mold (one mold) 1100 includes upper mold cavity blocks (one mold cavity block) 1101, and upper mold cavity frame members (one mold cavity frame members) 1102 and 1103. As shown in the drawing, two upper mold cavity blocks 1101 are arranged in parallel. Among the members constituting the upper mold cavity frame member, the upper mold cavity frame member 1103 is arranged in a manner of being sandwiched between two upper mold cavity blocks 1101. As shown in the drawing, the upper mold cavity frame member 1102 is arranged outside the upper mold cavity block 1101. A sliding hole 1105 is formed in the upper mold cavity frame member in a manner of being surrounded by the upper mold cavity frame members 1102 and 1103. The upper mold cavity block 1101 can move in the sliding hole 1105 in a mold opening/closing direction of the molding mold. Moreover, the "mold opening/closing direction" is an opening/closing direction of the upper mold 1100 and the lower mold 1200 in FIG. 1, that is, a vertical direction in the drawing. Furthermore, as shown in the drawing, an upper mold cavity (one mold cavity) 1106 can be formed by surrounding a space between a surface of the upper mold cavity block 1101 facing the lower mold (the other mold) 1200 and inner side surfaces of the upper mold cavity frame members 1102 and 1103. In addition, an air vent groove 1104 is formed at a lower end of the upper mold cavity frame member 1102.

Moreover, although not shown in FIG. 1, a surplus resin portion (also referred to as an unnecessary resin portion or a cut portion) which is a space for accommodating surplus resins (unnecessary resins) at the time of resin molding may be further formed in the upper mold cavity frame member 1103.

The lower mold (the other mold) 1200 has, as main constituent elements, lower mold cavity blocks (the other mold cavity block) 1201, a lower mold side block (the other mold side block) 1202, and a pot block 1203, and further includes a lower mold cavity block pillar (the other mold cavity block pillar) 1204, a lower mold elastic member (the other mold elastic member) 1205, and a plunger 1212. Moreover, the plunger 1212 may be one of constituent elements of the lower mold 1200, and may be one of constituent elements of the press portion 3100 which is different from the lower mold 1200. There are two lower mold cavity blocks 1201, and each lower mold cavity block 1201 is arranged in a manner that an upper surface faces the upper mold cavity block 1101. The pot block 1203 is arranged in a manner of being sandwiched between the two lower mold cavity blocks 1201. The lower mold side block 1202 is arranged outside the lower mold cavity block 1201 as shown in the drawing. Besides, each of the two lower mold cavity blocks 1201 is arranged on the inner sides of the lower mold side block 1202 and the pot block 1203. In the pot block 1203, a pot 1211 which is a hole penetrating in the vertical direction is formed. The plunger 1212 can move up and down in the pot 1211. As described later, by raising the plunger 1212, a molten resin in the pot 1211 can be pushed into the upper mold cavity 1106.

The lower mold cavity block pillar 1204 is attached to a lower surface of the lower mold cavity block 1201. The lower mold elastic member 1205 is arranged in a manner of surrounding the lower mold cavity block pillar 1204, and can be expanded and contracted in the mold opening/closing direction (the vertical direction in the drawing).

The upper mold cavity block position change mechanism installation portion (one mold cavity block position change mechanism installation portion) 1300 includes: an upper mold cavity block driving mechanism (one mold cavity block driving mechanism) 1301; an upper mold cavity block holding member (one mold cavity block holding member) 1302; a load cell (a pressing force measuring mechanism) 1303; an upper mold cavity block pillar (one mold cavity block pillar) 1304; an upper mold wedge mechanism (also referred to as one mold wedge mechanism, an upper mold cotter mechanism, or one mold cotter mechanism) 1310; an upper mold second wedge member holding member (also referred to as one mold second wedge member holding member, an upper mold second cotter holding member, or one mold second cotter holding member) 1321; an elastic member of upper mold second wedge member holding member (an elastic member of one mold second wedge member holding member) 1322; an air vent opening/closing mechanism 1330; a platen (an upper mold cavity block position change mechanism installation portion base member, or one mold cavity block position change mechanism installation portion base member) 1340; an upper mold cavity block position change mechanism installation portion frame member (one mold cavity block position change mechanism installation portion frame member) 1341; and upper mold cavity block position change mechanism installation portion bottom members (one mold cavity block position change mechanism installation portion bottom members) 1342 and 1343. The platen 1340 is a plate-shaped member and is arranged above the upper mold 1100 in a manner of covering the entire upper mold 1100. In addition, as described later, other members of the upper mold cavity block position change mechanism installation portion 1300 are directly or indirectly attached to the platen 1340.

As shown in the drawing, the upper mold cavity block holding member 1302 penetrates the platen 1340 in the vertical direction, and can move up and down. The upper mold cavity block pillar 1304 is attached to a lower end of the one mold cavity block holding member 1302. The upper mold cavity block 1101 is attached to a lower end of the upper mold cavity block pillar 1304. In addition, as described later, the upper mold cavity block 1101 is removable from the upper mold cavity block pillar 1304. The upper mold cavity block driving mechanism 1301 is connected to an upper end of the upper mold cavity block holding member 1302. By moving the upper mold cavity block holding member 1302 up and down by the upper mold cavity block driving mechanism 1301, the upper mold cavity block 1101 can be moved up and down (that is, can be moved in the mold opening/closing direction). In addition, the upper mold cavity block driving mechanism 1301 is not particularly limited, and for example, a servomotor, an air cylinder, or the like can be used.

As shown in the drawing, the upper mold wedge mechanism 1310 includes: an upper mold first wedge member (also referred to as one mold first wedge member, an upper mold first cotter, or one mold first cotter) 1311a; an upper mold second wedge member (also referred to as one mold second wedge member, an upper mold second cotter, or one mold second cotter) 1311b; an upper mold wedge member power transmission member (one mold wedge member power transmission member, an upper mold cotter power transmission member, or one mold cotter power transmission member) 1312; and an upper mold wedge member driving mechanism (also referred to as one mold wedge member driving mechanism, an upper mold cotter driving mechanism, or one mold cotter driving mechanism) 1313. As shown in FIG. 1, one surface of each of the upper mold first wedge member 1311a and the upper mold second wedge member 1311b in a thickness direction (the vertical direction in the drawing) is a tapered surface. More specifically, as shown in the drawing, a lower surface of the upper mold first wedge member 1311a and an upper surface of the upper mold second wedge member 1311b are tapered surfaces, respectively. The upper mold first wedge member 1311a and the upper mold second wedge member 1311b are arranged in a manner that the tapered surfaces thereof face each other.

In addition, the upper mold first wedge member 1311a is connected to the upper mold wedge member driving mechanism 1313 via the upper mold wedge member power transmission member 1312. Besides, a pair of upper mold wedge members formed by the upper mold first wedge member 1311a and the upper mold second wedge member 1311b (a pair of one mold wedge members, and hereinafter may simply referred to as "a pair of upper mold wedge members", "upper mold wedge members", or "upper mold cotters") is slid in a taper direction (a left/right direction in the drawing) of the tapered surfaces using the upper mold wedge member driving mechanism 1313, and thereby a length of the pair of upper mold wedge members in the thickness direction can be changed. For example, when the upper mold first wedge member 1311a is slid toward a front end direction thereof, the upper mold second wedge member 1311b slides in a direction relatively opposite to the upper mold first wedge member 1311a. In this way, the length of the pair of upper mold wedge members in the thickness direction (the vertical direction in the drawing) increases. In addition, for example, conversely, by sliding the upper mold first wedge member 1311a toward a rear end direction thereof, the length of the pair of upper mold wedge members in the thickness direction (the vertical direction in the drawing) can be reduced. Thereby, as described later, a position of the upper mold cavity block 1101 in the vertical direction (the mold opening/closing direction) can be changed. Thereby, the position of the upper mold cavity block 1101 can be adjusted to an appropriate position even if a thickness of the object to be molded varies. That is, thereby, a depth of the upper mold cavity 1106 can be adjusted to an appropriate depth.

Moreover, in the example of FIG. 1, the upper mold first wedge member 1311a on an upper side of the pair of upper mold wedge members can be slid in a horizontal direction (the left/right in the drawing) by the upper mold wedge member driving mechanism 1313. However, the present invention is not limited thereto, and for example, the upper mold second wedge member 1311b on a lower side may be slidable by the upper mold wedge member driving mechanism 1313, or both the upper mold first wedge member 1311a and the upper mold second wedge member 1311b may be slidable by the upper mold wedge member driving mechanism 1313. In addition, the upper mold wedge member driving mechanism 1313 is not particularly limited, and for example, a servomotor, an air cylinder, or the like can be used.

In addition, in FIG. 1, one entire surface of each of the upper mold first wedge member 1311a and the upper mold second wedge member 1311b is a tapered surface. However, the present invention is not limited thereto as long as at least one wedge member can be slid along the tapered surface. For example, in one or both of the upper mold first wedge member 1311a and the upper mold second wedge member 1311b, it is sufficient that only a part of one surface thereof is a tapered surface. More specifically, for example, in at least one of the upper mold first wedge member 1311a and the upper mold second wedge member 1311b shown in the drawing, it is sufficient that only a front end side (a thin side) of one surface is a tapered surface and a root side (a thick side) is a horizontal plane.

An upper surface of the upper mold second wedge member holding member 1321 is in contact with a lower surface of the upper mold second wedge member 1311b. On the other hand, a lower surface of the platen 1340 is in contact with an upper surface of the upper mold first wedge member 1311a. That is, the pair of upper mold wedge members is arranged in a manner of being sandwiched between the upper surface of the upper mold second wedge member holding member 1321 and the lower surface of the platen 1340. Besides, by using the elastic member of upper mold second wedge member holding member 1322 and the upper mold second wedge member holding member 1321, the upper mold first wedge member 1311a and the upper mold second wedge member 1311b are kept in contact with each other.

The upper mold cavity block position change mechanism installation portion bottom member is formed by an upper member 1342 and a lower member 1343. As shown in the drawing, the upper mold cavity frame members 1102 and 1103 can be attached to a lower surface of the upper mold cavity block position change mechanism installation portion bottom member 1343. As described later, the upper mold cavity frame members 1102 and 1103 are detachable from the upper mold cavity block position change mechanism installation portion bottom member 1343. In addition, the upper mold cavity block pillar 1304 penetrates the upper mold cavity block position change mechanism installation portion bottom members 1342 and 1343 in the vertical direction, and can move up and down. The elastic member of upper mold second wedge member holding member 1322 is arranged in a manner of being sandwiched between a lower surface of the upper mold second wedge member holding member 1321 and an upper surface of the upper mold cavity block position change mechanism installation portion bottom member 1342, and can be expanded and contracted in the vertical direction. An upper end of the upper mold cavity block position change mechanism installation portion frame member 1341 is connected to the lower surface of the upper mold cavity block position change mechanism installation portion base member 1340, and a lower end of the upper mold cavity block position change mechanism installation portion frame member 1341 is connected to the upper surface of the upper mold cavity block position change mechanism installation portion bottom member 1342. In addition, the upper mold cavity block position change mechanism installation portion frame member 1341 is arranged in a manner of surrounding the upper mold second wedge member holding member 1321, the upper mold cavity block holding member 1302, and the pair of upper mold wedge members.

The air vent opening/closing mechanism 1330 includes an air vent pin power mechanism 1331, and an air vent pin 1332. As shown in the drawing, the air vent pin 1332 penetrates an upper part of the upper mold cavity frame member 1102, the upper mold cavity block position change mechanism installation portion bottom members 1342 and 1343, the upper mold cavity block position change mechanism installation portion frame member 1341, and the platen 1340, and can move up and down. By moving the air vent pin 1332 up and down by the air vent pin power mechanism 1331, the air vent groove 1104 can be opened and closed as described later. Moreover, the air vent pin power mechanism 1331 is not particularly limited, and for example, a servomotor, an air cylinder, or the like can be used.

Moreover, in the embodiment, the "upper mold cavity block position change mechanism (one mold cavity block position change mechanism)" arranged on the upper mold cavity block position change mechanism installation portion (one mold cavity block position change mechanism installation portion) 1300 includes the upper mold cavity block driving mechanism (one mold cavity block driving mechanism) 1301, and the upper mold wedge mechanism (one mold wedge mechanism) 1310. However, the present invention is not limited thereto, and for example, the upper mold cavity block position change mechanism (one mold cavity block position change mechanism) may further include other constituent elements.

As shown in the drawing, the lower mold cavity block position change mechanism installation portion 1400 includes: a lower mold wedge mechanism (the other mold wedge mechanism) 1410; a lower mold attaching member (the other mold attaching member) 1421; and a platen (also referred to as a lower mold second wedge member holding member, the other mold second wedge member holding member, a lower mold second cotter holding member, or the other mold second cotter holding member) 1422.

As shown in the drawing, the lower mold wedge mechanism 1410 includes: a lower mold first wedge member (also referred to as the other mold first wedge member, a lower mold first cotter, or the other mold first cotter) 1411a; a lower mold second wedge member (also referred to as the other mold second wedge member, a lower mold second cotter, or the other mold second cotter) 1411b; a lower mold wedge member power transmission member (the other mold wedge member power transmission member, a lower mold cotter power transmission member, or the other mold cotter power transmission member) 1412; and a lower mold wedge member driving mechanism (also referred to as the other mold wedge member driving mechanism, a lower mold cotter driving mechanism, or the other mold cotter driving mechanism) 1413. As shown in FIG. 1, the other surface of each of the lower mold first wedge member 1411a and the lower mold second wedge member 1411b in the thickness direction (the vertical direction in the drawing) is a tapered surface. More specifically, as shown in the drawing, an upper surface of the lower mold first wedge member 1411a and a lower surface of the lower mold second wedge member 1411b are tapered surfaces, respectively. The lower mold first wedge member 1411a and the lower mold second wedge member 1411b are arranged in a manner that the tapered surfaces thereof face each other.

In addition, the lower mold first wedge member 1411a is connected to the lower mold wedge member driving mechanism 1413 via the lower mold wedge member power transmission member 1412. Besides, a pair of lower mold wedge members formed by the lower mold first wedge member 1411a and the lower mold second wedge member 1411b (a pair of the other mold wedge members, and hereinafter may be simply referred to as "a pair of lower mold wedge members", "lower mold wedge members", or "lower mold cotters") is slid in a taper direction (the left/right direction in the drawing) of the tapered surfaces using the lower mold wedge member driving mechanism 1413, and thereby a length of the pair of lower mold wedge members in the thickness direction can be changed. For example, when the lower mold first wedge member 1411a is slid toward a front end direction thereof, the lower mold second wedge member 1411b slides in a direction relatively opposite to the lower mold first wedge member 1411a. In this way, the length of the pair of lower mold wedge members in the thickness direction (the vertical direction in the drawing) increases. In addition, for example, conversely, by sliding the lower mold first wedge member 1411a toward a rear end direction thereof, the length of the pair of lower mold wedge members in the thickness direction (the vertical direction in the drawing) can be reduced. Thereby, as described later, a position of the lower mold cavity block 1201 in the vertical direction (the mold opening/closing direction) can be changed. Thereby, for example, even if a thickness of a substrate 11 in an object to be molded 10 described later varies (for example, even if the thickness of the left and right substrates 11 in FIG. 6 described later is different), by appropriately changing (adjusting) the position of each lower mold cavity block 1201 (for example, the left and right lower mold cavity blocks 1201 in FIG. 6), the left and right substrates 11 can be clamped with an appropriate pressing force.

Moreover, in the example of FIG. 1, the lower mold first wedge member 1411*a* on a lower side of the pair of lower mold wedge members can be slid in the horizontal direction (the left/right direction in the drawing) by the lower mold wedge member driving mechanism 1413. However, the present invention is not limited thereto, and for example, the lower mold second wedge member 1411*b* on an upper side may be slidable by the lower mold wedge member driving mechanism 1413, or both the lower mold first wedge member 1411*a* and the lower mold second wedge member 1411*b* may be slidable by the lower mold wedge member driving mechanism 1413. In addition, the lower mold wedge member driving mechanism 1413 is not particularly limited, and for example, a servomotor, an air cylinder, or the like can be used.

In addition, in FIG. 1, one entire surface of each of the lower mold first wedge member 1411*a* and the lower mold second wedge member 1411*b* is a tapered surface. However, the present invention is not limited thereto as long as at least one wedge member can be slid along the tapered surface. For example, in one or both of the lower mold first wedge member 1411*a* and the lower mold second wedge member 1411*b*, it is sufficient that only a part of one surface thereof is a tapered surface. More specifically, for example, in at least one of the lower mold first wedge member 1411*a* and the lower mold second wedge member 1411*b* shown in the drawing, it is sufficient that only a front end side (a thin side) of one surface is a tapered surface and a root side (a thick side) is a horizontal plane. In addition, in FIG. 1, the lower mold first wedge member 1411*a* and the lower mold second wedge member 1411*b* are not in contact with each other, but similar to the upper mold wedge mechanism 1310, the lower mold first wedge member 1411*a* and the lower mold second wedge member 1411*b* may be kept in contact with each other.

An upper surface of the lower mold second wedge member holding member 1422 is in contact with a lower surface of the lower mold first wedge member 1411*a*. On the other hand, a lower end of the lower mold cavity block pillar 1204 is connected to an upper surface of the lower mold second wedge member 1411*b*. That is, the pair of lower mold wedge members is arranged in a manner of being sandwiched between the upper surface of the lower mold second wedge member holding member 1422 and the lower end of the lower mold cavity block pillar 1204. Besides, by changing the length of the pair of lower mold wedge members in the thickness direction, the lower mold cavity block 1201 can be moved up and down.

The lower mold attaching member 1421 is arranged above the lower mold second wedge member holding member 1422, and is fixed so as not to move up and down with respect to the lower mold second wedge member holding member 1422. In a space sandwiched between the lower mold attaching member 1421 and the lower mold second wedge member holding member 1422, the pair of lower mold wedge members can be driven as described above and the length thereof in the thickness direction can be changed. The lower mold side block 1202 and the pot block 1203 are arranged on an upper surface of the lower mold attaching member 1421. In addition, the lower mold cavity block pillar 1204 penetrates the lower mold attaching member 1421 in the vertical direction and can move up and down. The lower mold elastic member 1205 is sandwiched between the lower surface of the lower mold cavity block 1201 and the upper surface of the lower mold attaching member 1421, and can be expanded and contracted in the mold opening/closing direction (the vertical direction in the drawing) as described above.

Moreover, in the embodiment, the "lower mold cavity block position change mechanism (the other mold cavity block position change mechanism)" arranged on the lower mold cavity block position change mechanism installation portion (the other mold cavity block position change mechanism installation portion) 1400 includes the lower mold wedge mechanism (the other mold wedge mechanism) 1410. However, the present invention is not limited thereto, and for example, the lower mold cavity block position change mechanism (the other mold cavity block position change mechanism) may further include other constituent elements.

The method for manufacturing a resin molded product using the resin molding apparatus in FIG. 1 can be performed, for example, as shown in FIGS. 2 to 21.

Figure 2:
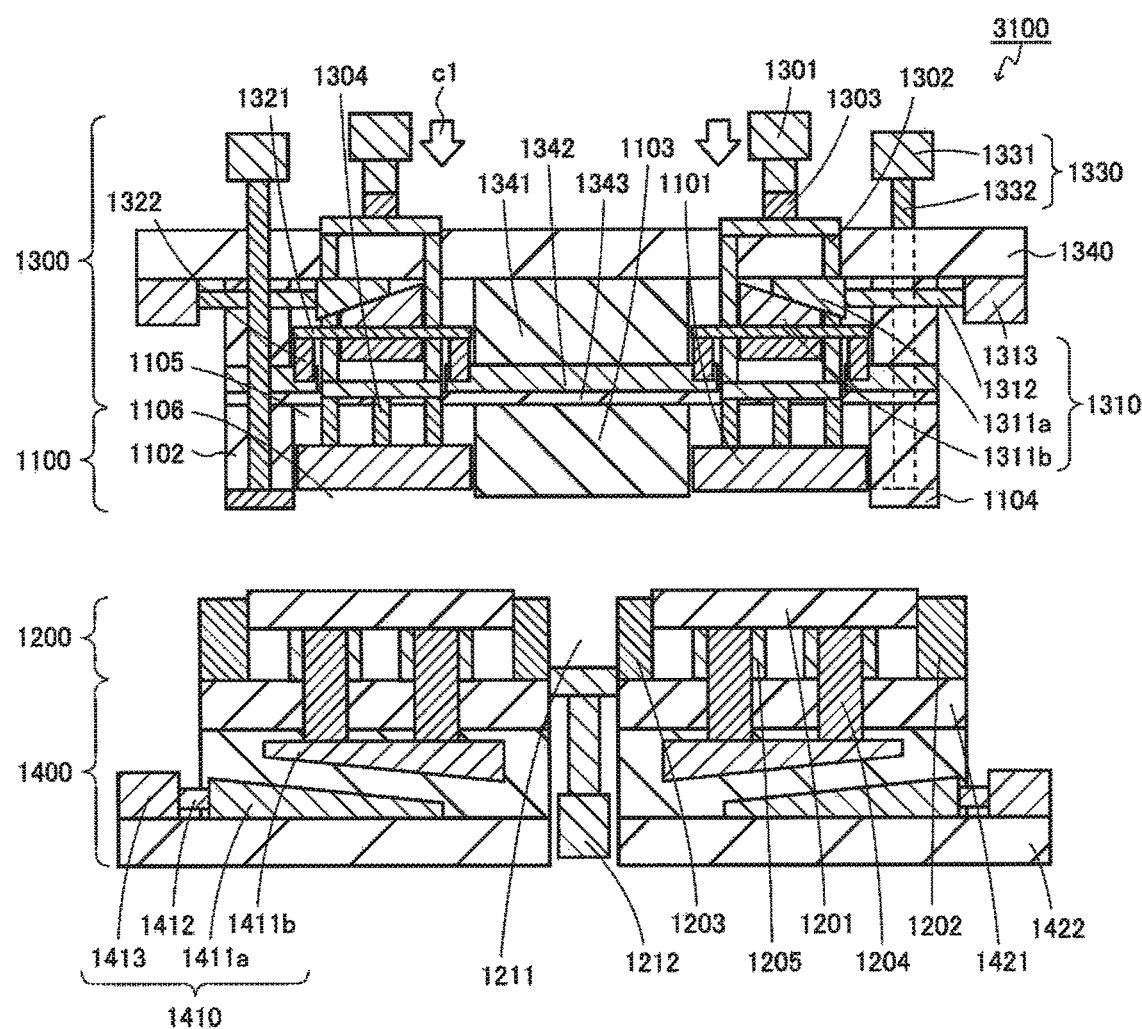
FIG. 2 is a cross-sectional view schematically showing one process in an example of a method for manufacturing a resin molded product using the resin molding apparatus in FIG. 1.
Figure 3:
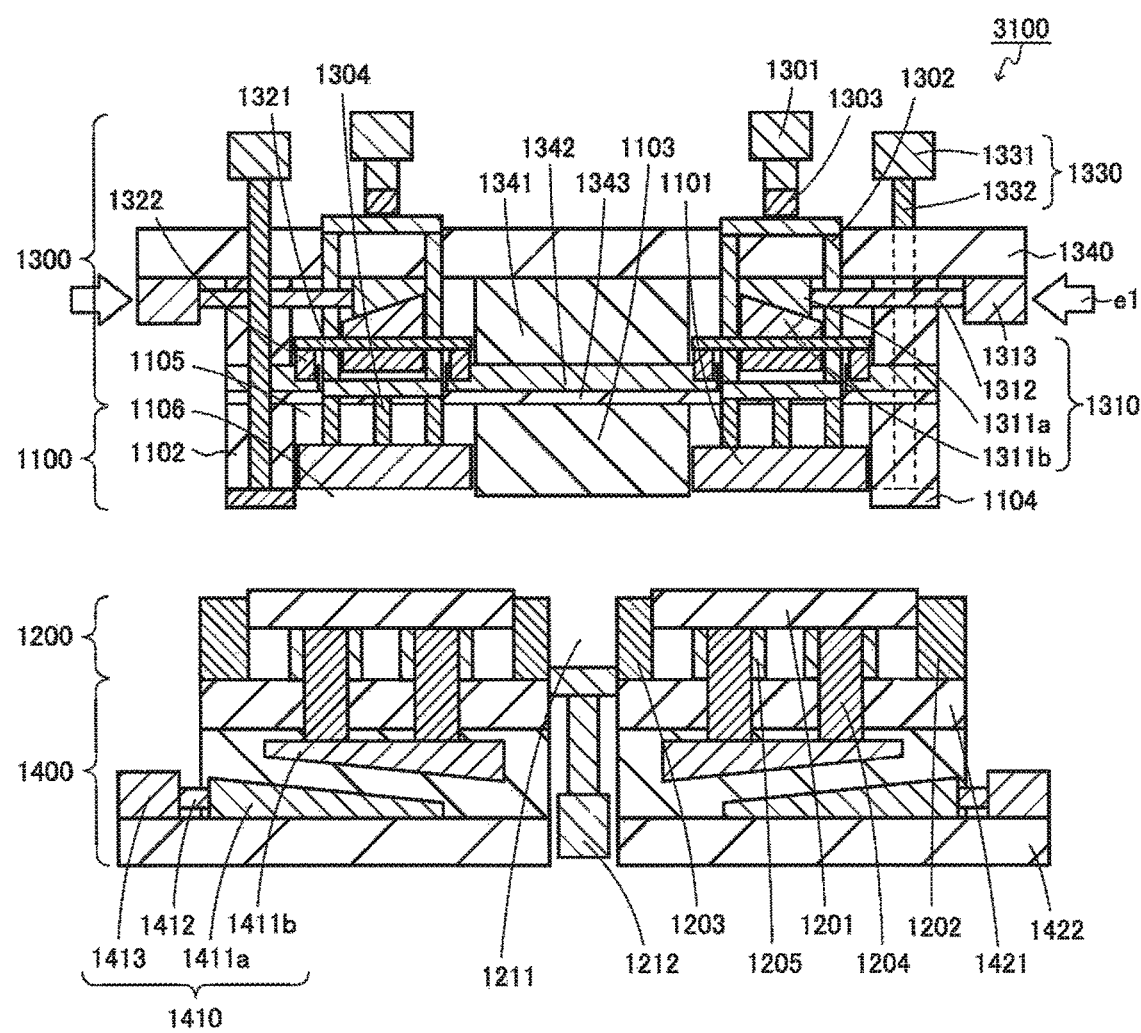
FIG. 3 is a cross-sectional view schematically showing another process in the same method for manufacturing a resin molded product as in FIG. 2.
Figure 4:
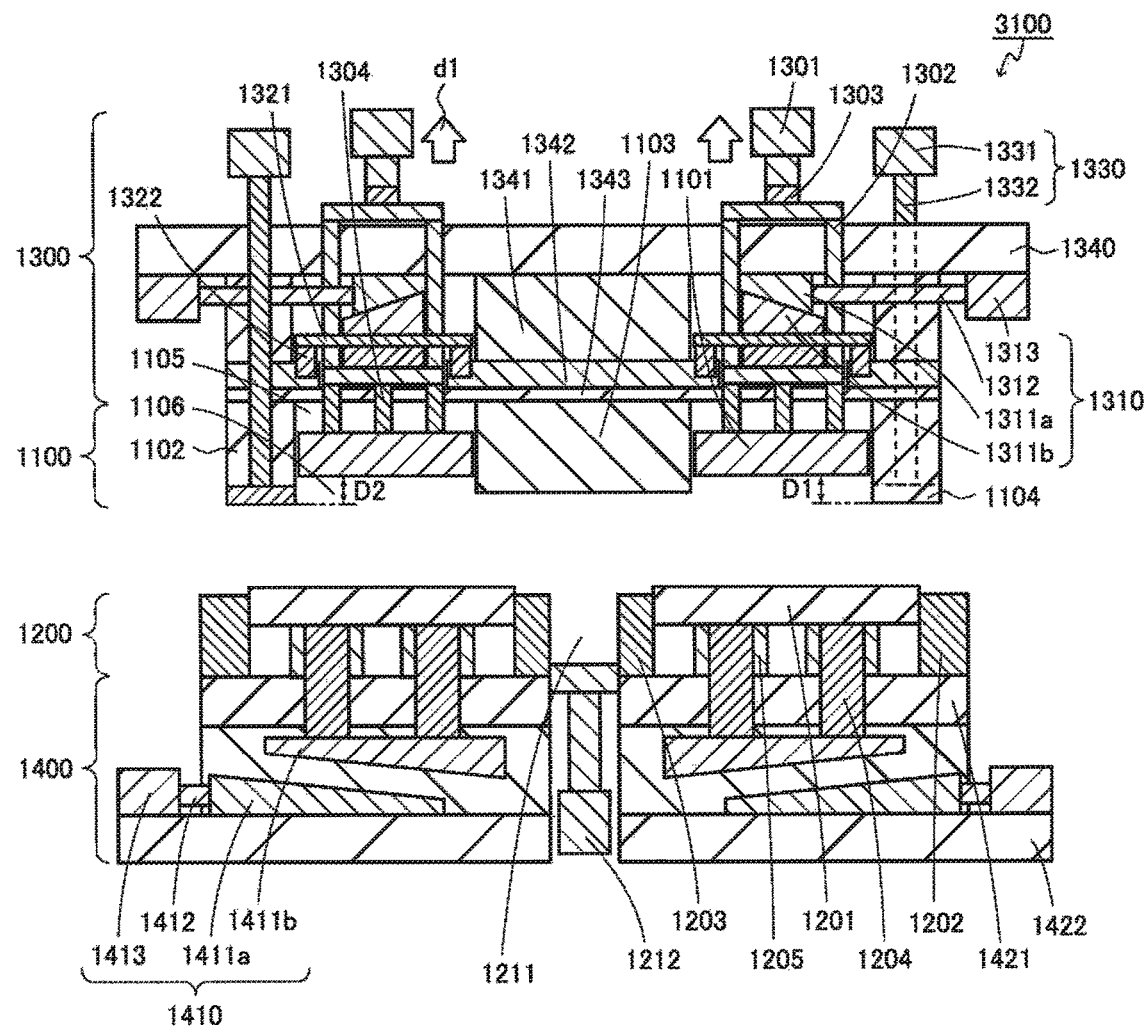
FIG. 4 is a cross-sectional view schematically showing further another process in the same method for manufacturing a resin molded product as in FIG. 2.

First, as shown in FIGS. 2 to 4, the position of the upper mold cavity block 1101 is fixed at a preset height position, and the depth of the upper mold cavity 1106 is changed (the fixing process of the one mold cavity block). Specific descriptions are as follows.

First, as shown in FIG. 2, the upper mold cavity block driving mechanism 1301 is used to lower the upper mold cavity block 1101 in the direction of an arrow c1 to set a height position of the upper mold cavity block 1101. At this time, the upper mold cavity block 1101 is lowered before the upper mold cavity 1106 reaches a predetermined (target) depth. As described later, by raising the upper mold cavity block 1101 again, the upper mold cavity 1106 is set to the predetermined (target) depth.

Next, as shown in FIG. 3, the left and right upper mold first wedge members 1311*a* are moved in front end directions thereof (a direction of an arrow e1), respectively. Thereby, the length of the pair of upper mold wedge members including the upper mold first wedge member 1311*a* and the upper mold second wedge member 1311*b* increases in the thickness direction (the mold opening/closing direction, and the vertical direction in the drawing). Then, as shown in the drawing, the upper mold second wedge member holding member 1321 is pushed down by the upper mold second wedge member 1311*b* and is lowered. At this time, the upper mold second wedge member holding member 1321 is lowered to a position corresponding to the predetermined (target) depth of the upper mold cavity 1106, and the height position of the upper mold cavity block 1101 is set. Then, the upper mold first wedge member 1311*a* and the upper mold second wedge member 1311*b* are fixed at this position. In other words, the upper mold first wedge member 1311*a* and the upper mold second wedge member 1311*b* are used to fix the upper mold cavity block 1101 having been moved to the height position so as to limit a position in a direction away from the lower mold.

Figure 5:
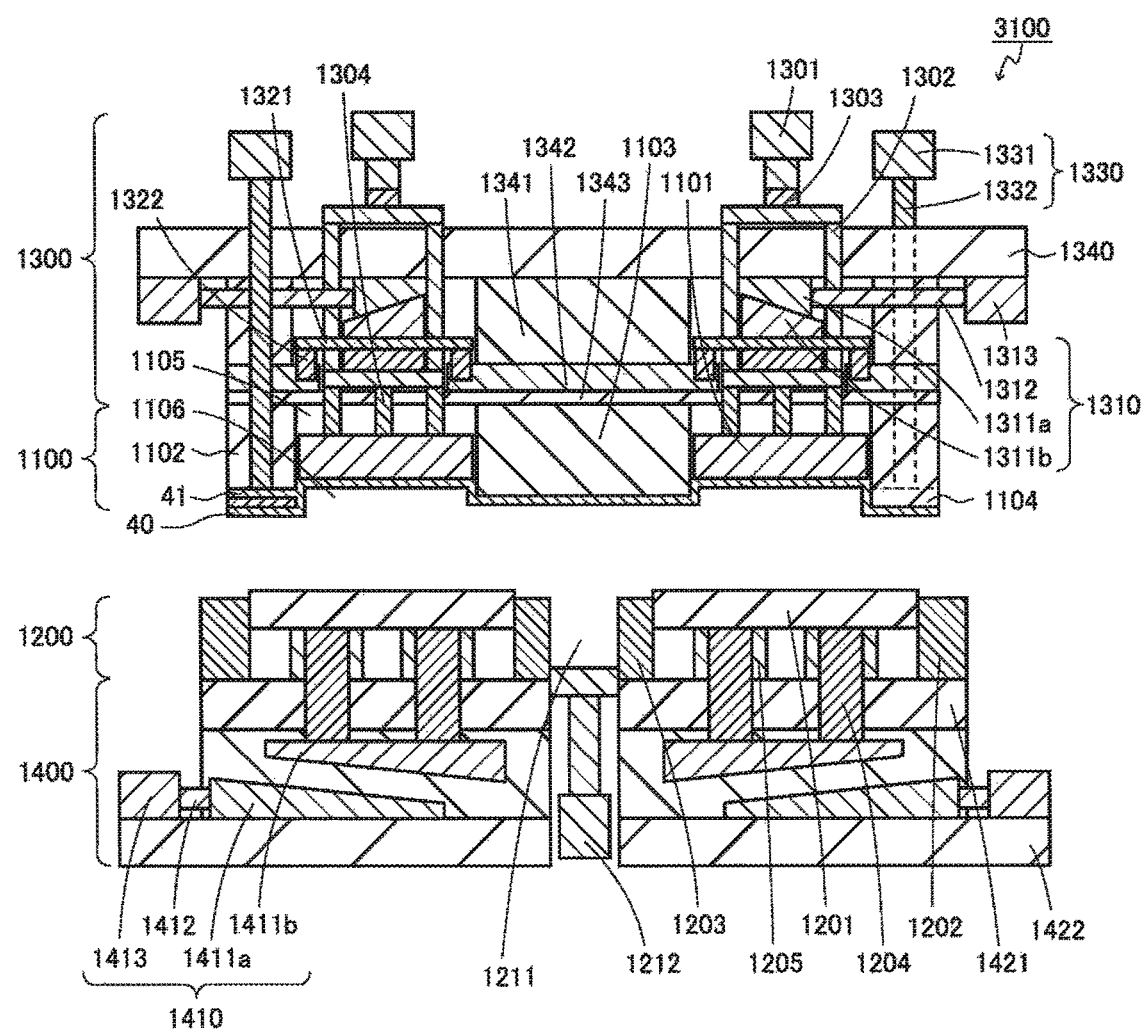
FIG. 5 is a cross-sectional view schematically showing further another process in the same method for manufacturing a resin molded product as in FIG. 2.

Next, as shown in FIG. 4, the upper mold cavity block driving mechanism 1301 is used to raise the upper mold cavity block 1101 in a direction of an arrow d1. At this time, as shown in the drawing, the upper mold cavity block holding member 1302 is raised until the upper mold cavity block holding member 1302 comes into contact with the upper mold second wedge member holding member 1321. Thereby, the upper mold cavity block 1101 is fixed at the set height position, and each of the left and right upper mold cavities 1106 reaches a target depth (D1 on the right side and D2 on the left side in the drawing). Moreover, although FIG. 4 shows an example in which the depth D1 on the right side is the same as the depth D2 on the left side, D1 and D2 may also be different depths (heights). In FIG. 5 and the following drawings, for convenience of illustration, an example is shown in which the left and right depths of the upper mold cavities 1106 are the same, but in FIGS. 4, D1 and D2 may be set to different depths, and resin molding may be performed with the left and right depths of the upper mold cavities 1106 being different. In addition, in FIGS. 5 to 22, an example is shown in which a resin thickness (a package thickness) of the manufactured resin molded product is the same on the left and right, but the resin thickness may also be different on the left and right.

Next, as shown in FIG. 5, a mold releasing film 40 is supplied to a mold surface (an upper mold surface) of the upper mold 1100. Then, the upper mold surface is covered with the mold releasing film 40 by adsorption or the like (one mold surface covering process). As described later, a mold releasing film adsorption mechanism (not shown in FIG. 5) may be used for adsorption. In addition, as shown in the drawing, "the mold surface (the upper mold surface) of the upper mold 1100" on which the mold releasing film 40 is adsorbed includes a mold surface of the upper mold cavity 1106 and a lower surface of the upper mold cavity frame member 1102. Furthermore, at this time, as shown in the drawing, a mold releasing film 41 is also supplied to the inside of the air vent groove 1104. In the state of FIG. 5, because the air vent groove 1104 is not blocked, the mold releasing film 40 can be adsorbed via the air vent groove 1104.

Figure 54:
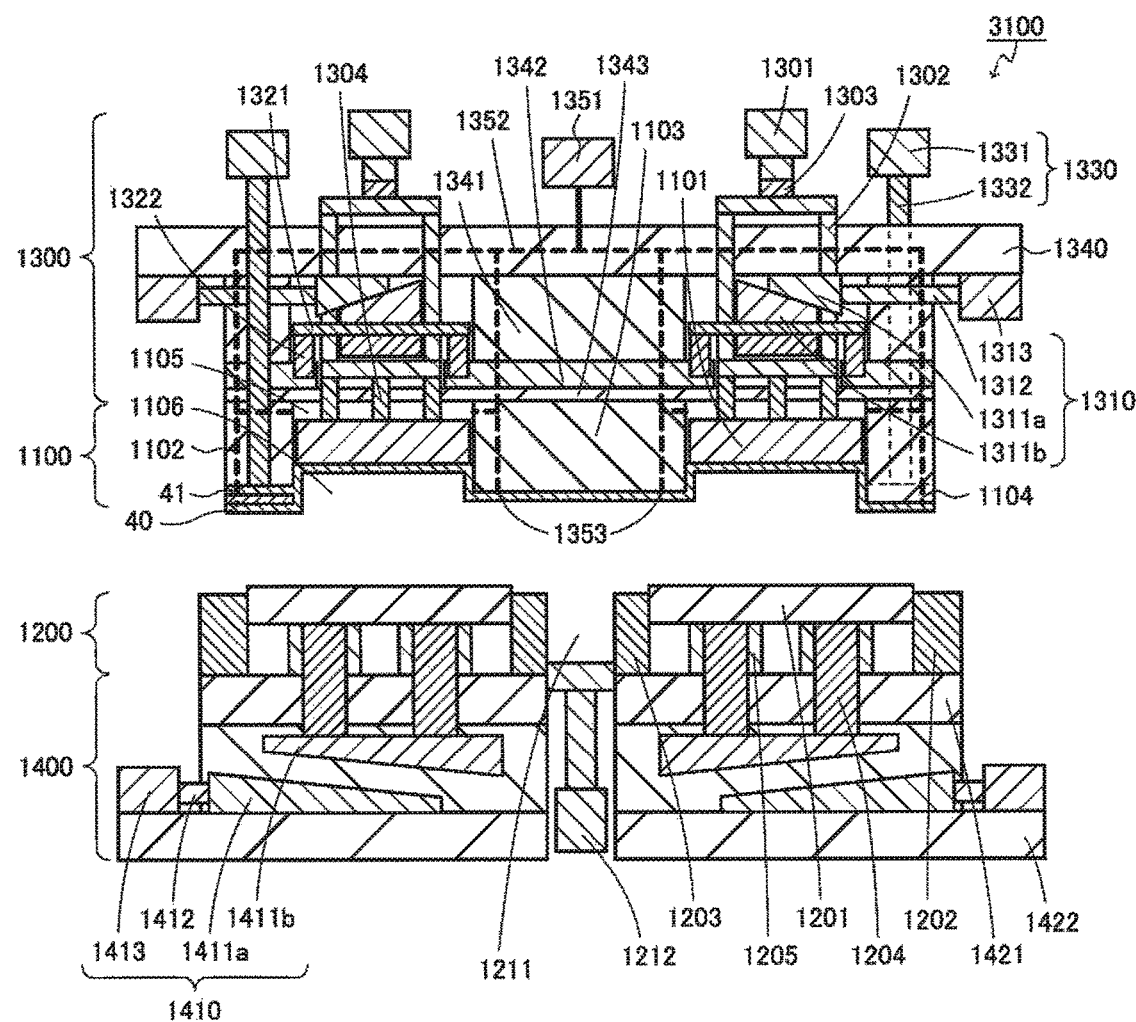
FIG. 54 is a cross-sectional view schematically showing an example of a structure in which a mold releasing film is adsorbed on an upper mold in the resin molding apparatus in FIG. 1.

Moreover, the adsorption of the mold releasing film 40 is not particularly limited, and for example, the mold releasing films 40 and 41 can be adsorbed on the upper mold surface and the air vent groove 1104 using a suction pump or the like. More specifically, the adsorption of the mold releasing film 40 can be performed as shown in FIG. 54 for example. In FIG. 54, the resin molding apparatus including the press portion 3100 has a mold releasing film adsorption mechanism 1351. The mold releasing film adsorption mechanism 1351 is not particularly limited, and for example, a suction pump or the like can be used. A mold releasing film adsorption pipe 1352 is arranged on the platen 1340, the upper mold cavity block position change mechanism installation portion frame member 1341, the upper mold cavity block position change mechanism installation portion bottom members 1342 and 1343, and the upper mold cavity frame members 1102 and 1103. The mold releasing film adsorption pipe 1352 is branched, and each end of the branched mold releasing film adsorption pipe 1352 is opened as a mold releasing film adsorption hole 1353 at lower ends of the upper mold cavity frame members 1102 and 1103. Then, by sucking from the other end of the mold releasing film adsorption pipe 1352 by the mold releasing film adsorption mechanism 1351, the mold releasing films 40 and 41 can be adsorbed on the upper mold surface and the air vent groove 1104 via the mold releasing film adsorption hole 1353.

In addition, the mold releasing films 40 and 41 may be conveyed to the position of the molding mold by, for example, a mold releasing film conveying mechanism (not shown) or the like, and then may be supplied to the mold surface (the upper mold surface) of the upper mold 1100 as described above.

Figure 6:
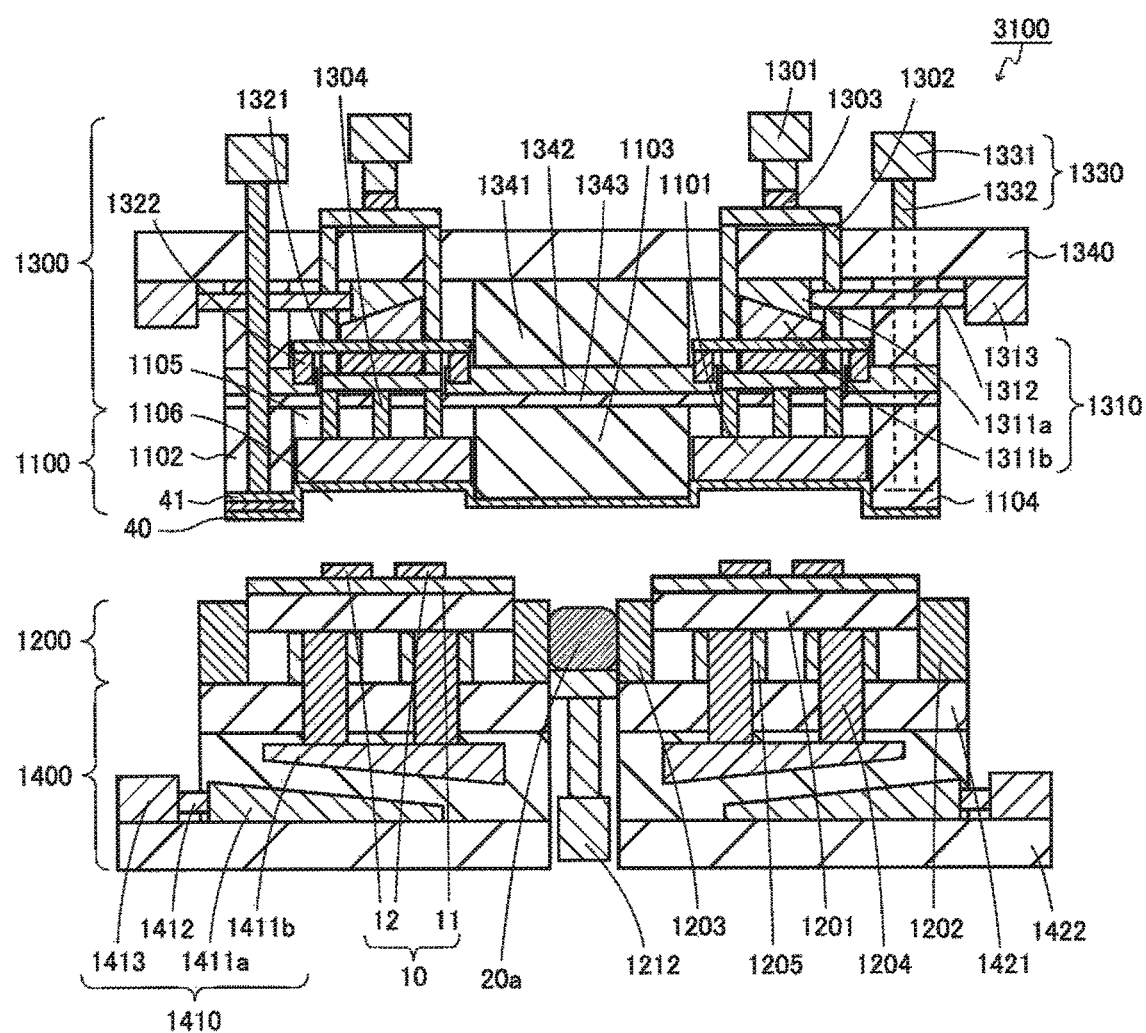
FIG. 6 is a cross-sectional view schematically showing further another process in the same method for manufacturing a resin molded product as in FIG. 2.

Next, as shown in FIG. 6, a tablet (a resin material) 20a is supplied into the pot 1211, and as shown in the drawing, the object to be molded 10 is supplied to an upper surface of the lower mold cavity block 1201 (a supply process for the object to be molded). The resin material 20a may be, for example, a thermosetting resin, but is not limited thereto, and may be, for example, a thermoplastic resin. At this time, the upper mold 1100 and the lower mold 1200 may be heated in advance by a heater (not shown) to raise the temperature. In addition, for example, each of the resin material 20a and the object to be molded 10 may be conveyed to the position of the molding mold by the conveying mechanism (not shown) and supplied to the molding mold.

In addition, as shown in the drawing, the object to be molded 10 includes the substrate 11 and a chip 12. The chip 12 is fixed to one surface of the substrate 11 (a surface on the upper mold cavity 1106 side in the drawing). Moreover, in the same drawing, two chips 12 are fixed to one substrate 11, but the number of the chip 12 is not limited thereto and is arbitrary. In addition, in the present invention, the configuration of the object to be molded is not limited thereto, and for example, any constituent element may be fixed on the substrate in addition to or in place of the chip, or the object to be molded may only include the substrate.

Figure 7:
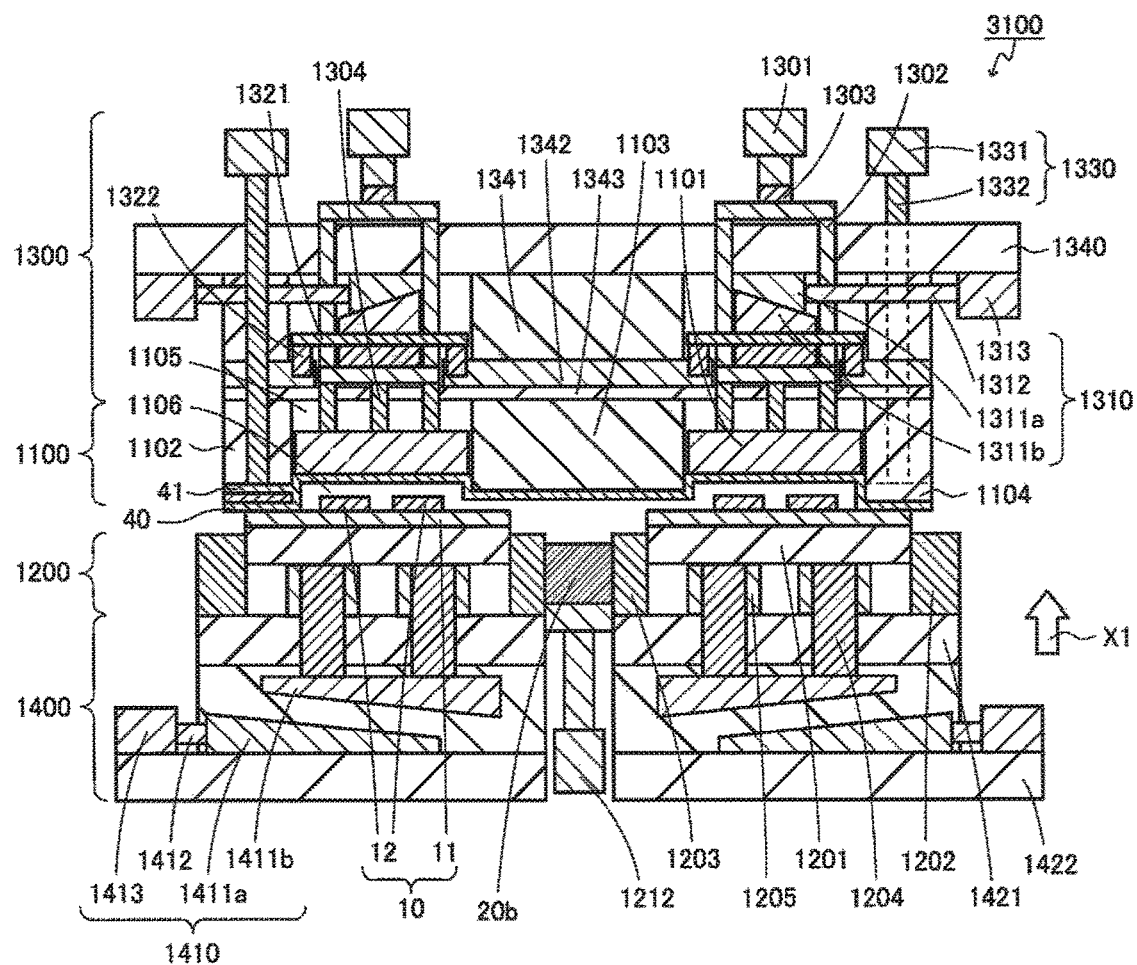
FIG. 7 is a cross-sectional view schematically showing further another process in the same method for manufacturing a resin molded product as in FIG. 2.

Next, as shown in FIG. 7, the lower mold 1200 is raised in a direction of an arrow X1 by a drive source (not shown), and the substrate 11 is sandwiched between the lower mold cavity block 1201 and the upper mold cavity frame member 1102. At this time, as shown in the drawing, the resin material 20a is melted and changed to a molten resin 20b by the heat of the lower mold 1200 which has been heated in advance.

Figure 8:
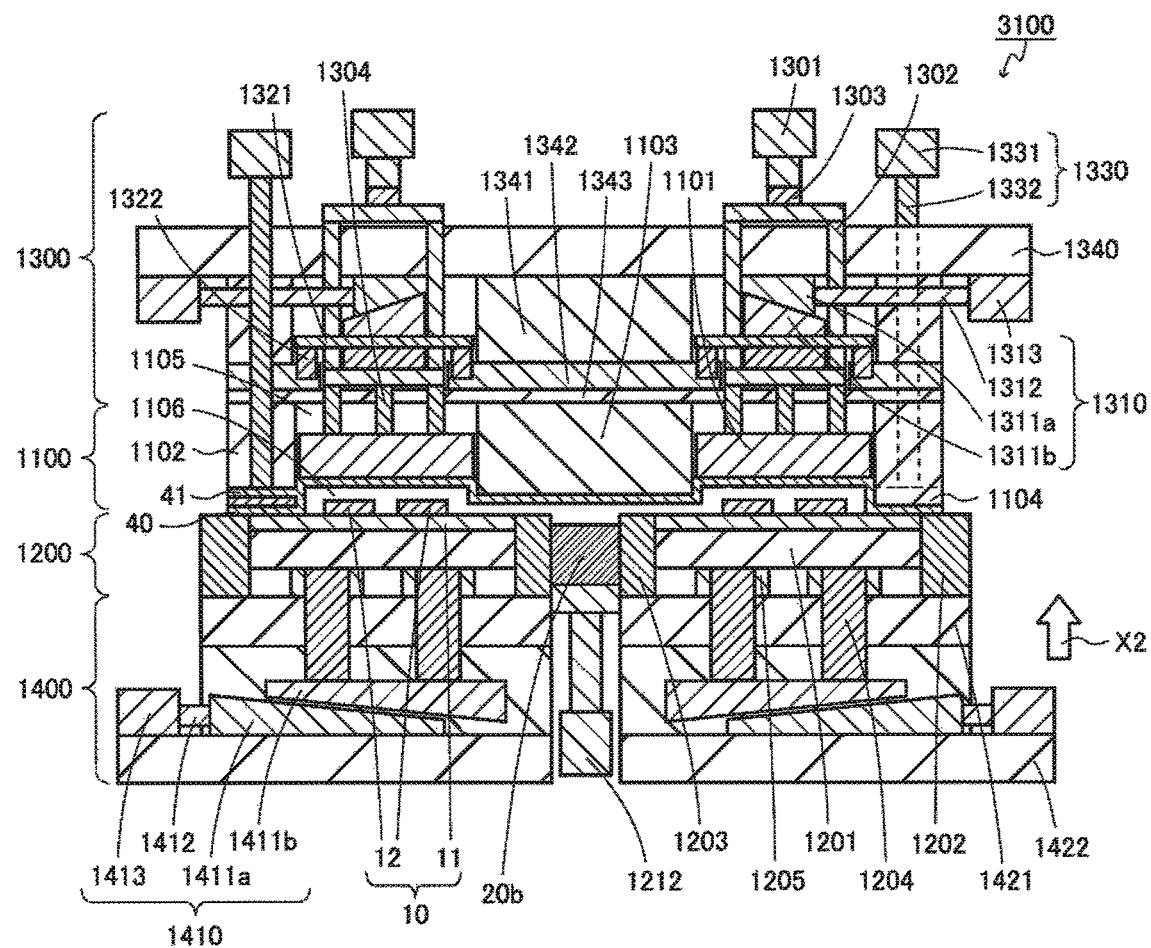
FIG. 8 is a cross-sectional view schematically showing further another process in the same method for manufacturing a resin molded product as in FIG. 2.

Next, as shown in FIG. 8, the lower mold 1200 is further raised in a direction of an arrow X2. Thereby, an upward pressure caused by the lower mold cavity block 1201 is applied to the substrate 11 sandwiched between the lower mold cavity block 1201 and the upper mold cavity frame member 1102. In this way, the substrate 11 is sandwiched, pressed, and clamped between the lower mold cavity block 1201 and the upper mold cavity frame member 1102 (the clamping process for the object to be molded).

Figure 9:
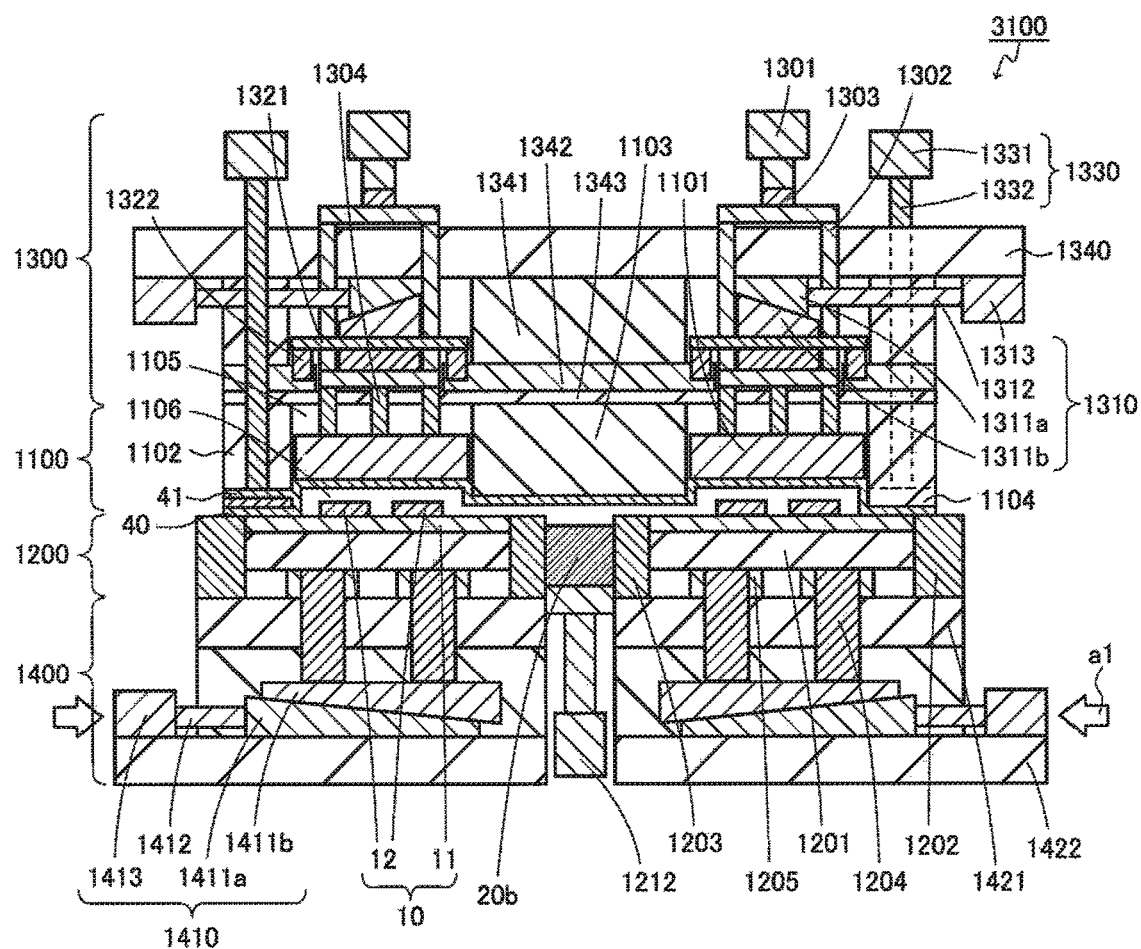
FIG. 9 is a cross-sectional view schematically showing further another process in the same method for manufacturing a resin molded product as in FIG. 2.

Next, as shown in FIG. 9, the lower mold first wedge member 1411a is moved in the front end direction thereof (a direction of an arrow a1), and brought into contact with the lower mold second wedge member 1411b. By fixing the lower mold first wedge member 1411a and the lower mold second wedge member 1411b at this position, the position of the lower mold cavity block 1201 in the vertical direction is fixed at this position.

Figure 10:
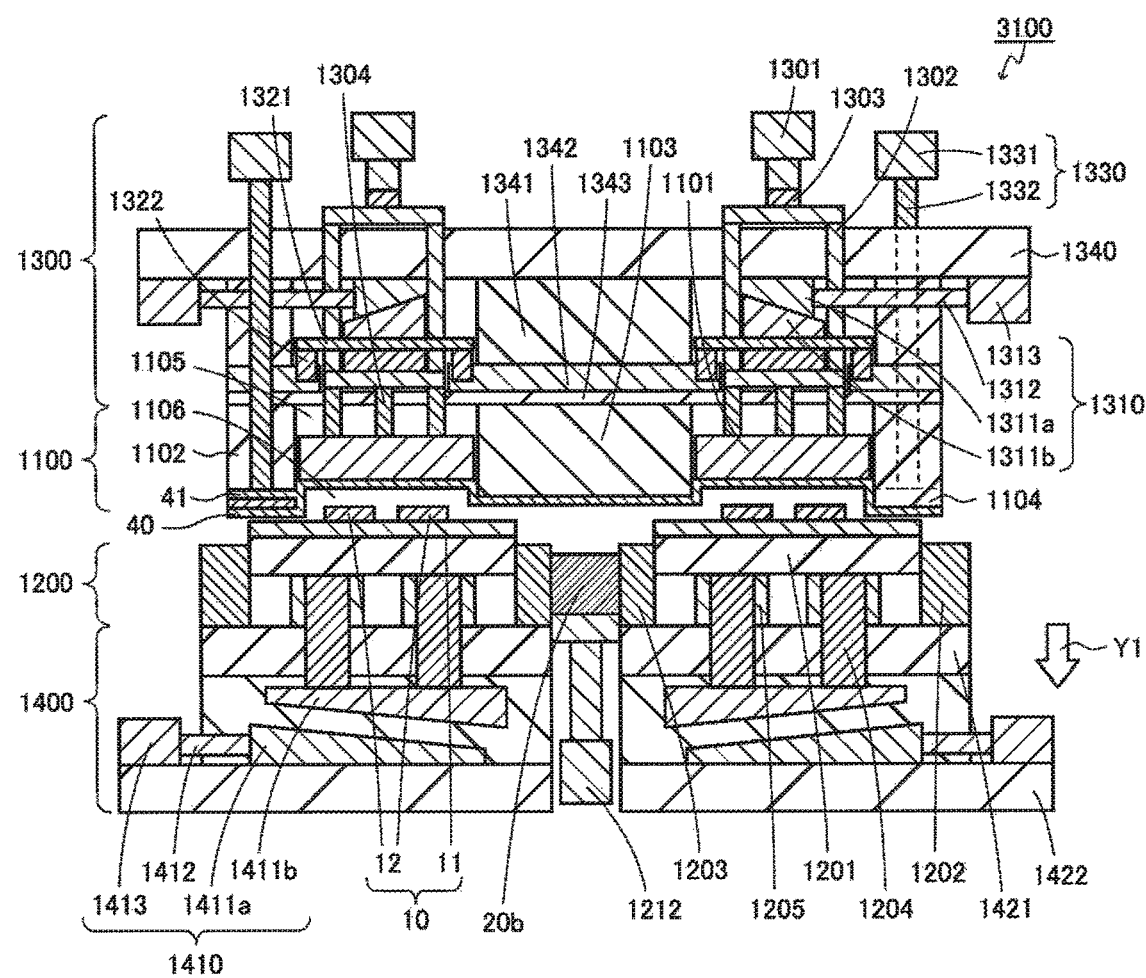
FIG. 10 is a cross-sectional view schematically showing further another process in the same method for manufacturing a resin molded product as in FIG. 2.

Next, as shown in FIG. 10, the lower mold 1200 is lowered in a direction of an arrow Y1 to slightly open the mold.

Figure 11:
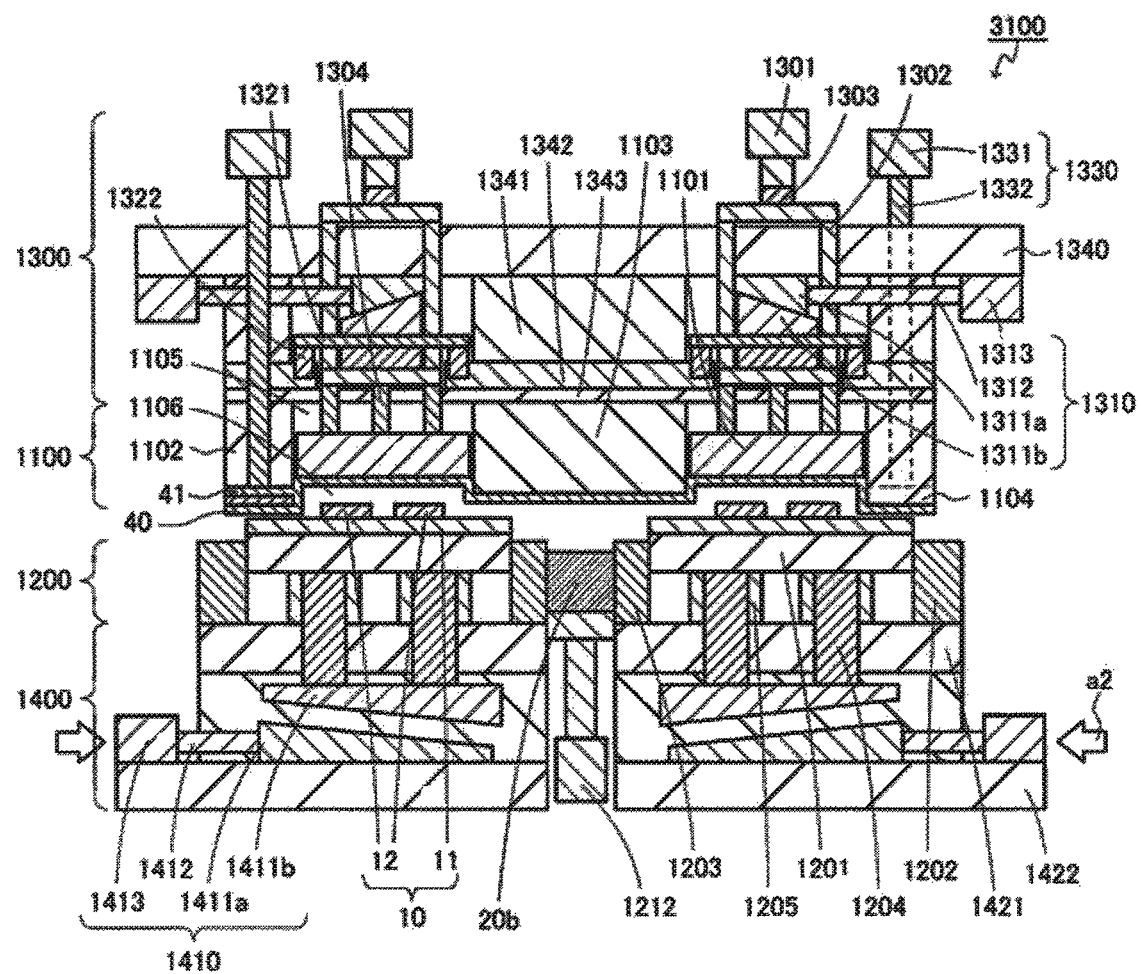
FIG. 11 is a cross-sectional view schematically showing further another process in the same method for manufacturing a resin molded product as in FIG. 2.

Next, as shown in FIG. 11, the lower mold first wedge member 1411a is slightly moved in the front end direction thereof (a direction of an arrow a2). Thereby, a length in the thickness direction of the pair of lower mold cotters including the lower mold first wedge member 1411a and the lower mold second wedge member 1411b is slightly increased in consideration of clamping allowance of the substrate 11.

Figure 12:
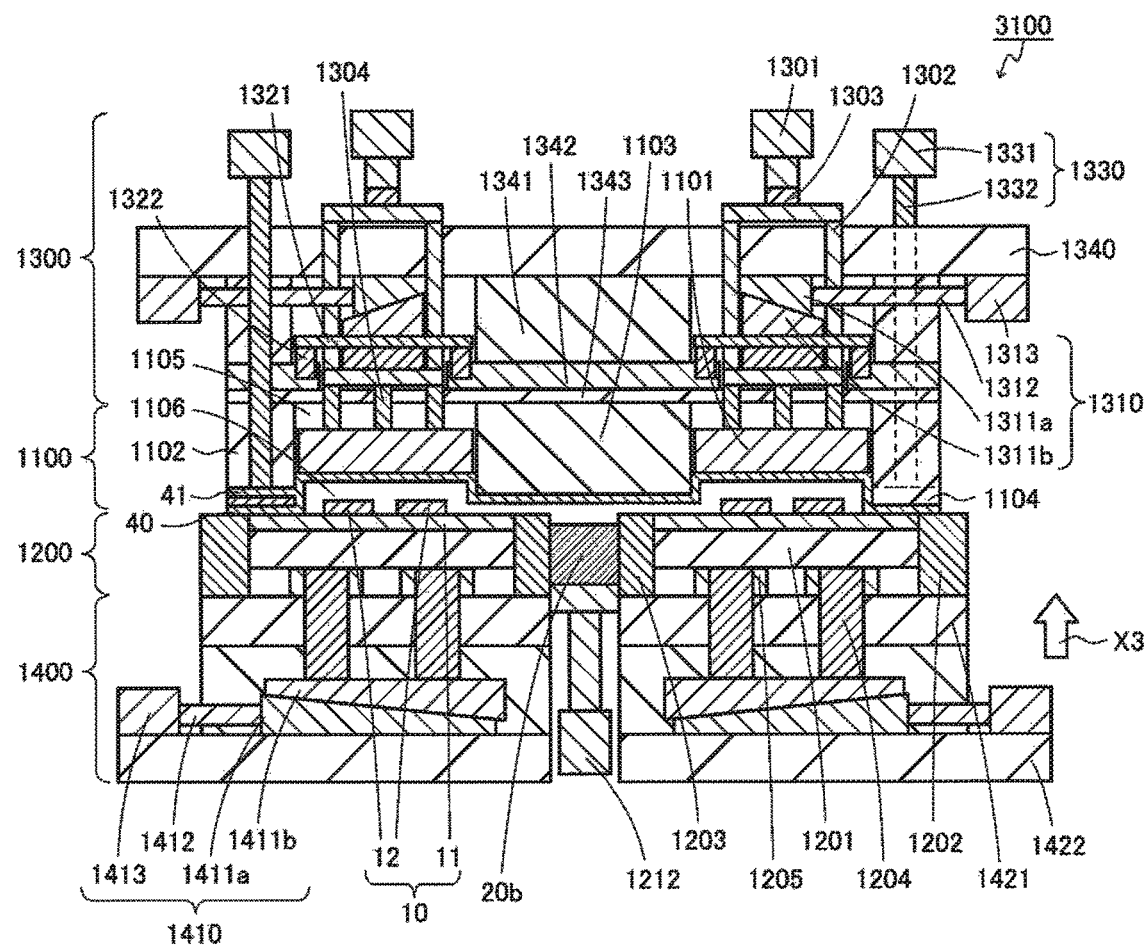
FIG. 12 is a cross-sectional view schematically showing further another process in the same method for manufacturing a resin molded product as in FIG. 2.
Figure 13:
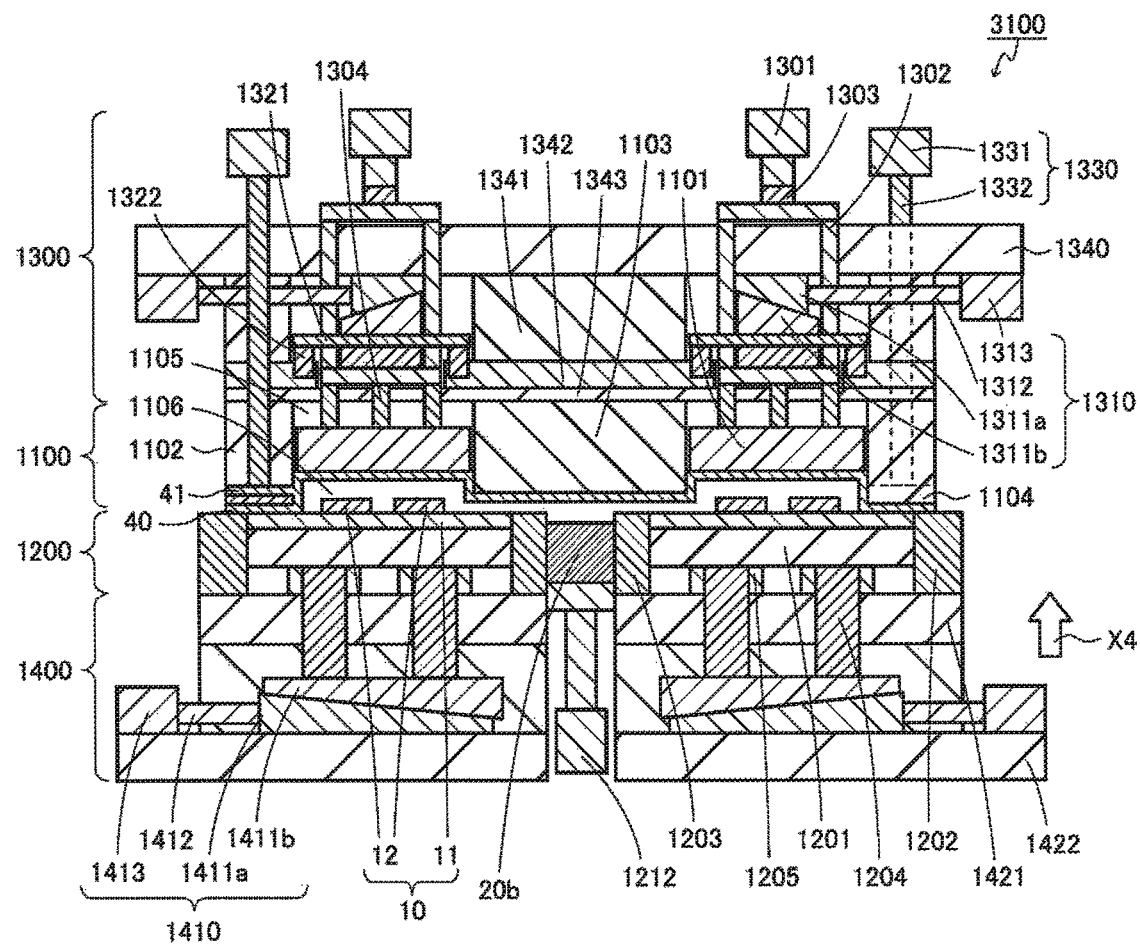
FIG. 13 is a cross-sectional view schematically showing further another process in the same method for manufacturing a resin molded product as in FIG. 2.

Next, as shown in FIG. 12, the lower mold 1200 is raised in a direction of an arrow X3, and the molding mold is clamped again. Furthermore, a depressurization mechanism (not shown) is used to depressurize the inside of the molding mold (the inside of the upper mold cavity 1106, and the like). At this time, as shown in FIG. 13, an upward force is continuously applied to the lower mold 1200 in a direction of an arrow X4. The lower mold 1200 is fixed at this position (hereinafter, may be referred to as "primary clamp position"), and as shown below, the molten resin 20b is injected into the upper mold cavity 1106 (the resin injection process).

Figure 14:
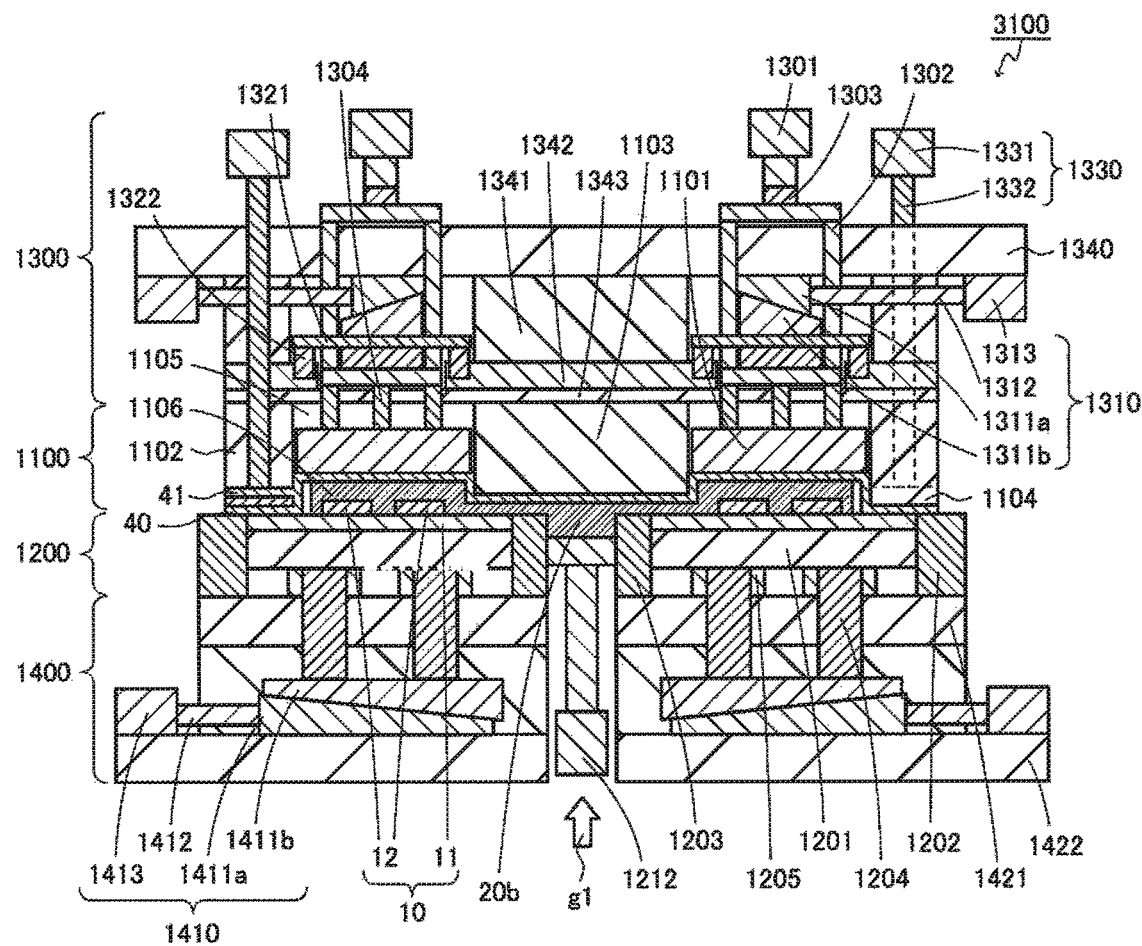
FIG. 14 is a cross-sectional view schematically showing further another process in the same method for manufacturing a resin molded product as in FIG. 2.

Next, as shown in FIG. 14, the plunger 1212 is moved upward (in a direction of an arrow g1) to push the molten resin 20b in the pot 1211 into the upper mold cavity 1106.

Figure 15:
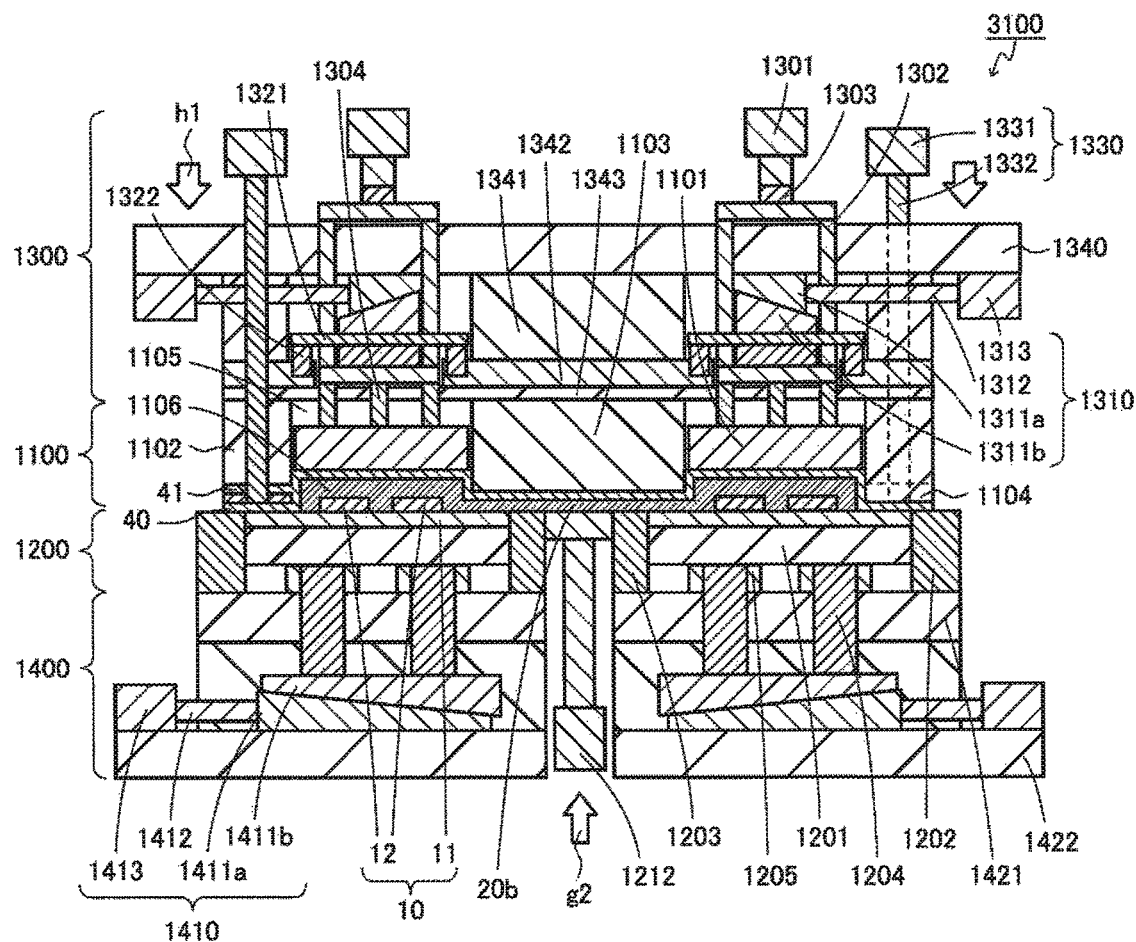
FIG. 15 is a cross-sectional view schematically showing further another process in the same method for manufacturing a resin molded product as in FIG. 2.

Furthermore, as shown in FIG. 15, the air vent pin 1332 is pushed downward (in a direction of an arrow h1) by the air vent pin power mechanism 1331 to block the air vent groove 1104. Thereafter, as shown in the same drawing, the plunger 1212 is further raised in a direction of an arrow g2. Thereby, the inside of the upper mold cavity 1106 is substantially filled with the molten resin 20b. Then, the plunger 1212 is temporarily stopped at this position. At this time, the upper mold cavity block 1101 is fixed using the upper mold wedge mechanism 1310. Furthermore, the lower mold cavity block 1201 is fixed using the lower mold wedge mechanism 1410. By fixing the upper mold cavity block 1101 and the lower mold cavity block 1201 in this way, even if a resin pressure is applied to the inside of the upper mold cavity 1106, the upper mold cavity block 1101 and the lower mold cavity block 1201 can be prevented from moving in the mold opening/closing direction.

Moreover, as for the operation of the air vent pin 1332, in the description of FIG. 15, immediately after the plunger 1212 is moved upward (in the direction of the arrow g1) (see FIG. 14), the air vent pin 1332 is pushed downward (in the direction of the arrow h1), but the operation of the air vent pin 1332 is not limited thereto. Specifically, for example, a timing of pushing the air vent pin 1332 downward (in the direction of the arrow h1) may be at any time after moving the plunger 1212 upward (in the direction of the arrow g1) and before opening the mold by lowering the lower mold 1200 in a direction of an arrow Y2 described later with reference to FIG. 25. Furthermore, depending on the resin material used for resin molding, it may be not necessary to perform an air vent operation by the air vent pin power mechanism 1331, the air vent pin 1332, and the air vent groove 1104.

Furthermore, as shown in FIGS. 16 to 21, the resin molding is performed in a manner of changing the depth of the upper mold cavity 1106 using the upper mold wedge mechanism 1310 and the upper mold cavity block driving mechanism 1301 (the resin molding process).

Figure 16:
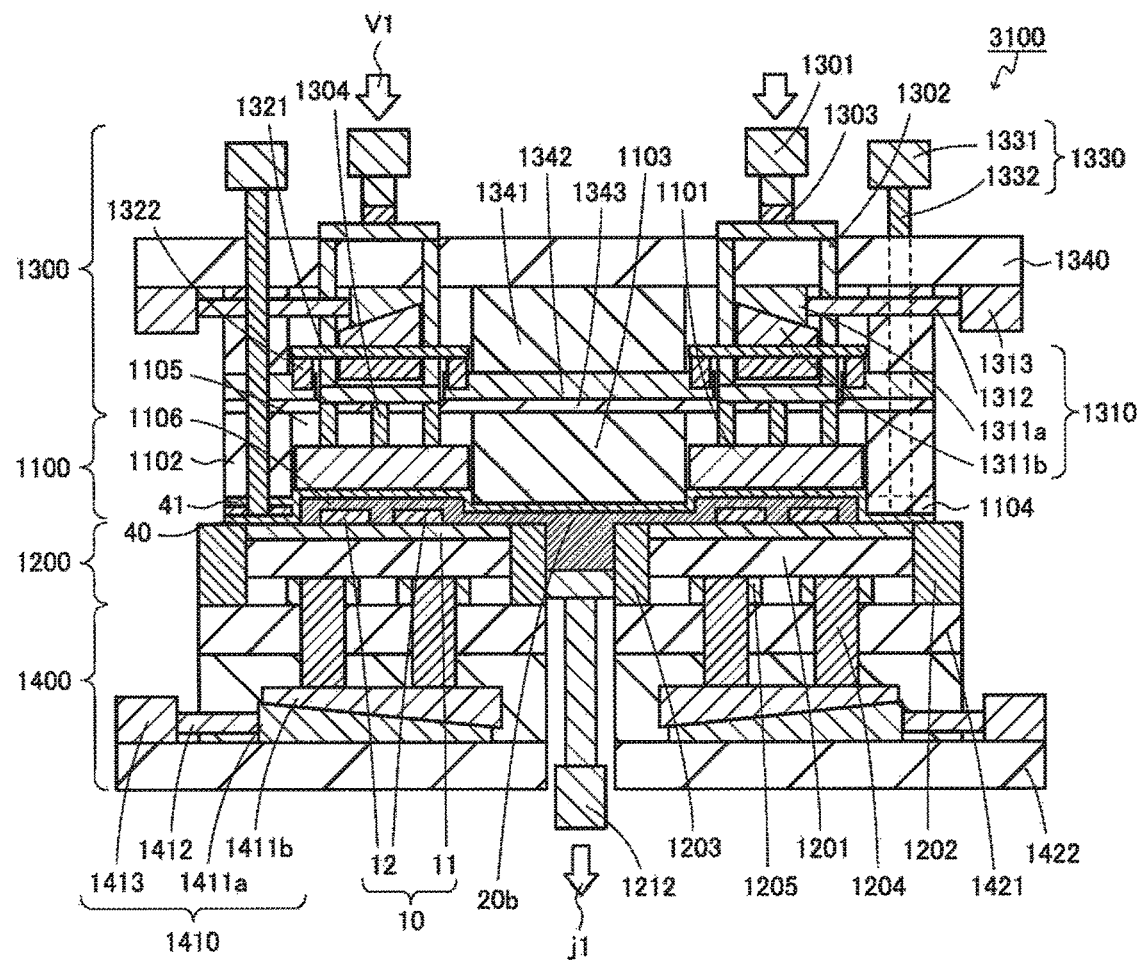
FIG. 16 is a cross-sectional view schematically showing further another process in the same method for manufacturing a resin molded product as in FIG. 2.

As shown by an arrow j1 in FIG. 16, the plunger 1212 is lowered to a predetermined position. Thereafter, the upper mold cavity block driving mechanism 1301 and the upper mold cavity block 1101 are lowered in a direction of an arrow V1 to a preset height position. Moreover, an example in which the upper mold cavity block driving mechanism 1301 and the upper mold cavity block 1101 are lowered (the arrow V1) after the plunger 1212 is lowered (the arrow j1) has been described, but the order of these operations is not particularly limited, and may be, for example, simultaneous. In addition, an example in which the upper mold cavity block driving mechanism 1301 and the upper mold cavity block 1101 are lowered (the arrow V1) once after the plunger 1212 is lowered (the arrow j1) has been described, but the number of times of the lowering is not particularly limited, and the lowering may be repeated a plurality of times. The preset height position in the resin molding process described here is a height position different from the preset height position in the fixing process of the one mold cavity block described above (see FIGS. 2 to 4).

Figure 17:
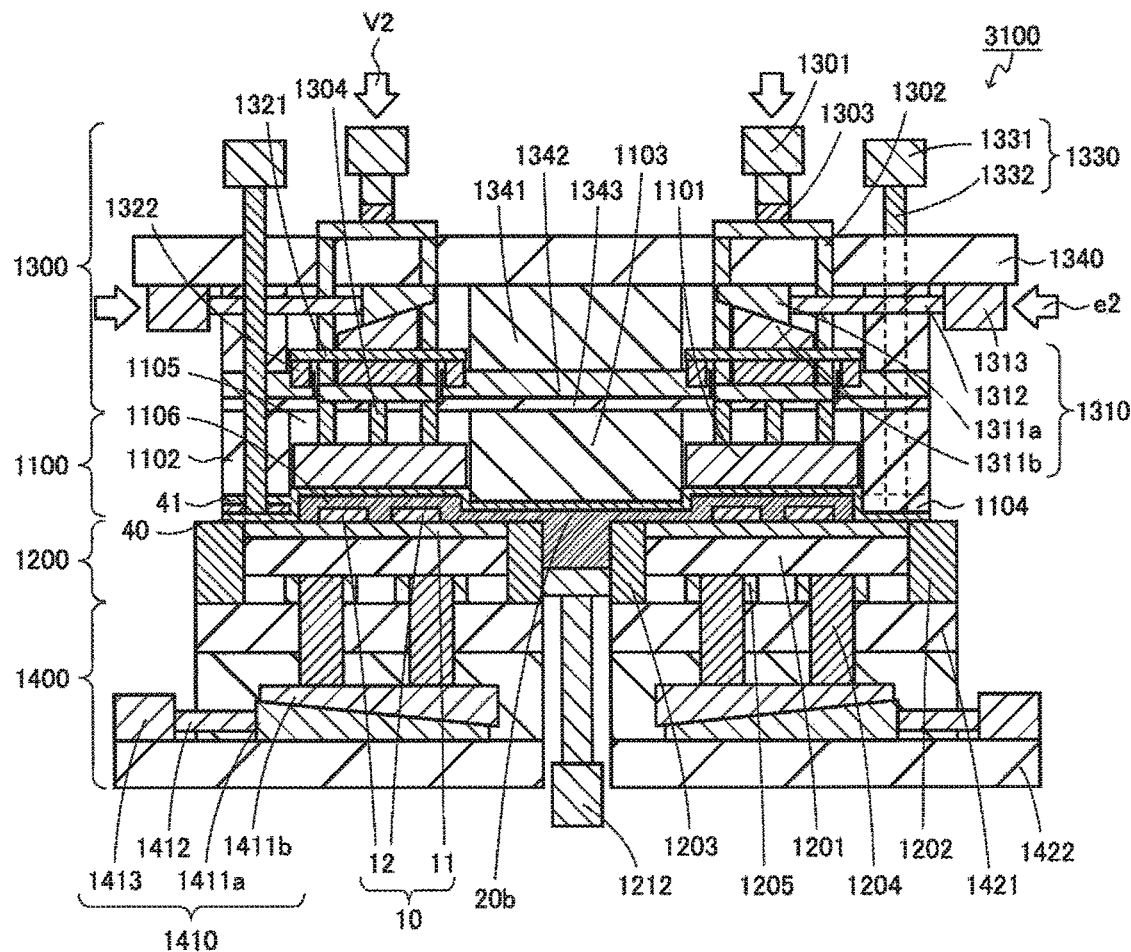
FIG. 17 is a cross-sectional view schematically showing further another process in the same method for manufacturing a resin molded product as in FIG. 2.

Next, as shown by an arrow e2 in FIG. 17, the upper mold first wedge member 1311a is moved toward the front end direction thereof, and stopped when the length of the upper mold cotter (the upper mold first wedge member 1311a and the upper mold second wedge member 1311b) in the thickness direction reaches a predetermined length. The predetermined length corresponds to a desired depth of the upper mold cavity 1106, and corresponds to the preset height position of the upper mold cavity block 1101. Thereby, as shown in the drawing, the upper mold second wedge member holding member 1321 is lowered and comes into contact with the upper mold cavity block holding member 1302. Moreover, at this time, as shown by an arrow V2, a downward force may be continuously applied to the upper mold cavity block 1101. In addition, the upper mold cavity block 1101 may be fixed at a position shown in the drawing without applying the downward force shown by the arrow V2.

Figure 18:
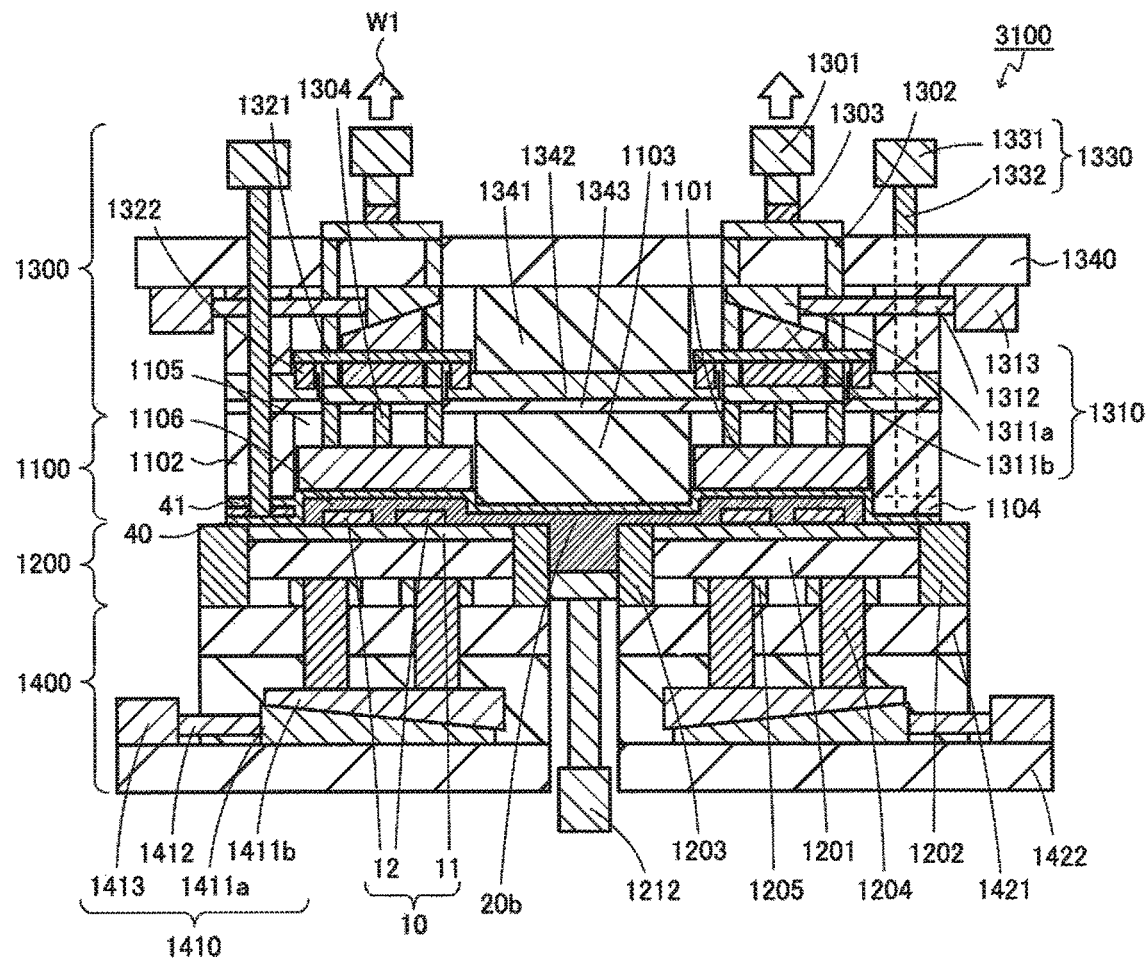
FIG. 18 is a cross-sectional view schematically showing further another process in the same method for manufacturing a resin molded product as in FIG. 2.

Next, as shown by an arrow W1 in FIG. 18, an upward force is applied to the upper mold cavity block driving mechanism 1301. Thereby, the upper mold cavity block 1101 is fixed at the position shown in the drawing. Moreover, here, the upper mold cavity block 1101 can also be fixed at the position shown in the drawing without applying an upward force to the upper mold cavity block driving mechanism 1301.

Figure 19:
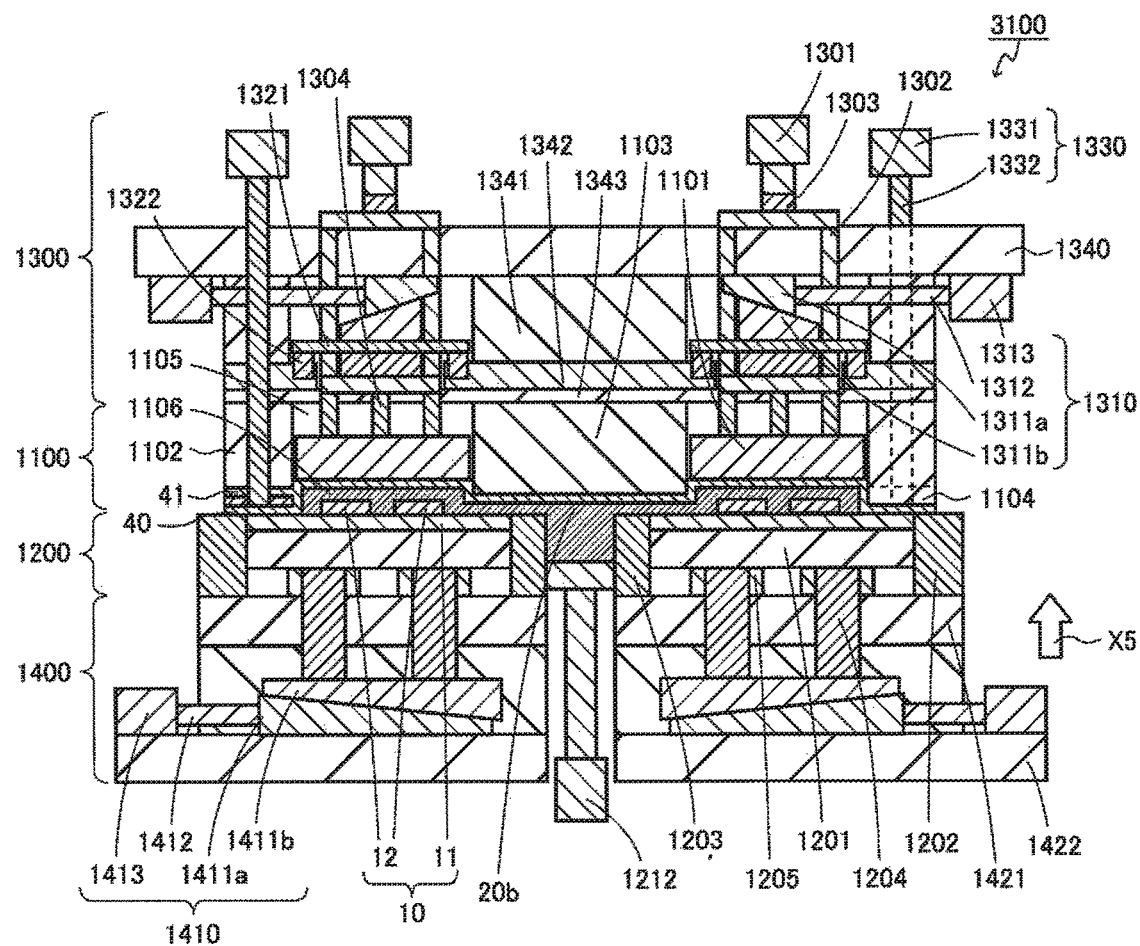
FIG. 19 is a cross-sectional view schematically showing further another process in the same method for manufacturing a resin molded product as in FIG. 2.

Next, as shown by an arrow X5 in FIG. 19, an upward force is applied to the lower mold 1200. Thereby, a clamping force with respect to the substrate 11 is maximized, and the lower mold 1200 is stopped. Hereinafter, the position of the lower mold 1200 may be referred to as a "secondary clamp position". Moreover, at this time, the plunger 1212 does not move.

Figure 20:
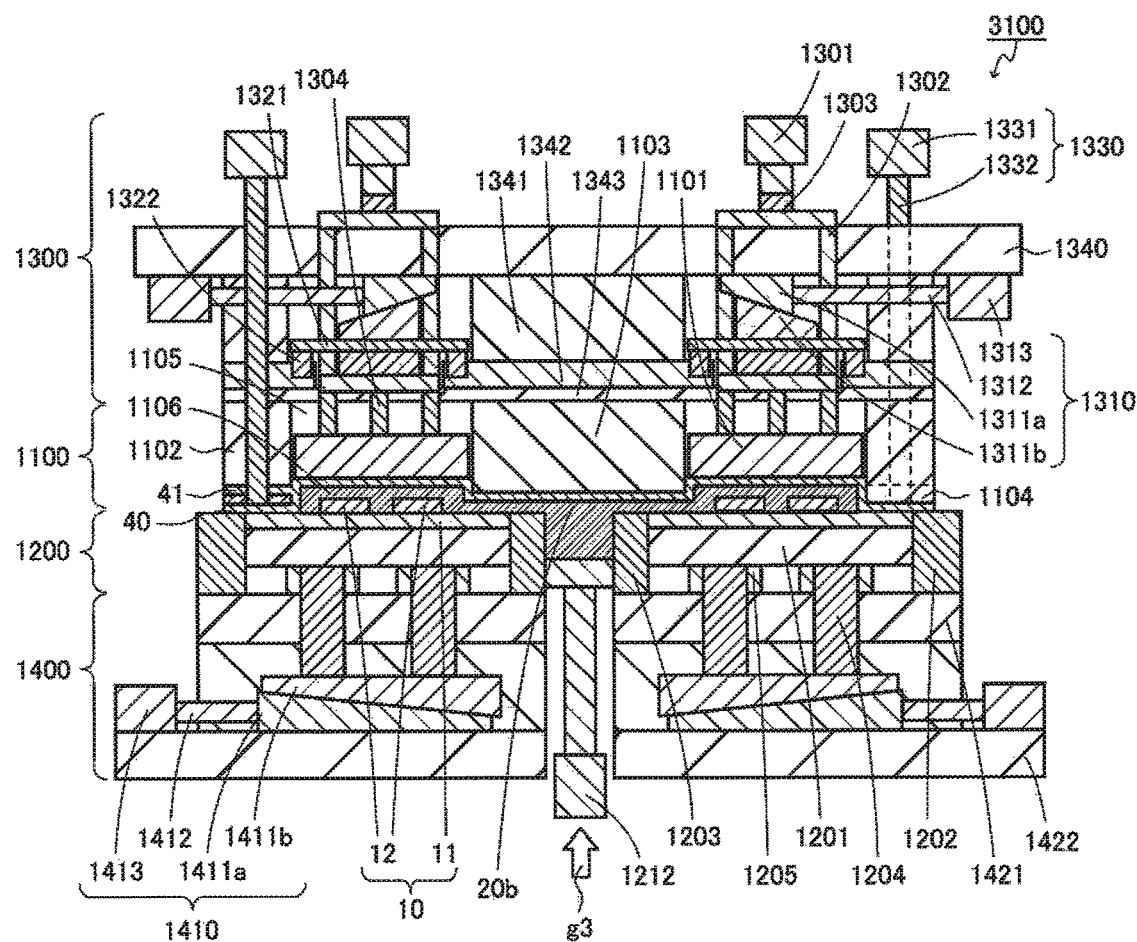
FIG. 20 is a cross-sectional view schematically showing further another process in the same method for manufacturing a resin molded product as in FIG. 2.

Next, as shown by an arrow g3 in FIG. 20, the plunger 1212 is raised until the pressure applied to the molten resin 20b reaches a predetermined pressure. Moreover, in the embodiment, the operation of FIG. 20 is performed after the operation of FIG. 19. However, the operation of FIG. 19 and the operation of FIG. 20 may be performed at the same time.

Figure 21:
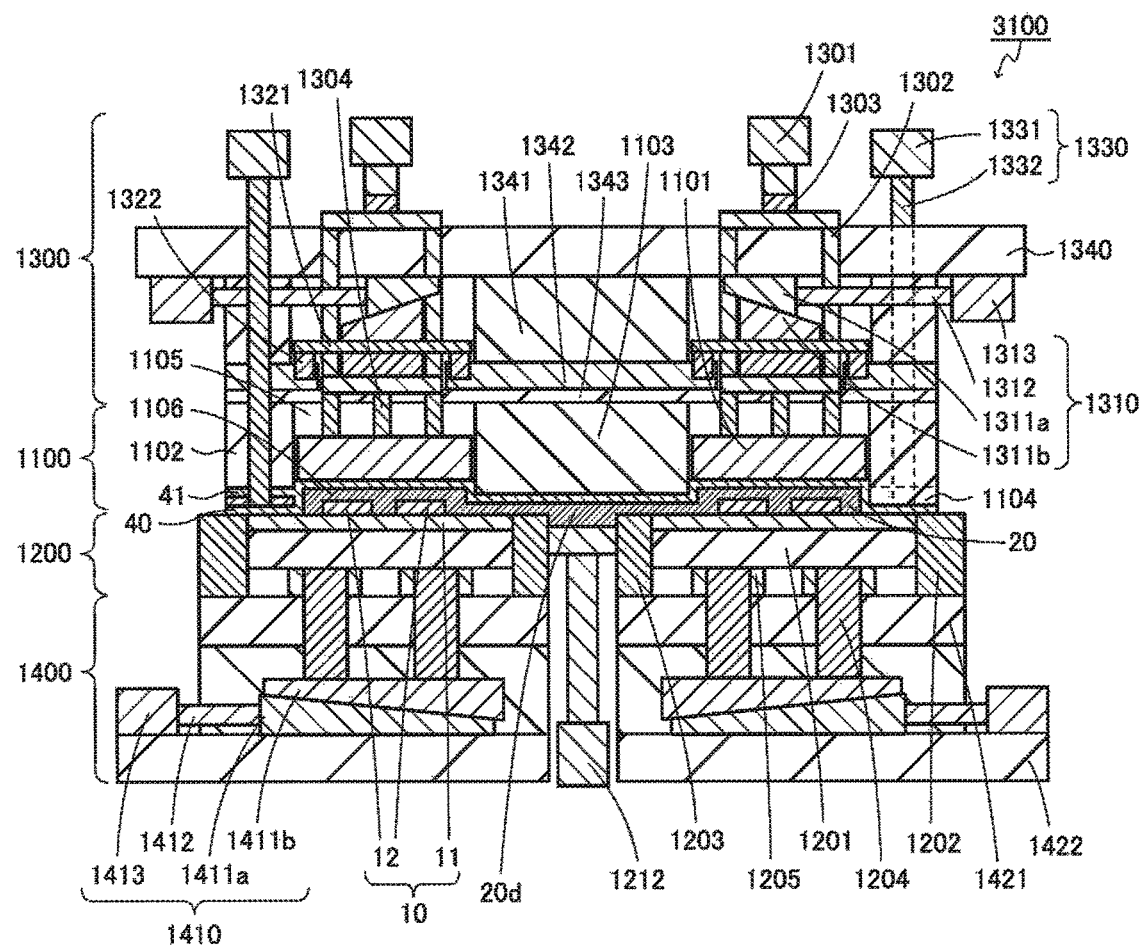
FIG. 21 is a cross-sectional view schematically showing further another process in the same method for manufacturing a resin molded product as in FIG. 2.

Then, as shown in FIG. 21, the molten resin 20b is cured and becomes a cured resin (sealing resin) 20 and a surplus resin (unnecessary resin portion) 20d. The resin molding process can be performed as described above. Moreover, a method of curing the molten resin 20b to obtain the cured resin 20 is not particularly limited. For example, when the molten resin 20b is a thermosetting resin, the molten resin 20b may be cured by further heating. In addition, for example, when the molten resin 20b is a thermoplastic resin, the molten resin 20b may be cured by stopping the heating to the molding mold and allowing the molten resin 20b to cool naturally. Furthermore, as shown in FIGS. 21 to 31, after the molten resin 20b is cured to become the cured resin (sealing resin) 20 and the surplus resin (unnecessary resin portion) 20d, a mold releasing operation (mold releasing process) is performed.

Hereinafter, the mold releasing process shown in FIGS. 21 to 31 is described. First, as shown in FIG. 21, the adsorption of the mold releasing film 40 to the mold surface of the upper mold 1100 is temporarily released (turned off). Here, if the mold releasing film 40 is left adsorbed on the mold surface of the upper mold 1100, the mold surface of the upper mold 1100, the substrate 11 and the cured resin 20 pull the mold releasing film 40 together in the following process. Therefore, in order to avoid the pulling to the mold releasing film 40, the adsorption of the mold releasing film 40 to the mold surface of the upper mold 1100 is temporarily released. If the mold releasing film 40 is pulled together in this way, air may enter from a location where the mold releasing film 40 is stretched or a location where the substrate 11 is floated, and a leak may occur.

Next, as shown by an arrow j2 in FIG. 22, a part of the unnecessary resin portion 20d inside the pot 1211 (hereinafter, may be referred to as a "cut" or a "cut portion") and the plunger 1212 are lowered to a position where the part and the plunger 1212 are in slight contact each other. This position is a position where the plunger 1212 can support the unnecessary resin portion 20d in the pot 1211. In addition, this position can be appropriately changed depending on the type of the cured resin 20 (the resin material 20a) and the like.

Figure 23:
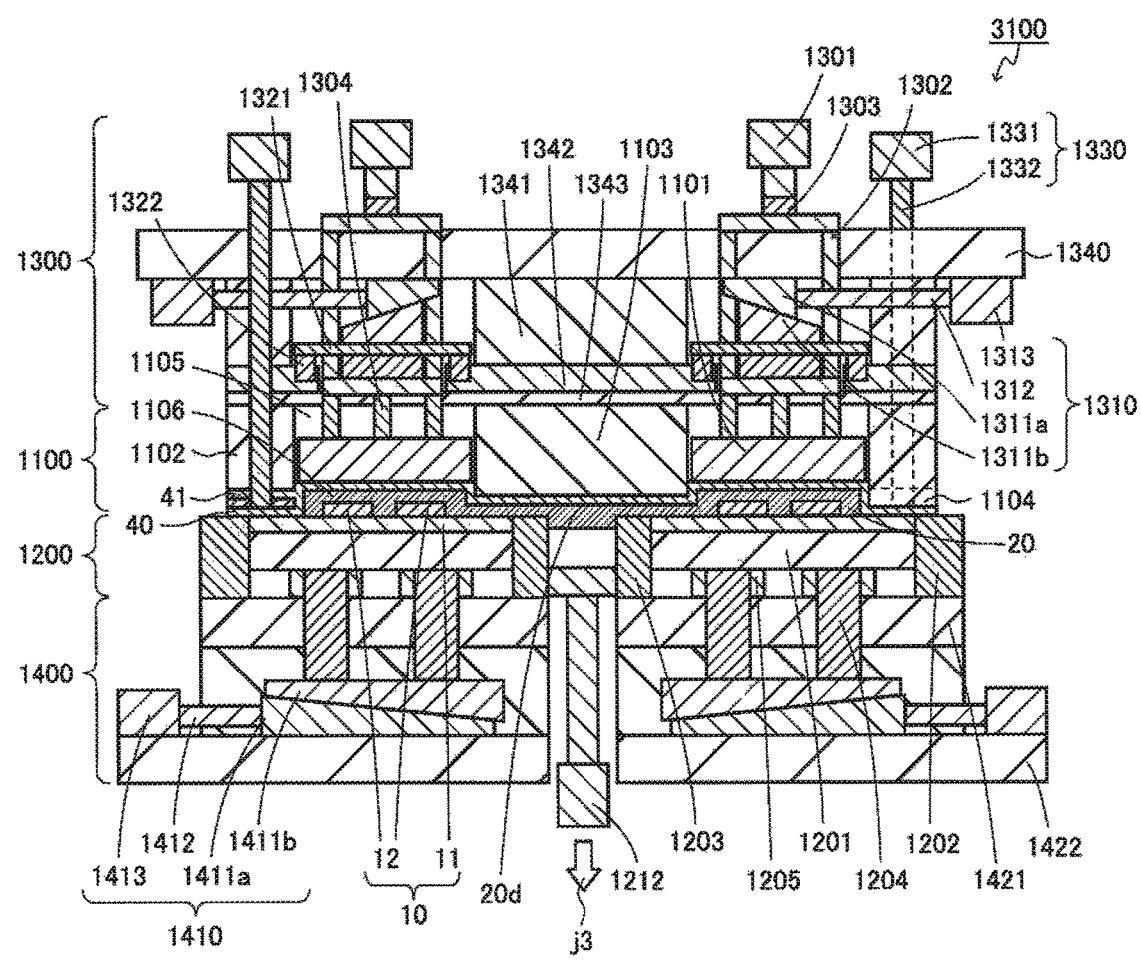
FIG. 23 is a cross-sectional view schematically showing further another process in the same method for manufacturing a resin molded product as in FIG. 2.

Next, as shown by an arrow j3 in FIG. 23, the plunger 1212 is further lowered to a position where the lower mold 1200 can be lowered, and the cut and the plunger 1212 are completely separated from each other.

Figure 22:
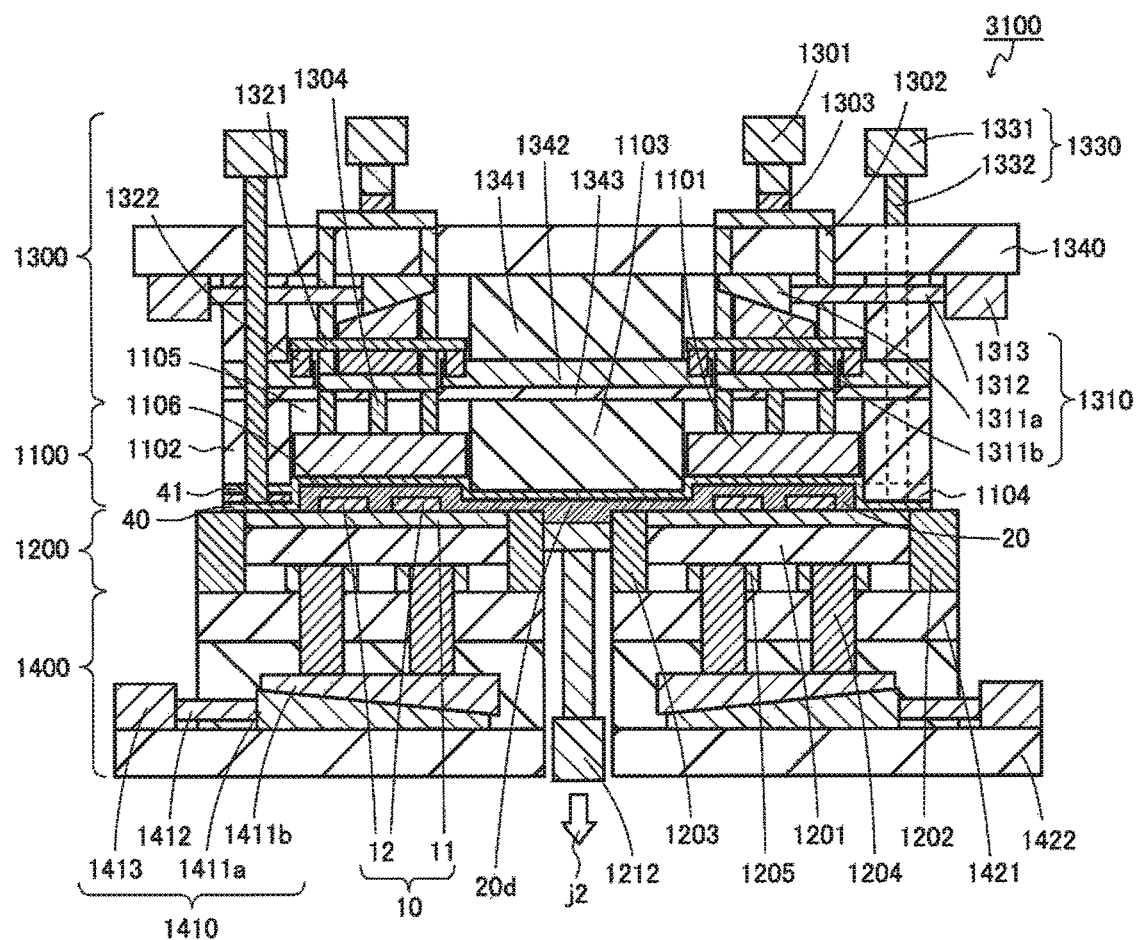
FIG. 22 is a cross-sectional view schematically showing further another process in the same method for manufacturing a resin molded product as in FIG. 2.
Figure 24:
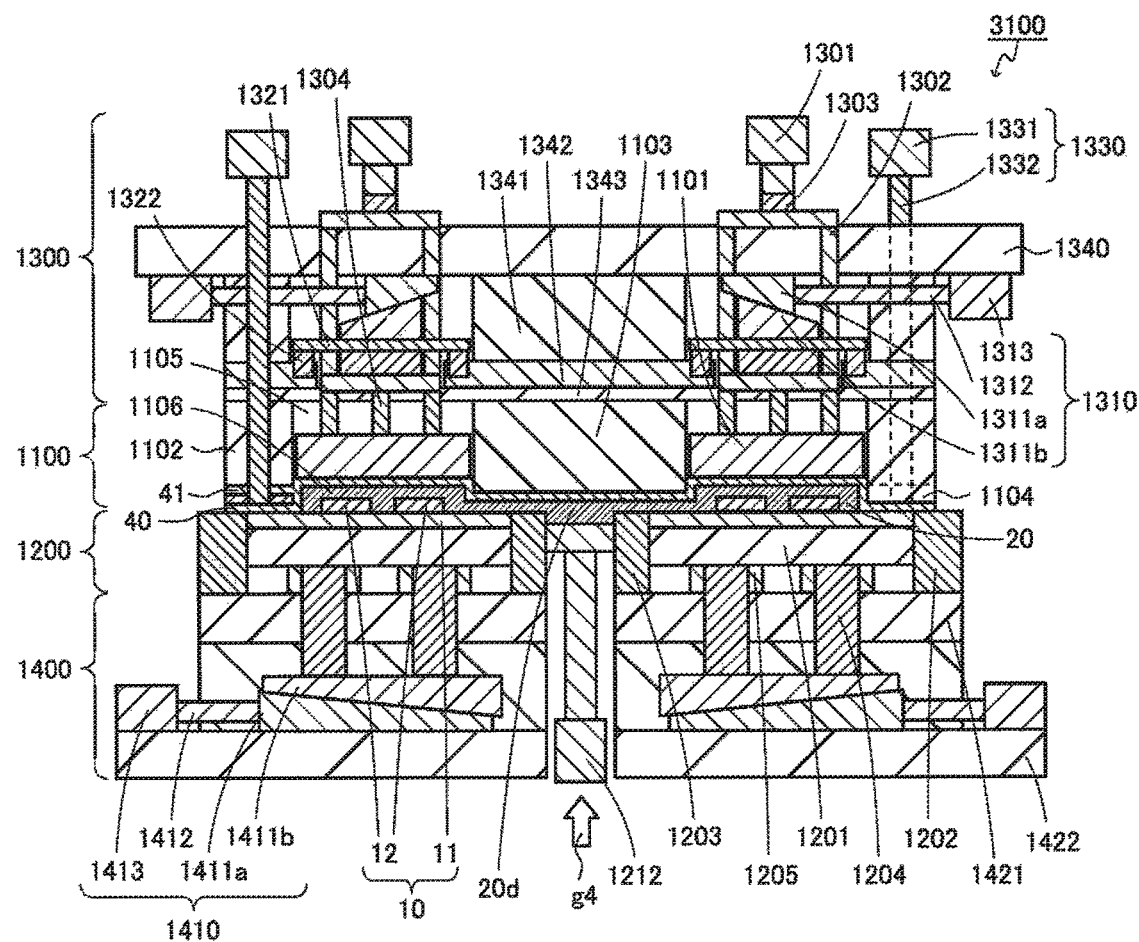
FIG. 24 is a cross-sectional view schematically showing further another process in the same method for manufacturing a resin molded product as in FIG. 2.

Next, as shown by an arrow g4 in FIG. 24, the plunger 1212 is raised again to the same position as in FIG. 22.

Figure 25:
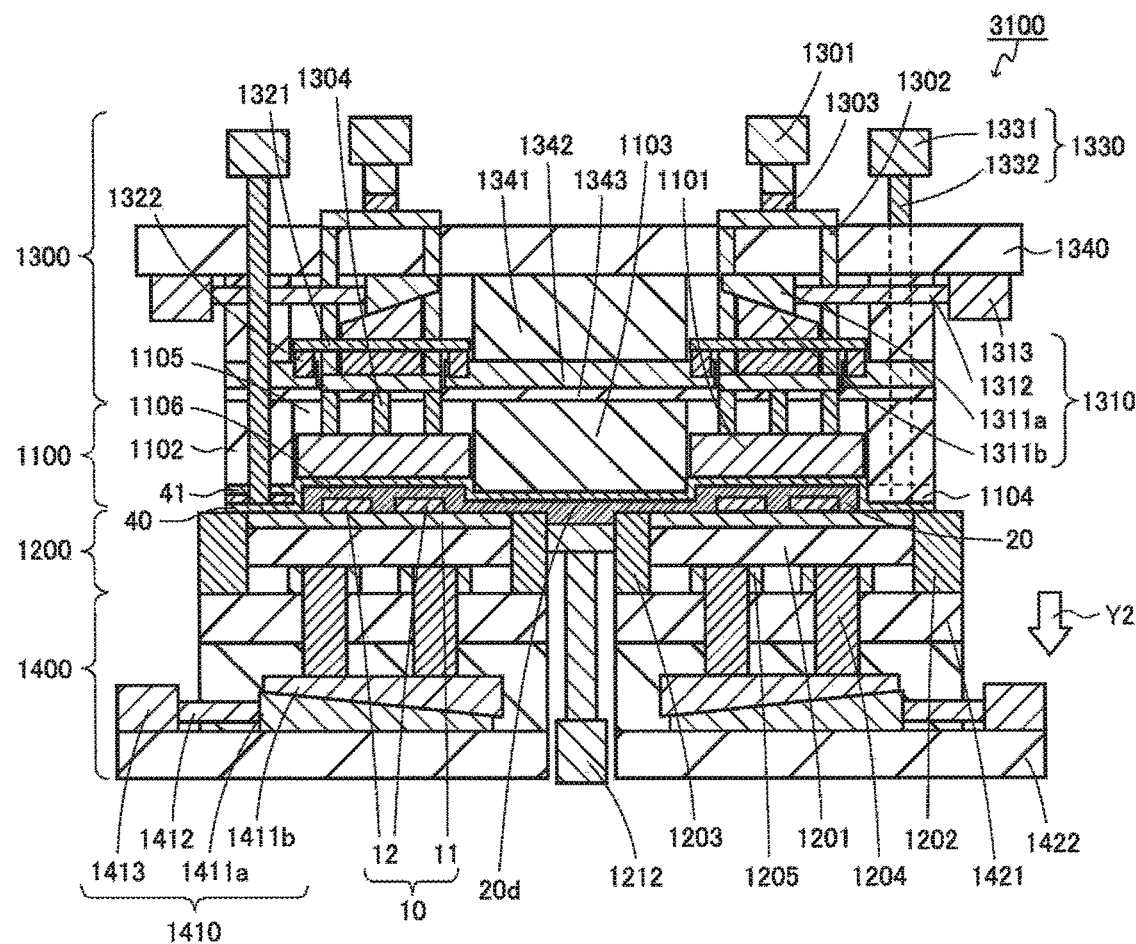
FIG. 25 is a cross-sectional view schematically showing further another process in the same method for manufacturing a resin molded product as in FIG. 2.

Next, as shown by the arrow Y2 in FIG. 25, the lower mold 1200 is lowered and stopped. At this time, the stop position of the lower mold 1200 after the lowering is set to a position immediately before the contracting lower mold elastic member 1205 starts to expand. In addition, at this time, the plunger 1212 is not moved, and the plunger 1212 keeps holding the cut portion of the unnecessary resin portion 20d. The reason is that when the lower mold 1200 and the plunger 1212 are lowered at the same time (at once), there is a risk that a part of the unnecessary resin portion 20d other than the cut portion (hereinafter, may be referred to as a "runner" or a "runner portion") may break.

Figure 26:
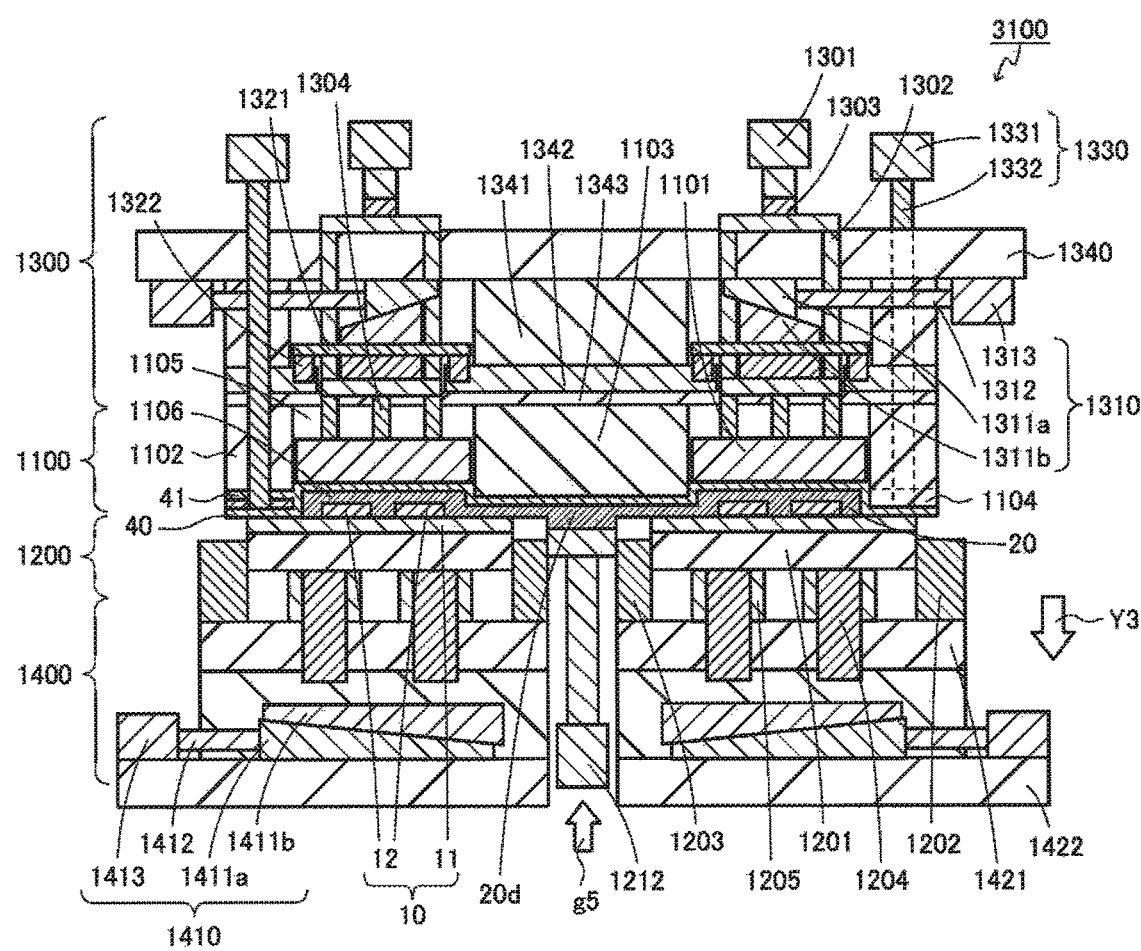
FIG. 26 is a cross-sectional view schematically showing further another process in the same method for manufacturing a resin molded product as in FIG. 2.

Next, as shown by an arrow Y3 in FIG. 26, the lower mold 1200 is further lowered and stopped. At this time, the stop position of the lower mold 1200 after the lowering is set to a position where a clamped state of the substrate between the upper mold cavity frame member 1102 and the lower mold cavity block 1201 is maintained. At this time, as shown by an arrow g5 in the same drawing, the plunger 1212 is raised with respect to the lower mold 1200 and is kept in the same position as in FIG. 22.

Figure 27:
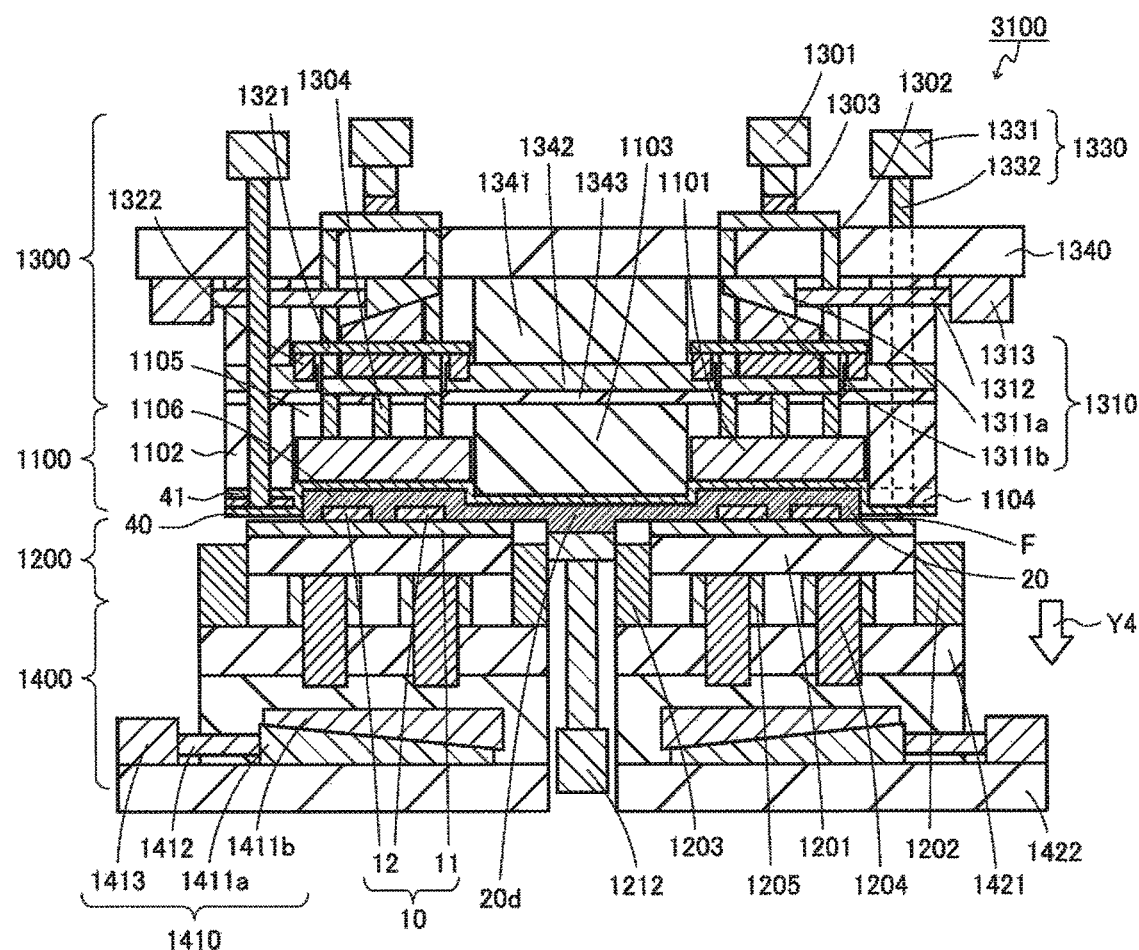
FIG. 27 is a cross-sectional view schematically showing further another process in the same method for manufacturing a resin molded product as in FIG. 2.

Next, as shown by an arrow Y4 in FIG. 27, the lower mold 1200 is further lowered and stopped. At this time, the stop position of the lower mold 1200 after the lowering is set to a distance at which an extremely slight space (gap) F is formed between the mold releasing film 40 and the substrate 11. A width of the space F is a distance at which the substrate 11 can be reabsorbed even if the absorption of the lower mold cavity block 1201 with respect to the substrate 11 is disengaged and the substrate 11 is floated. The width of the space F is not particularly limited, and may be, for example, about 0.1 mm.

Figure 28:
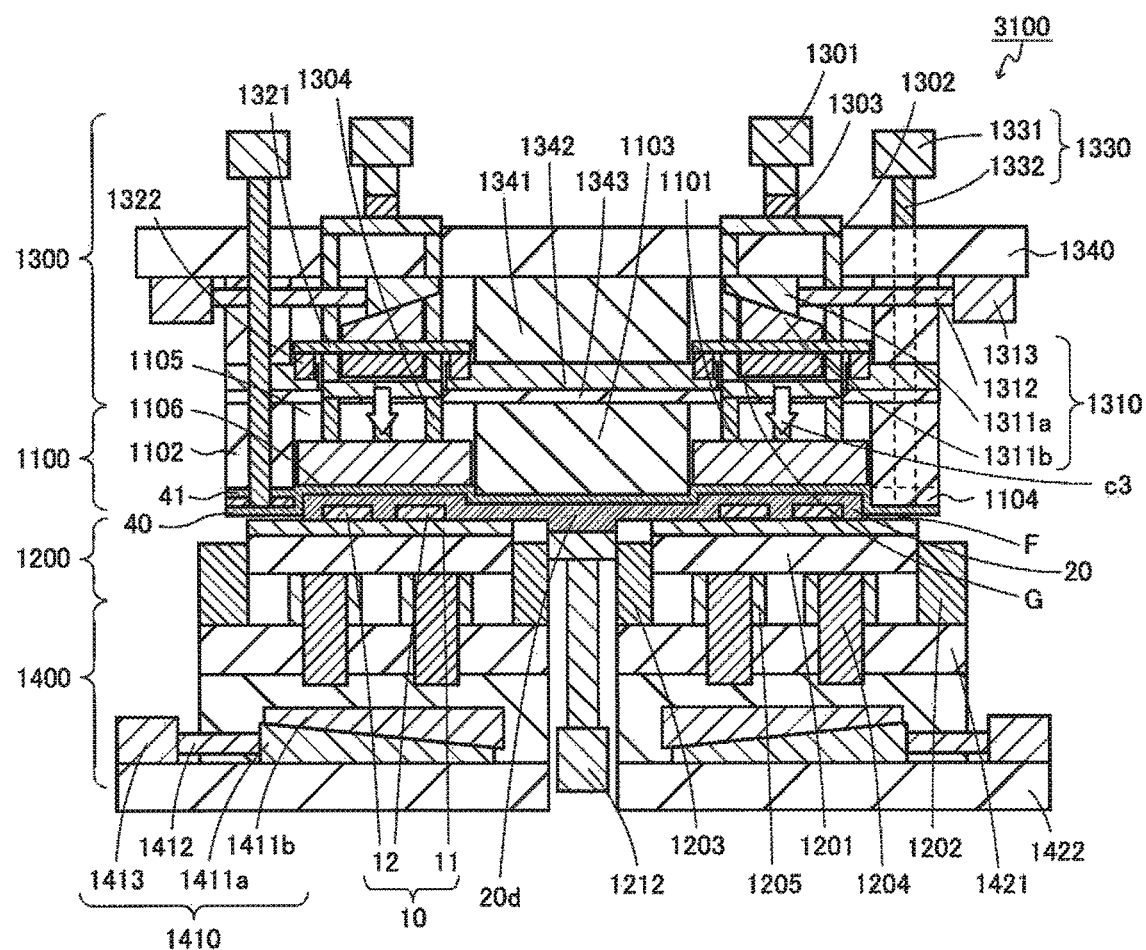
FIG. 28 is a cross-sectional view schematically showing further another process in the same method for manufacturing a resin molded product as in FIG. 2.

Next, as shown by an arrow c3 in FIG. 28, the upper mold cavity block driving mechanism 1301 and the upper mold cavity block 1101 are slightly lowered. Thereby, as shown in the drawing, a slight space (gap) G is formed between the upper mold second wedge member holding member 1321 and the upper mold cavity block holding member 1302. Because the purpose of the space G is to separate the upper mold second wedge member holding member 1321 and the upper mold cavity block holding member 1302 in order to enable the operation of the upper mold wedge mechanism 1310 in the next process (FIG. 29), a slight gap is sufficient. A width of the space G is not particularly limited, and may be, for example, about the same as the space F. Moreover, due to the lowering of the upper mold cavity block 1101 shown by the arrow c3, the cured resin 20 is pressed downward by the upper mold cavity block 1101.

Figure 29:
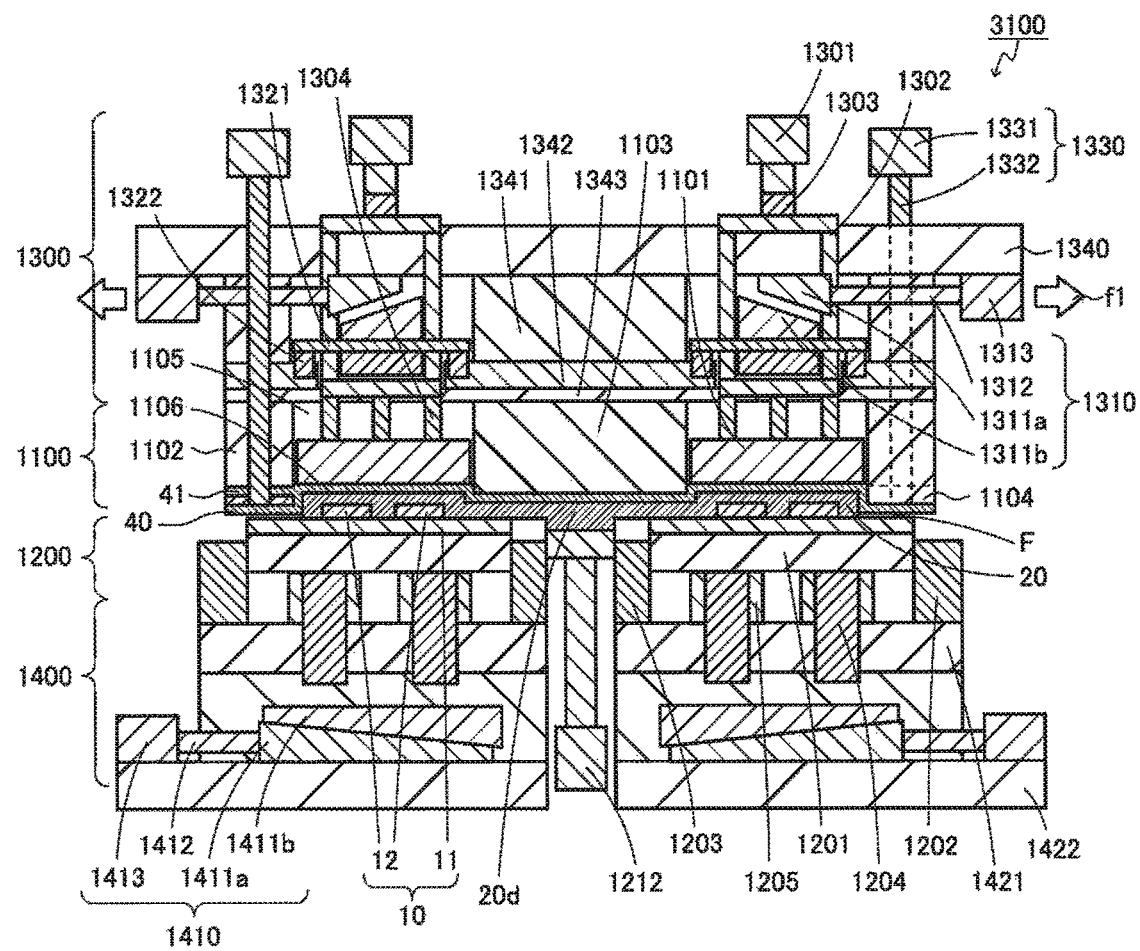
FIG. 29 is a cross-sectional view schematically showing further another process in the same method for manufacturing a resin molded product as in FIG. 2.

Next, as shown by an arrow f1 in FIG. 29, the upper mold first wedge member 1311a is retracted. Thereby, as shown in the drawing, a gap for raising the upper mold cavity block 1101 is formed between the upper mold first wedge member 1311a and the upper mold second wedge member 1311b in the upper mold cotter.

Figure 30:
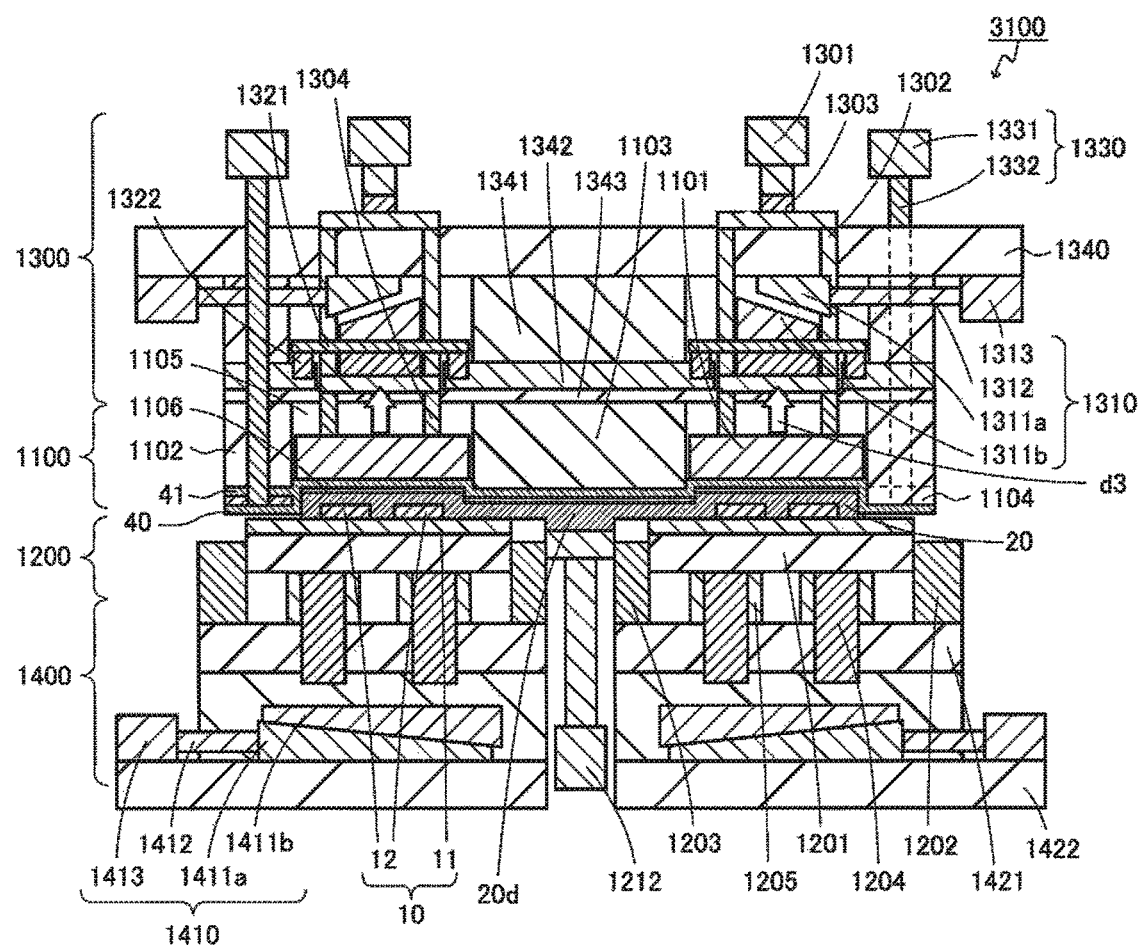
FIG. 30 is a cross-sectional view schematically showing further another process in the same method for manufacturing a resin molded product as in FIG. 2.

Next, as shown in FIG. 30, the mold releasing film 40 is again adsorbed on the mold surface of the upper mold 1100 (the adsorption is turned on). Then, as shown by an arrow d3 in the same drawing, the upper mold cavity block 1101 is raised. Thereby, the mold releasing films 40 and 41 and the upper mold 1100 are mold-released from the cured resin 20 and the substrate 11.

Figure 31:
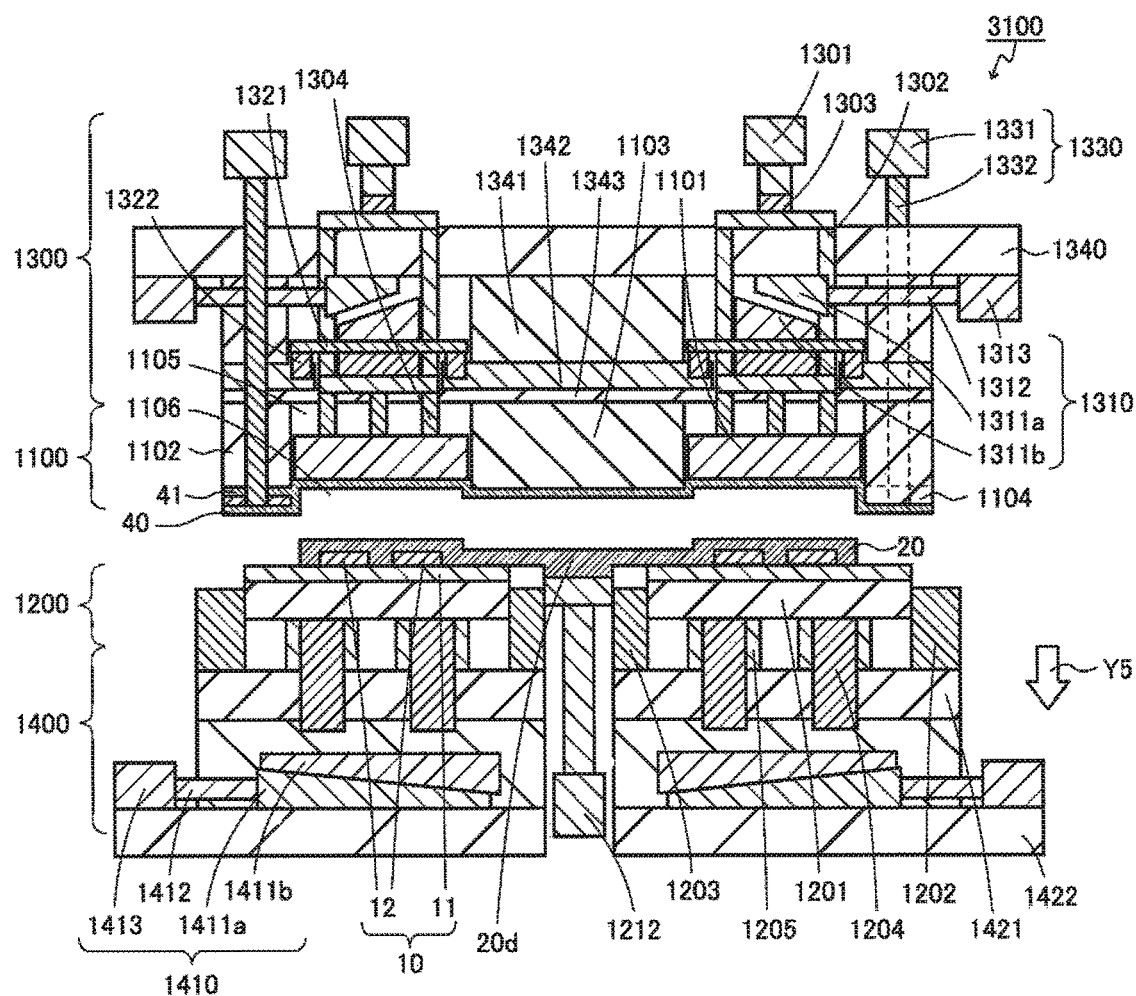
FIG. 31 is a cross-sectional view schematically showing further another process in the same method for manufacturing a resin molded product as in FIG. 2.

Then, as shown by an arrow Y5 in FIG. 31, the lower mold 1200 is further lowered, and the mold releasing films 40 and 41 and the upper mold 1100 are completely separated from the cured resin 20 and the substrate 11. Thereby, mold releasing is completed. In this way, a resin molded product in which the object to be molded 10 (the substrate 11 and the chip 12) is sealed with the cured resin 20 can be manufactured. Thereafter, the resin molded product is carried out of the press portion 3100 of a resin molding apparatus 1000 by an unloader (not shown) or the like and collected.

In the embodiment, an example has been described in which the depth (the package thickness) of the upper mold cavity 1106 is increased to fill the resin, and then the depth of the upper mold cavity 1106 is reduced. If the depth of the upper mold cavity 1106 is small from the beginning, a gap between the chip 12 and the mold releasing film 40 becomes narrow, and the resin may be less likely to be filled in the gap (above the chip 12). In addition, for example, when the method for mounting the chip is wire bonding, a wire flow may occur. Thus, if first the depth of the upper mold cavity 1106 is increased to fill the resin and then the depth of the upper mold cavity 1106 is reduced as in the embodiment, the resin is easily filled above the tip 12.

In the present invention, for example, as described in the embodiment, the position of the one mold cavity block can be changed according to the thickness of the object to be molded. Thereby, because the depth of the one mold cavity can be changed, a molding problem can be suppressed or prevented even if the thickness of the object to be molded varies. Specifically, according to the present invention, for example, a resin leakage caused by too loose clamping of the molding mold (the depth of the one mold cavity is too large with respect to the thickness of the object to be molded) can be suppressed or prevented. On the contrary, according to the present invention, for example, a damage of the object to be molded caused by excessive clamping of the molding mold (the depth of the one mold cavity is too small with respect to the thickness of the object to be molded) can be suppressed or prevented. Thereby, in the present invention, because the occurrence of defects in the resin molded product can be suppressed or prevented, the resin molded product can be manufactured with a high yield.

Furthermore, in the present invention, for example, as described in the embodiment, resin molding can be performed by changing the depth of the one mold cavity using the one mold wedge mechanism and the one mold cavity block driving mechanism. Thereby, a molding problem can be suppressed or prevented even if the thickness of the object to be molded varies. Specifically, for example, if the depth of the upper mold cavity 1106 is increased to fill the resin and then the depth of the upper mold cavity 1106 is reduced as described in the embodiment, the resin is easily filled above the tip 12. Thereby, a molding problem can be suppressed or prevented even if the thicknesses of the substrate (the object to be molded) 11 and the chip 12 vary.

Moreover, for example, the one mold wedge mechanism may be used for a position change of the one mold cavity block. In addition, for the position change, for example, as described in the embodiment, the one mold cavity block driving mechanism, the other mold wedge mechanism, or the like may be used, if necessary.

In addition, according to the present invention, as described above, in a state that the height position of the one mold cavity block is set using the one mold cavity block driving mechanism and the position in the direction away from the other mold in the one mold cavity block having been moved to the set height position is fixed to be limited using the one mold wedge mechanism, the mold releasing operation can be performed using the one mold wedge mechanism and the one mold cavity block driving mechanism. Thereby, a problem in the mold releasing operation can be suppressed or prevented even if the thickness of the object to be molded varies.

In addition, for example, when the mold is simply opened after the resin molding, as described above, the mold surface of the one mold and the resin molded product may pull the mold releasing film together. Then, air may enter from the location where the mold releasing film is stretched or the location where the resin molded product is floated, and a leak may occur. The problem becomes particularly remarkable when the thickness of the object to be molded varies, when the mold releasing film has slight adhesiveness, and the like. In addition, because a strength of the cured resin is low immediately after the resin molding, the cured resin may be deformed by being pulled by the mold releasing film. Similarly, in the case of a thin resin molded product, because the substrate is thin, the substrate may be deformed by being pulled by the mold releasing film. Thus, once the adsorption of the mold releasing film is released (OFF), if the mold releasing operation is performed using the one mold wedge mechanism and the one mold cavity block driving mechanism to adsorb the mold releasing film on the mold surface of the one mold cavity again as in the embodiment, the problem can be solved.

Moreover, in the embodiment, an example in which the upper mold cavity (the one mold cavity) 1106 is covered with the mold releasing film 40 to perform the resin molding has been described. However, the present invention is not limited thereto, and the mold releasing film may not be used. When the mold releasing film is not used, for example, in order to facilitate the release of the molded resin from the one mold cavity, an ejector pin or the like for mold releasing may be arranged on the one mold (the upper mold 1100 in the embodiment).

In addition, the method for manufacturing a resin molded product of the present invention is not limited to the method described with reference to FIGS. 2 to 31. For example, although an example of the transfer molding has been shown in FIGS. 2 to 31, in the present invention, any other resin molding method such as compression molding or the like can be used. In addition, the method of transfer molding is not limited to the method shown in FIGS. 2 to 31 either, and is arbitrary.

In addition, the present invention is not limited to the embodiment, and any modification is possible. For example, in the embodiment, the "one mold" is an upper mold and the "other mold" is a lower mold. However, the present invention is not limited thereto, and for example, conversely, the "one mold" may be a lower mold and the "other mold" may be an upper mold.

FIGS. 1 to 31 and 54 mainly described the press portion 3100 of the resin molding apparatus, but the resin molding apparatus may include any constituent element other than the press portion 3100. A plan view of FIG. 56 shows an example of an overall configuration of the resin molding apparatus including the press portion 3100.

As shown in the drawing, the resin molding apparatus 1000 includes, as respective constituent elements, a supply module 2000 for supplying an object to be molded 10 before resin sealing (hereinafter, referred to as "unsealed substrate 10") and the resin tablet 20a, two resin molding modules 3000A and 3000B as an example for resin molding, and a carry-out module 4000 for carrying out the resin molded product. The carry-out module 4000 has an accommodating portion 4100 for accommodating a resin molded product after molding. Moreover, the supply module 2000, the resin molding modules 3000A and 3000B, and the carry-out module 4000, which are constituent elements, can be respectively attached to and detached from other constituent elements, and can be replaced.

In addition, the resin molding apparatus 1000 includes a conveying mechanism 5000 (hereinafter, referred to as "loader 5000") that conveys the unsealed substrate 10 and the resin tablet 20a supplied by the supply module 2000 to the resin molding modules 3000A and 3000B, and a conveying mechanism 6000 (hereinafter, referred to as "unloader 6000") that conveys the resin molded product resin-molded by the resin molding modules 3000A and 3000B to the carry-out module 4000.

Figure 56:
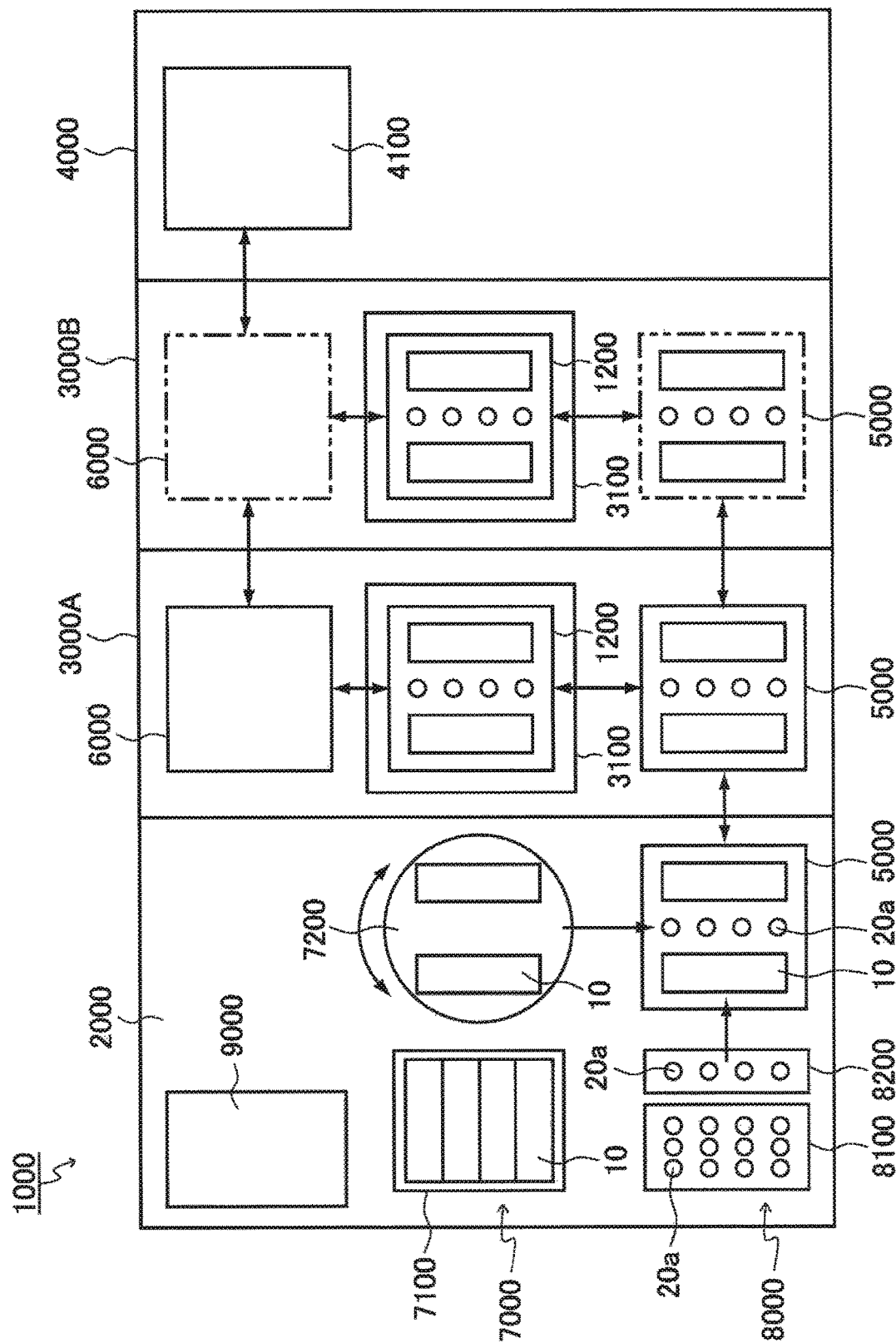
FIG. 56 is a plan view showing an example of an overall configuration of the resin molding apparatus of the present invention.

The supply module 2000 in FIG. 56 is obtained by integrating a substrate supply module 7000 and a resin supply module 8000.

The substrate supply module 7000 has a substrate delivery portion 7100 and a substrate supply portion 7200. The substrate delivery portion 7100 sends out the unsealed substrate 10 in a magazine to a substrate alignment portion. The substrate supply portion 7200 receives the unsealed substrate 10 from the substrate delivery portion 7100, aligns the received unsealed substrate 10 in a predetermined direction, and transfers the received unsealed substrate 10 to the loader 5000.

The resin supply module 8000 has a resin delivery portion 8100 and a resin supply portion 8200. The resin delivery portion 8100 receives the resin tablet 20a from a stocker (not shown) that stocks the resin tablet 20a, and sends the resin tablet 20a to the resin supply portion 8200. The resin supply portion 8200 receives the resin tablet 20a from the resin delivery portion 8100, aligns the received resin tablet 20a in a predetermined direction, and transfers the received resin tablet 20a to the loader 5000.

Each of the resin molding modules 3000A and 3000B has the press portion 3100. As described with reference to FIGS. 1 to 21, each press portion 3100 has the lower mold 1200 which is a molding mold that can be raised and lowered and the upper mold 1100 which is a molding mold fixed above the lower mold 1200 in a manner of facing each other, and further has a mold clamping mechanism for clamping or opening the lower mold 1200 and the upper mold 1100. Moreover, the mold clamping mechanism is not particularly limited, and for example, a linear motion type that uses a ball screw mechanism that converts the rotation of a servomotor or the like into a linear movement and transmits the movement to the molding mold, and a link type that uses a link mechanism such as a toggle link to transmit a power source of a servomotor or the like to the molding mold can be used. In addition, a clamp pressure detection portion (not shown) for detecting a clamp pressure generated at the time of clamping of the lower mold 1200 and the upper mold 1100 may be arranged in the mold clamping mechanism. The clamp pressure detection portion is not particularly limited, and may be, for example, a strain gauge, a load cell, or a pressure sensor. A clamp pressure signal detected by the clamp pressure detection portion is transmitted to a control portion 9000 in FIG. 56.

As described with reference to FIG. 6, the unsealed substrate 10 conveyed by the loader 5000 is mounted on the lower mold cavity block 1201 of the lower mold 1200. In addition, as described with reference to FIG. 6, the resin tablet 20a conveyed by the loader 5000 is supplied to the pot 1211 of the lower model 1200. Moreover, the number of the pot 1211 is not limited, and for example, there may be one pot or a plurality of pots.

In addition, as described above, the plunger 1212 that can move up and down in the pot 1211 is arranged in the lower model 1200. The plunger 1212 can be moved up and down by, for example, a plunger driving mechanism (not shown). The plunger driving mechanism is not particularly limited, and for example, a combination of a servomotor and a ball screw mechanism, a combination of an air cylinder or a hydraulic cylinder and a rod, or other driving mechanisms can be used. A transfer pressure detection portion (not shown) that detects a transfer pressure of the resin caused by the plunger driving mechanism is arranged in the plunger driving mechanism. More specifically, the transfer pressure is a pressure applied to the plunger 1212 when the molten resin obtained by heating and melting the resin tablet 20a in the pot 1211 is pressed by the plunger 1212. The transfer pressure detection portion is not particularly limited, and may be, for example, a strain gauge, a load cell, a pressure sensor, or the like. A transfer pressure signal detected by the transfer pressure detection portion is transmitted to the control portion 9000.

Additionally, a heating portion (not shown) such as a heater or the like is embedded in each of the upper mold 1100 and the lower mold 1200. The upper mold 1100 and the lower mold 1200 are heated by the heating portion. A heating temperature is not particularly limited, and may be, for example, about 180° C.

Moreover, the overall configuration of the resin molding apparatus shown in FIG. 56 is an example, and the present invention is not limited thereto. For example, in the embodiment, the overall configuration of the resin molding apparatus may be the same as or different from that shown in FIG. 56. The same applies to other embodiments.

Embodiment 2

Next, another embodiment of the present invention is described.

In the embodiment, another example of the method for manufacturing a resin molded product of the present invention, which is different from Embodiment 1, is described. Specifically, an example is shown in which the depth (the package thickness) of the upper mold cavity 1106 is made smaller to fill resin, and then the depth of the upper mold cavity 1106 is increased. Moreover, the method for manufacturing a resin molded product in the embodiment is performed using the same resin molding apparatus 1000 and press portion 3100 thereof as in Embodiment 1 (FIG. 1).

The method for manufacturing a resin molded product in the embodiment can be performed as follows.

First, the processes shown in FIGS. 2 to 21 are performed in the same manner as in Embodiment 1.

Figure 32:
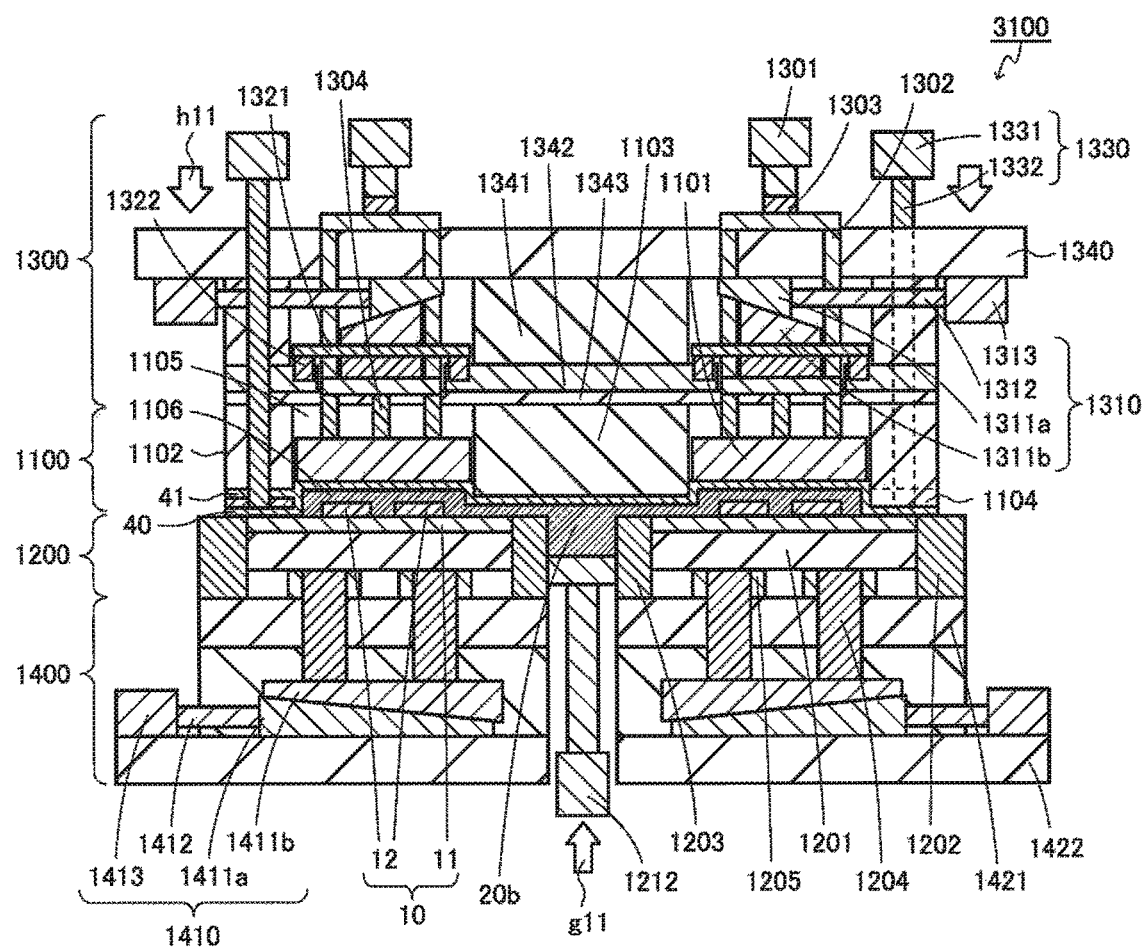
FIG. 32 is a cross-sectional view schematically showing one process in another example of the method for manufacturing a resin molded product using the resin molding apparatus in FIG. 1.

Next, as shown by an arrow g11 in FIG. 32, the plunger 1212 is further raised, and the inside of the upper mold cavity 1106 is substantially filled with the molten resin 20b. More specifically, first, as shown in FIG. 32, the air vent pin 1332 is pushed downward (in a direction of an arrow h11) by the air vent pin power mechanism 1331 to block the air vent groove 1104. Thereafter, as shown in the same drawing, the plunger 1212 is further raised in the direction of the arrow g11. Thereby, the inside of the upper mold cavity 1106 is substantially filled with the molten resin 20b. At this time, the upper mold cavity block 1101 is fixed using the upper mold wedge mechanism 1310 (the one mold cavity block second fixing process). Furthermore, the lower mold cavity block 1201 is fixed using the lower mold wedge mechanism 1410. By fixing the upper mold cavity block 1101 and the lower mold cavity block 1201 in this way, even if a resin pressure is applied to the inside of the upper mold cavity 1106, the upper mold cavity block 1101 and the lower mold cavity block 1201 can be suppressed or prevented from moving in the mold opening/closing direction.

Moreover, as for the operation of the air vent pin 1332, in the description of FIG. 32, immediately after the plunger 1212 is moved upward (in the direction of the arrow g11), the air vent pin 1332 is pushed downward (in the direction of the arrow h11), but the operation of the air vent pin 1332 is not limited thereto. Specifically, for example, a timing of pushing the air vent pin 1332 downward (in the direction of the arrow h11) may be at any time after moving the plunger 1212 upward (in the direction of the arrow g11) and before opening the mold by lowering the lower mold 1200. Furthermore, depending on the resin material used for resin molding, it may be not necessary to perform an air vent operation by the air vent pin power mechanism 1331, the air vent pin 1332, and the air vent groove 1104.

Furthermore, as shown in FIGS. 33 to 37, resin molding is performed in a manner of changing the depth of the upper mold cavity 1106 using the upper mold wedge mechanism 1310 and the upper mold cavity block driving mechanism 1301 (the resin molding process).

Figure 33:
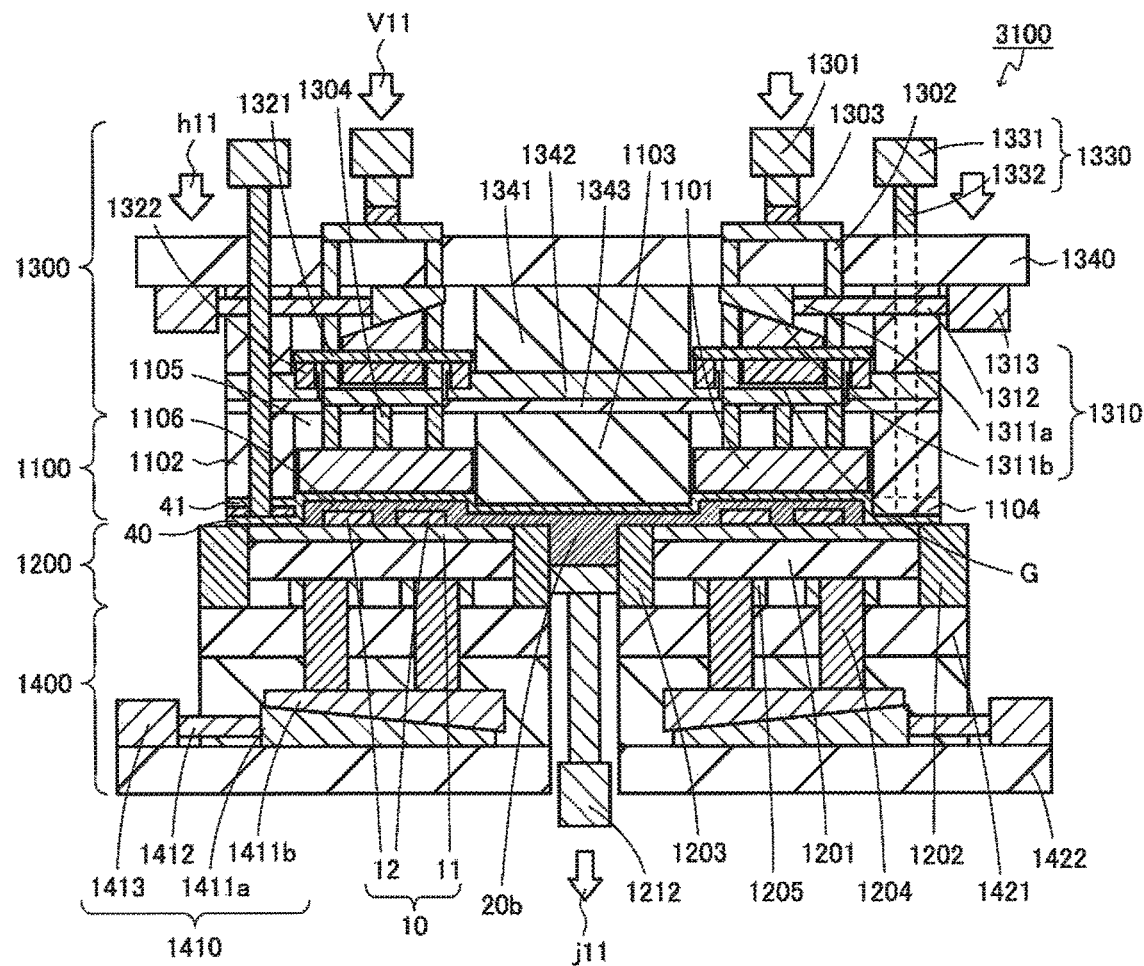
FIG. 33 is a cross-sectional view schematically showing another process in the same method for manufacturing a resin molded product as in FIG. 32.

As shown by an arrow j11 in FIG. 33, the plunger 1212 is slightly lowered. Thereafter, the upper mold cavity block driving mechanism 1301 and the upper mold cavity block 1101 are lowered in a direction of an arrow V11. Thereby, as shown in the drawing, a slight space (gap) G is formed between the upper mold second wedge member holding member 1321 and the upper mold cavity block holding member 1302. Because the purpose of the space G is to separate the upper mold second wedge member holding member 1321 and the upper mold cavity block holding member 1302 in order to enable the operation of the upper mold wedge mechanism 1310 in the next process (FIG. 34), a slight gap is sufficient. Moreover, an example in which the upper mold cavity block driving mechanism 1301 and the upper mold cavity block 1101 are lowered (the arrow V11) after the plunger 1212 is lowered (the arrow j11) has been described, but the order of these operations is not particularly limited, and may be, for example, simultaneous. In addition, an example in which the upper mold cavity block driving mechanism 1301 and the upper mold cavity block 1101 are lowered (the arrow V11) once after the plunger 1212 is lowered (the arrow j11) has been described, but the number of times of the lowering is not particularly limited, and the lowering may be repeated a plurality of times.

Figure 34:
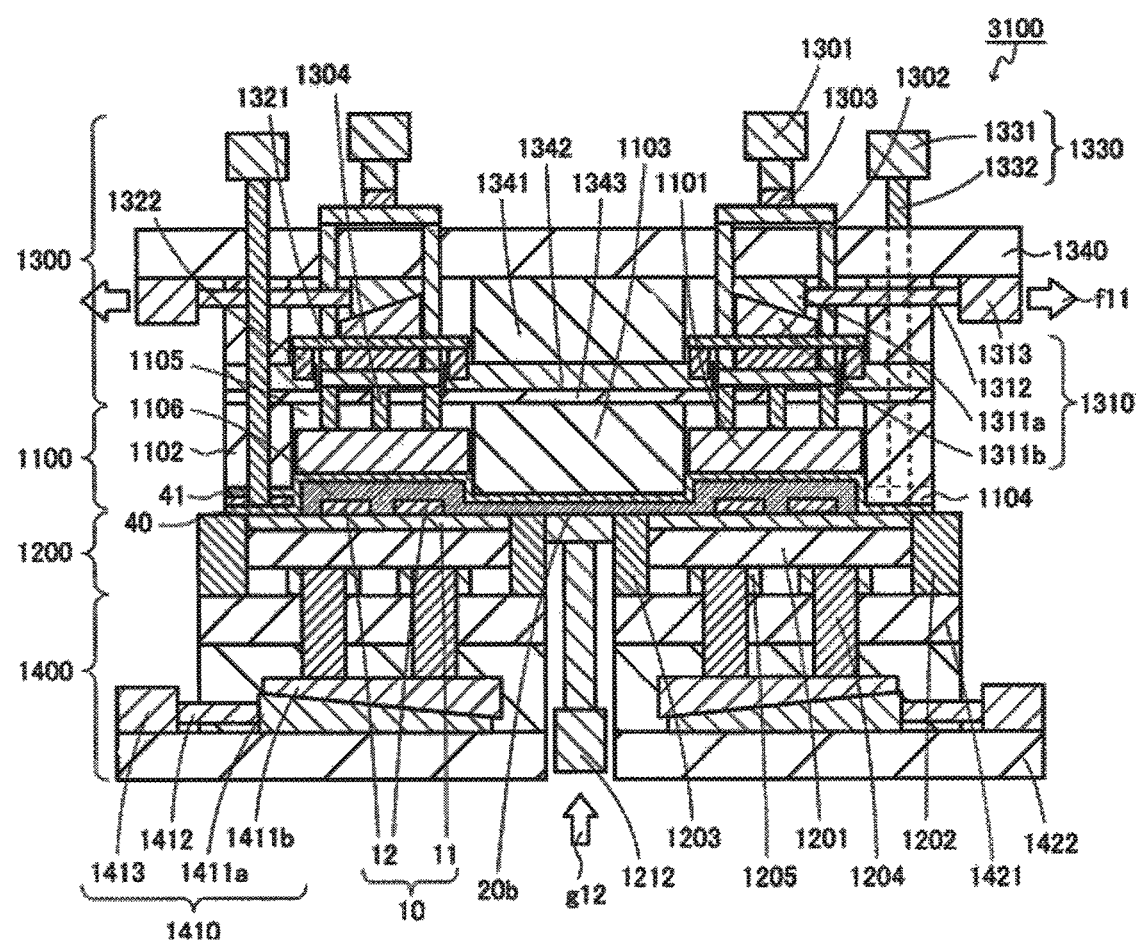
FIG. 34 is a cross-sectional view schematically showing further another process in the same method for manufacturing a resin molded product as in FIG. 32.

Next, as shown by an arrow g12 in FIG. 34, the plunger 1212 is moved upward to push the molten resin 20b in the pot 1211 into the upper mold cavity 1106. Thereby, as shown in the drawing, the depth (the package thickness) of the upper mold cavity 1106 is increased. Thereby, as shown in the drawing, the upper mold cavity block 1101 is raised, and the upper mold second wedge member holding member 1321 is pushed up. As a result, as shown by an arrow f11 in FIG. 34, the upper mold first wedge member 1311a is retracted, and the length of the upper mold cotter (the upper mold first wedge member 1311a and the upper mold second wedge member 1311b) in the thickness direction is reduced.

Figure 35:
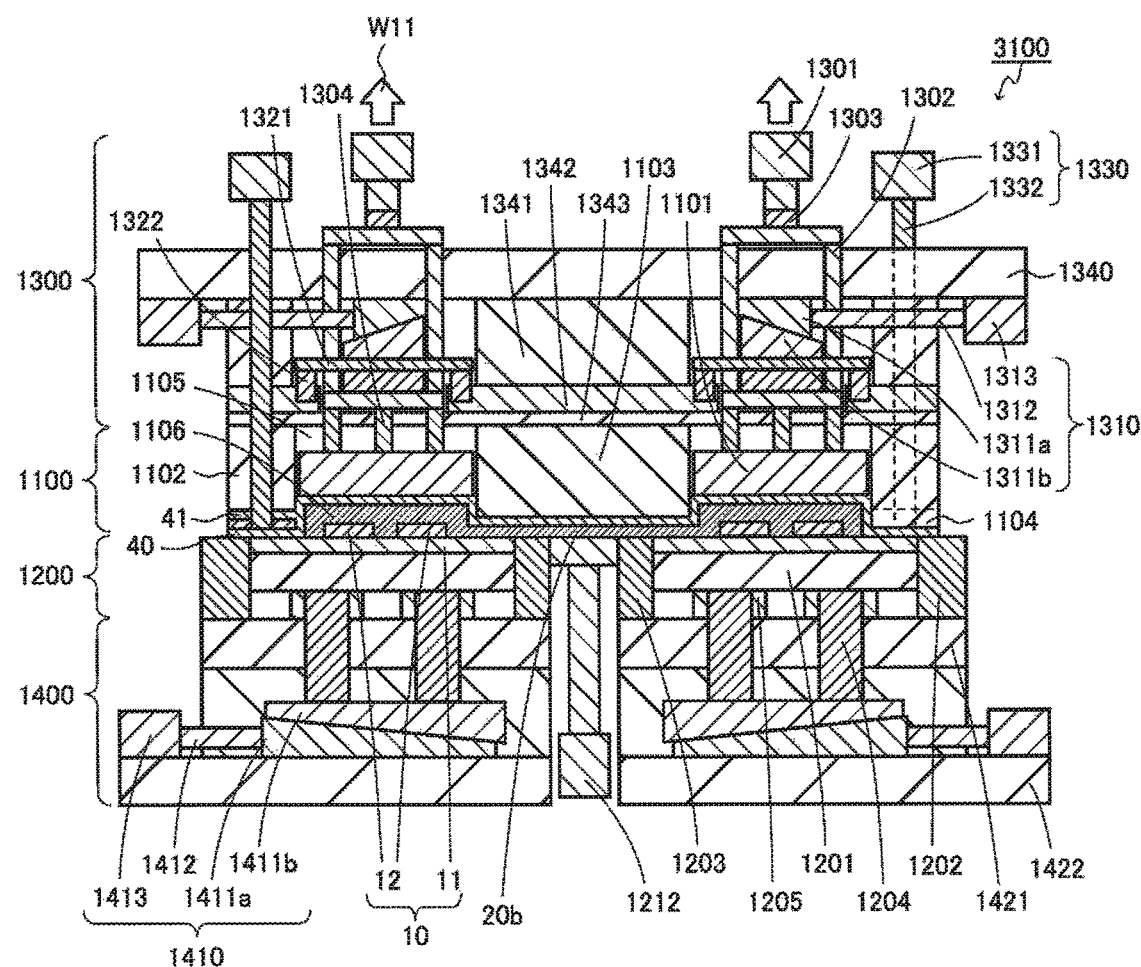
FIG. 35 is a cross-sectional view schematically showing further another process in the same method for manufacturing a resin molded product as in FIG. 32.

Next, as shown by an arrow W11 in FIG. 35, an upward force is applied to the upper mold cavity block driving mechanism 1301. Thereby, the upper mold cavity block 1101 is fixed at a position shown in the drawing, which is a preset height position. Moreover, here, the upper mold cavity block 1101 can also be fixed at the position shown in the drawing without applying an upward force to the upper mold cavity block driving mechanism 1301. The preset height position in the resin molding process described here is a height position different from the preset height position in the fixing process of the one mold cavity block described above (see FIGS. 2 to 4).

Figure 36:
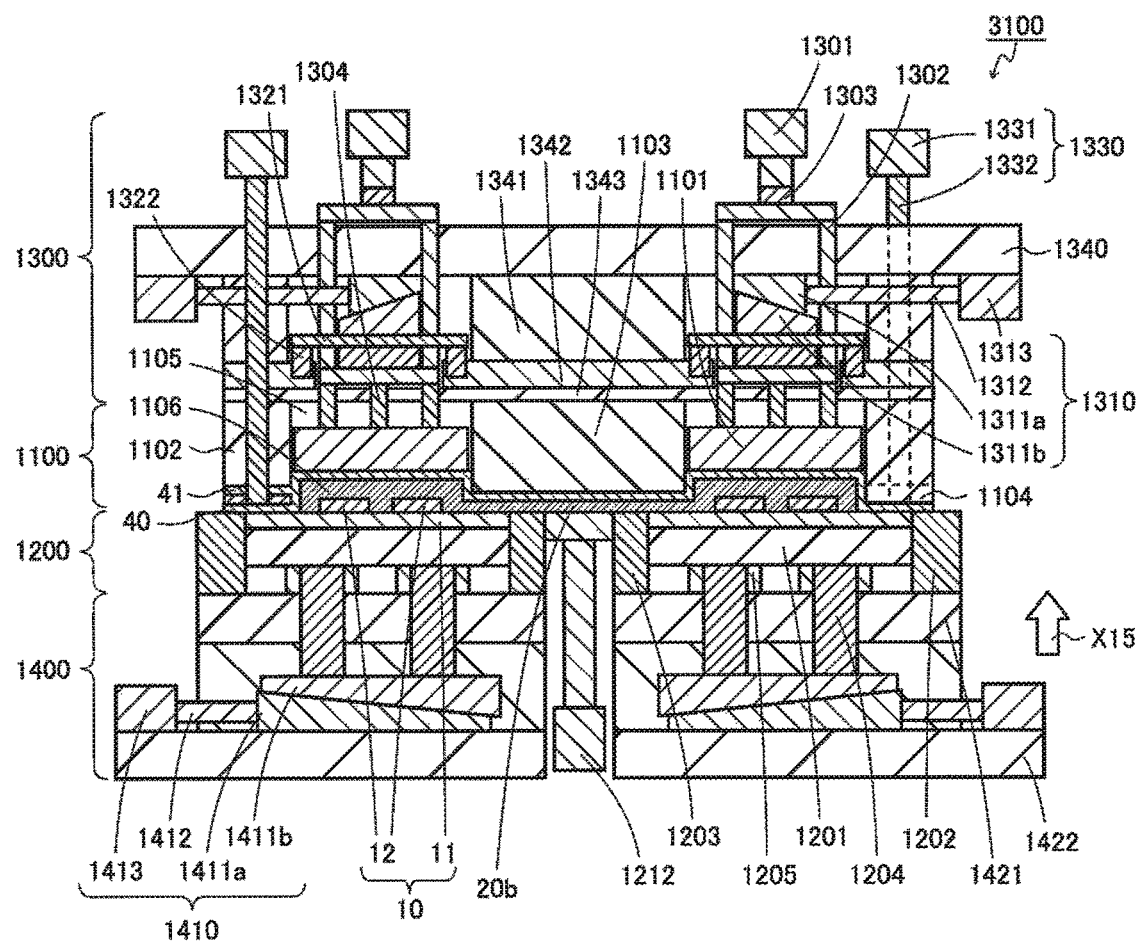
FIG. 36 is a cross-sectional view schematically showing further another process in the same method for manufacturing a resin molded product as in FIG. 32.

Next, as shown by an arrow X15 in FIG. 36, an upward force is applied to the lower mold 1200. Thereby, a clamping force with respect to the substrate 11 is maximized, and the lower mold 1200 is stopped. Hereinafter, the position of the lower mold 1200 may be referred to as "secondary clamp position". Moreover, at this time, the plunger 1212 does not move.

Figure 37:
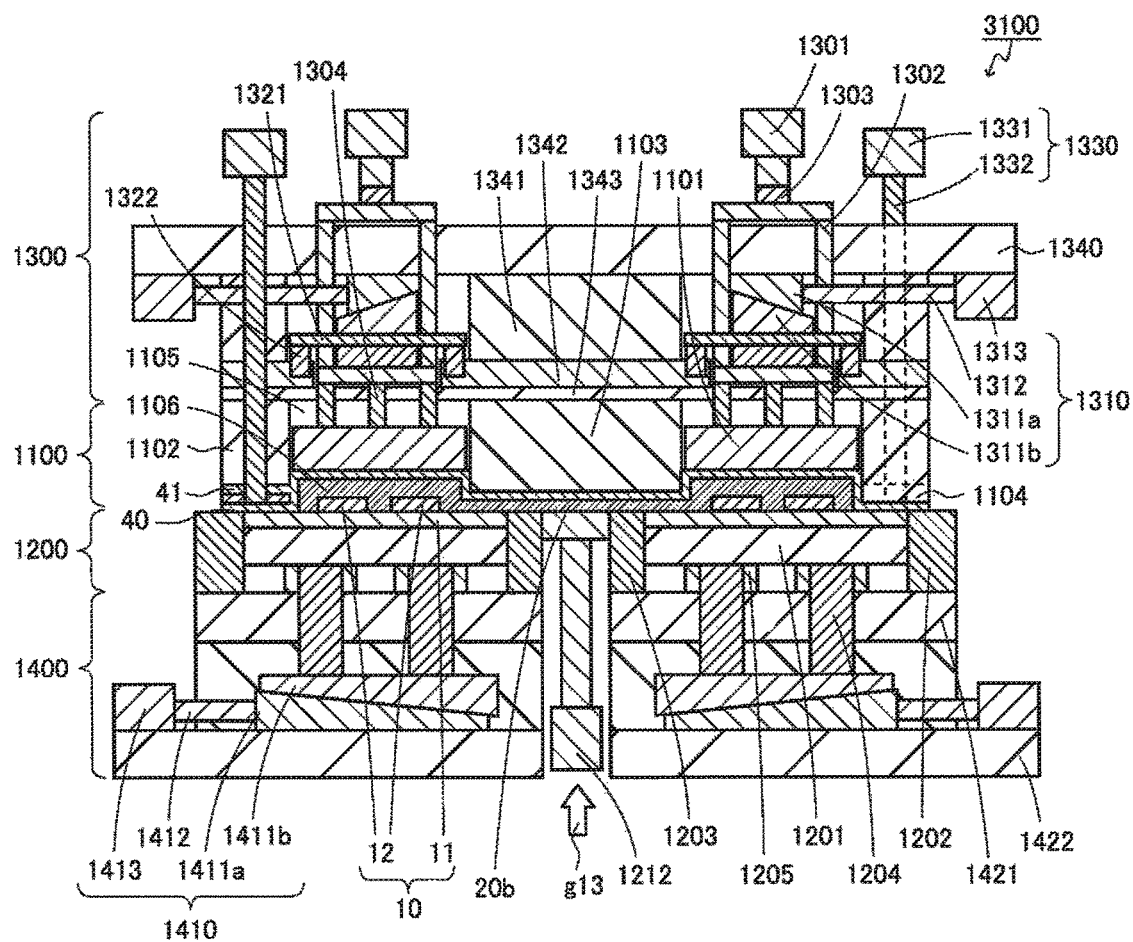
FIG. 37 is a cross-sectional view schematically showing further another process in the same method for manufacturing a resin molded product as in FIG. 32.

Furthermore, as shown by an arrow g13 in FIG. 37, the plunger 1212 is raised until the pressure applied to the molten resin 20b reaches a predetermined pressure. Moreover, in the embodiment, the operation of FIG. 37 is performed after the operation of FIG. 36. However, the operation of FIG. 36 and the operation of FIG. 37 may be performed at the same time.

Furthermore, similarly to Embodiment 1, the molten resin 20b is cured to obtain the cured resin (the sealing resin) and the surplus resin (the unnecessary resin portion). The resin molding process can be performed as described above. Then, thereafter, the mold is opened to perform mold-releasing (the mold releasing process) in the same manner as in FIGS. 21 to 31, and the manufactured resin molded product is carried out of the press portion 3100 of the resin molding apparatus 1000 by an unloader or the like and collected (not shown). As described above, a resin molded product in which the object to be molded 10 is sealed with the cured resin 20 can be manufactured.

Figure 55:
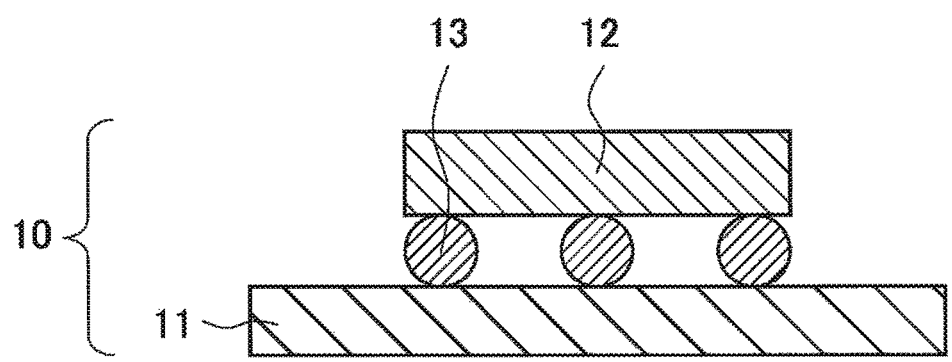
FIG. 55 is a cross-sectional view schematically showing an example of an object to be molded in the resin molding apparatus and the method for manufacturing a resin molded product of the present invention.

In the embodiment, an example has been shown in which the depth (the package thickness) of the upper mold cavity 1106 is made smaller to fill resin, and then the depth of the upper mold cavity 1106 is increased. The method is particularly effective when, for example, there is a gap between the substrate 11 and the chip 12. FIG. 55 shows an example of this object to be molded. As shown in the drawing, in the object to be molded 10, the chip 12 is fixed to one surface of the substrate 11 via a bump 13. There is a plurality of bumps 13, and there is a gap between each bump 13, that is, between the substrate 11 and the chip 12. Because the gap is narrow, the resin is less likely to be filled as compared with a wide gap. In this case, if a gap between an upper surface of the chip 12 (a surface opposite to the substrate 11) and the one mold cavity block is wide, the gap is preferentially filled with resin, and the gap between the substrate 11 and the chip 12 may not be filled with resin. Thus, as in the embodiment, first, the depth (the package thickness) of the one mold cavity is made smaller to fill resin, and then the depth of the one mold cavity is increased. In this way, the resin is also easily filled in the narrow gap between the substrate 11 and the chip 12. That is, the object to be molded 10 (the substrate 11 and the chip 12) in FIGS. 6 to 38 may be changed to the object to be molded 10 (the substrate 11, the chip 12, and bump 13) in FIG. 55 to perform resin molding. However, in the present invention, the structure of the object to be molded is not limited thereto and is arbitrary.

Embodiment 3

Next, further another embodiment of the present invention is described.

In the embodiment, an example in which the object to be molded is pressed by the one mold cavity block via the mold releasing film in the method for manufacturing a resin molded product is described. The method for manufacturing a resin molded product can be performed using the resin molding apparatus in FIG. 1.

The method for manufacturing a resin molded product in the embodiment is described with reference to FIGS. 38 to 53 and FIGS. 12 to 31.

Figure 38:
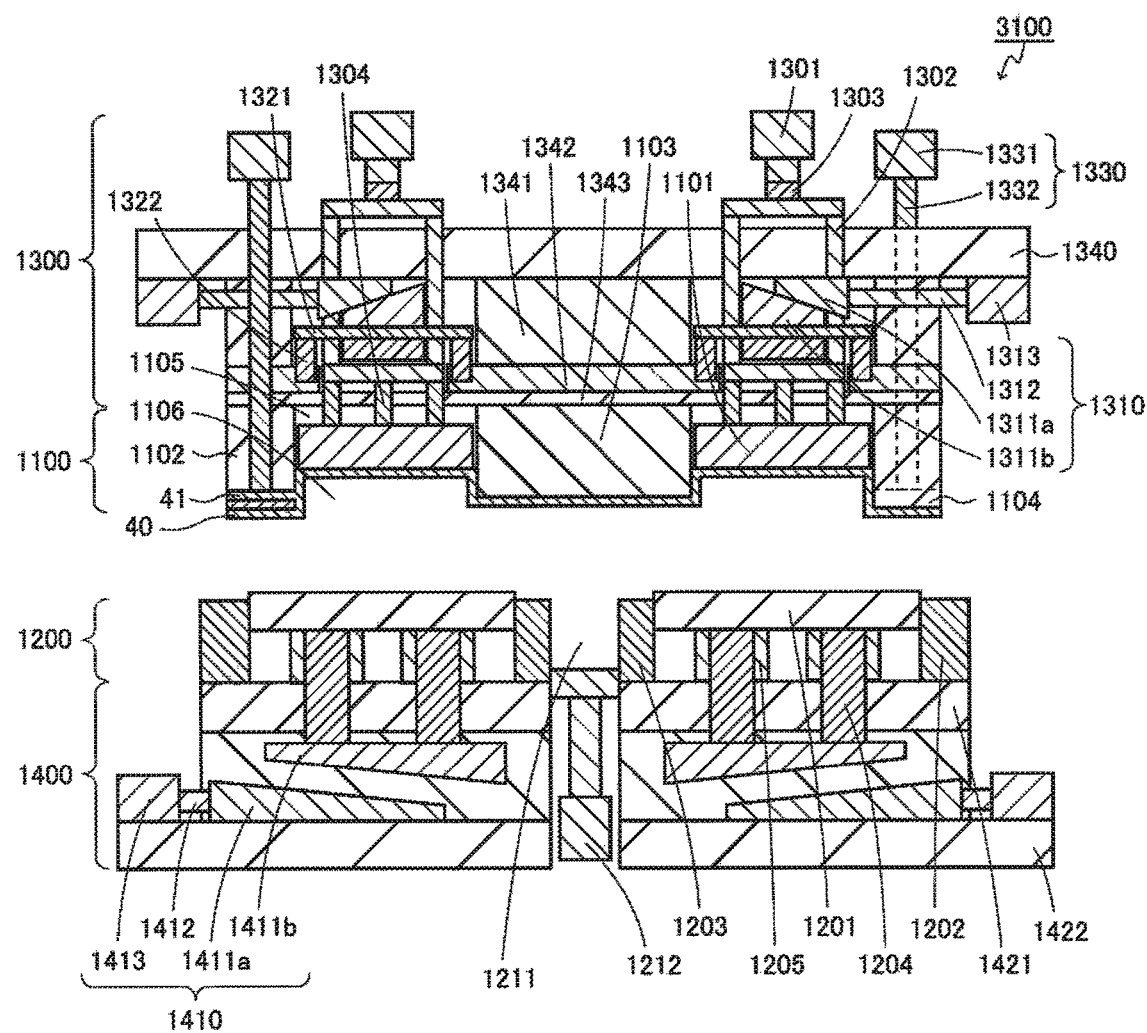
FIG. 38 is a cross-sectional view schematically showing one process in further another example of the method for manufacturing a resin molded product using the resin molding apparatus in FIG. 1.

First, as shown in FIG. 38, the mold releasing film 40 is supplied to the mold surface (the upper mold surface) of the upper mold 1100. Then, the upper mold surface is covered with the mold releasing film 40 by adsorption or the like (one mold surface covering process). The adsorption may be performed using, for example, a mold releasing film adsorption mechanism (not shown in FIG. 38) as in Embodiments 1 and 2. More specifically, the adsorption of the mold releasing film 40 can be performed, for example, as shown in FIG. 54 as in Embodiments 1 and 2. In addition, as shown in the drawing, "the mold surface (the upper mold surface) of the upper mold 1100" on which the mold releasing film 40 is absorbed includes the mold surface of the upper mold cavity 1106 and the lower surface of the upper mold cavity frame member 1102. Furthermore, at this time, as shown in the drawing, the mold releasing film 41 is also supplied to the inside of the air vent groove 1104. In the state of FIG. 38, because the air vent groove 1104 is not blocked, the mold releasing film 40 can be adsorbed via the air vent groove 1104.

In addition, the mold releasing films 40 and 41 may be conveyed to the position of the molding mold by, for example, a mold releasing film conveying mechanism (not shown) or the like, and then supplied to the mold surface (the upper mold surface) of the upper mold 1100 as described above.

Figure 39:
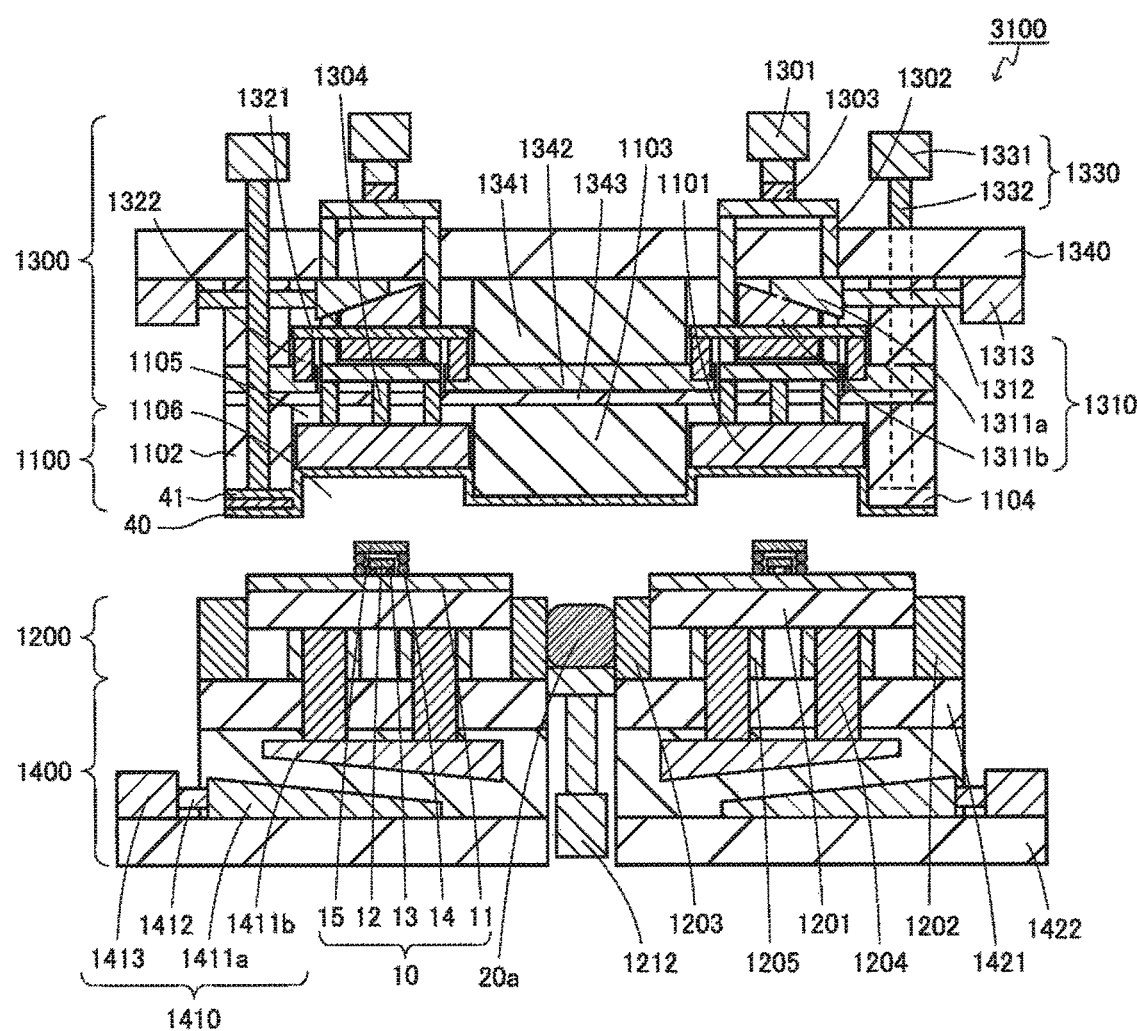
FIG. 39 is a cross-sectional view schematically showing another process of the same method for manufacturing a resin molded product as in FIG. 38.

Next, as shown in FIG. 39, the tablet (the resin material) 20a is supplied into the pot 1211, and as shown in the drawing, the object to be molded 10 is supplied to the upper surface of the lower mold cavity block 1201 (the supply process for the object to be molded). The resin material 20a may be, for example, a thermosetting resin, but is not limited thereto, and may be, for example, a thermoplastic resin. At this time, the upper mold 1100 and the lower mold 1200, or only the lower mold 1200 may be heated in advance by a heater (not shown) to raise the temperature. In addition, for example, each of the resin material 20a and the object to be molded 10 may be conveyed to the position of the molding mold by a conveying mechanism (not shown) and supplied to the molding mold.

In the embodiment, as shown in the drawing, the object to be molded 10 includes a first substrate 11, a chip 12, a first connection portion (a first connection terminal) 13, a second connection portion (a second connection terminal) 14, and a second substrate 15. The first substrate 11 and the second substrate 15 are arranged in a manner that one surface of each of the first substrate 11 and the second substrate 15 faces each other. The surfaces of the first substrate 11 and the second substrate 15 facing each other are connected by the connection terminal 14. The chip 12 is connected to the surface of the first substrate 11 facing the second substrate 15 by the first connection terminal 13. Then, by filling a space between the first substrate 11 and the second substrate 15 with resin, the chip 12, the first connection terminal 13, and the second connection terminal 14 can be resin-sealed, and the object to be molded 10 can be resin-molded to manufacture a resin molded product. Moreover, in the same drawing, one object to be molded 10 includes one first substrate 11 and one second substrate 15, but the present invention is not limited thereto. For example, one object to be molded 10 may include a plurality of second substrates 15, and the plurality of second substrates 15 may be mounted on the first substrate 11. In addition, in the embodiment, the configuration of the object to be molded 10 is not limited thereto and is arbitrary. For example, the object to be molded 10 may have a configuration including the substrate 11 and the chip 12 as the configurations shown in process diagrams of Embodiments 1 and 2, or may have a configuration including the substrate 11, the chip 12, and the bump 13 as shown in FIG. 41.

Figure 40:
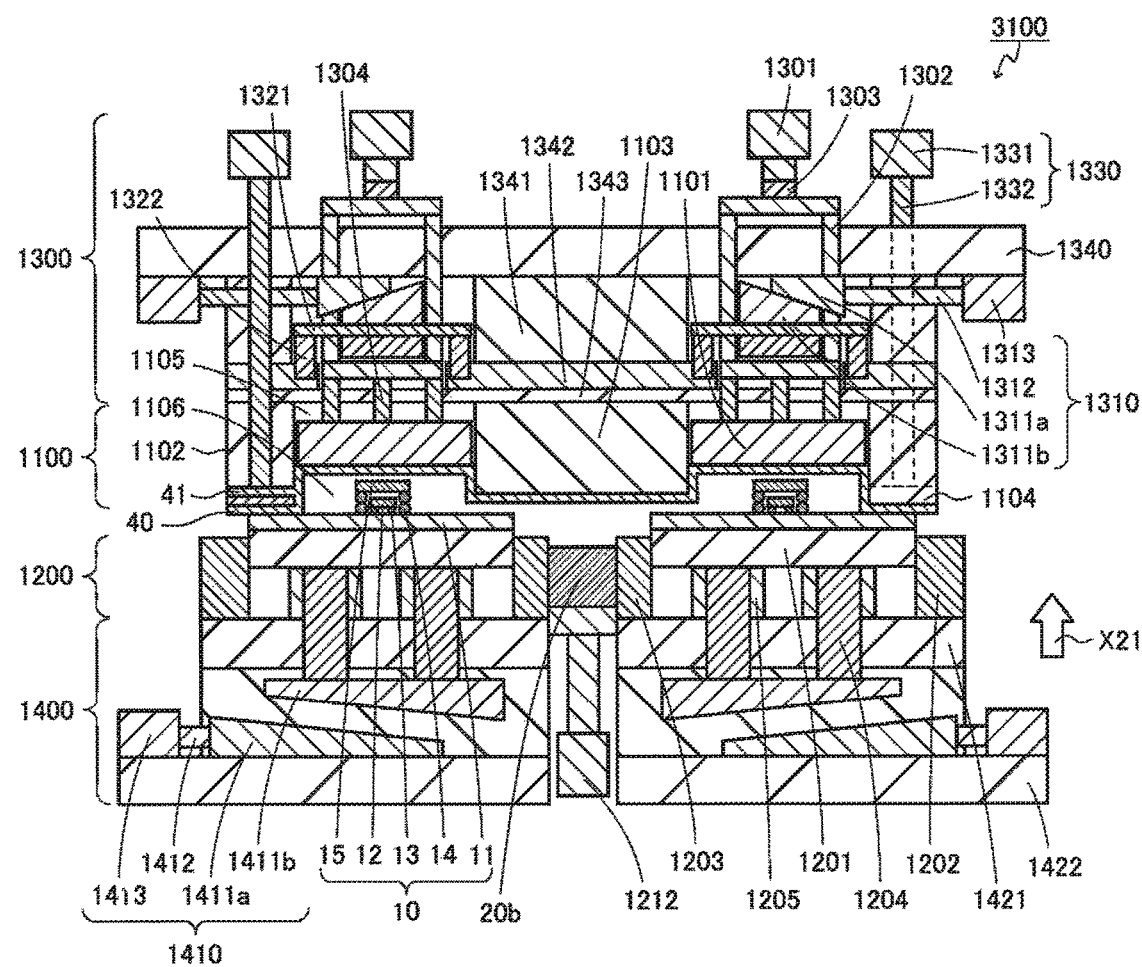
FIG. 40 is a cross-sectional view schematically showing further another process of the same method for manufacturing a resin molded product as in FIG. 38.

Next, as shown in FIG. 40, the lower mold 1200 is raised in a direction of an arrow X21 by a drive source (not shown), and the first substrate 11 is sandwiched between the lower mold cavity block 1201 and the upper mold cavity frame member 1102. At this time, as shown in the drawing, the resin material 20a is melted and changed to the molten resin (fluid resin) 20b due to the heat of the lower mold 1200 which has been heated in advance. Moreover, at this time, the left and right depths of the upper mold cavity 1106 may be set to the same depth, or may be set to different depths. Thereby, even if the height of the object to be molded 10 is different on the left and right sides, resin molding can be performed at the same time.

Figure 41:
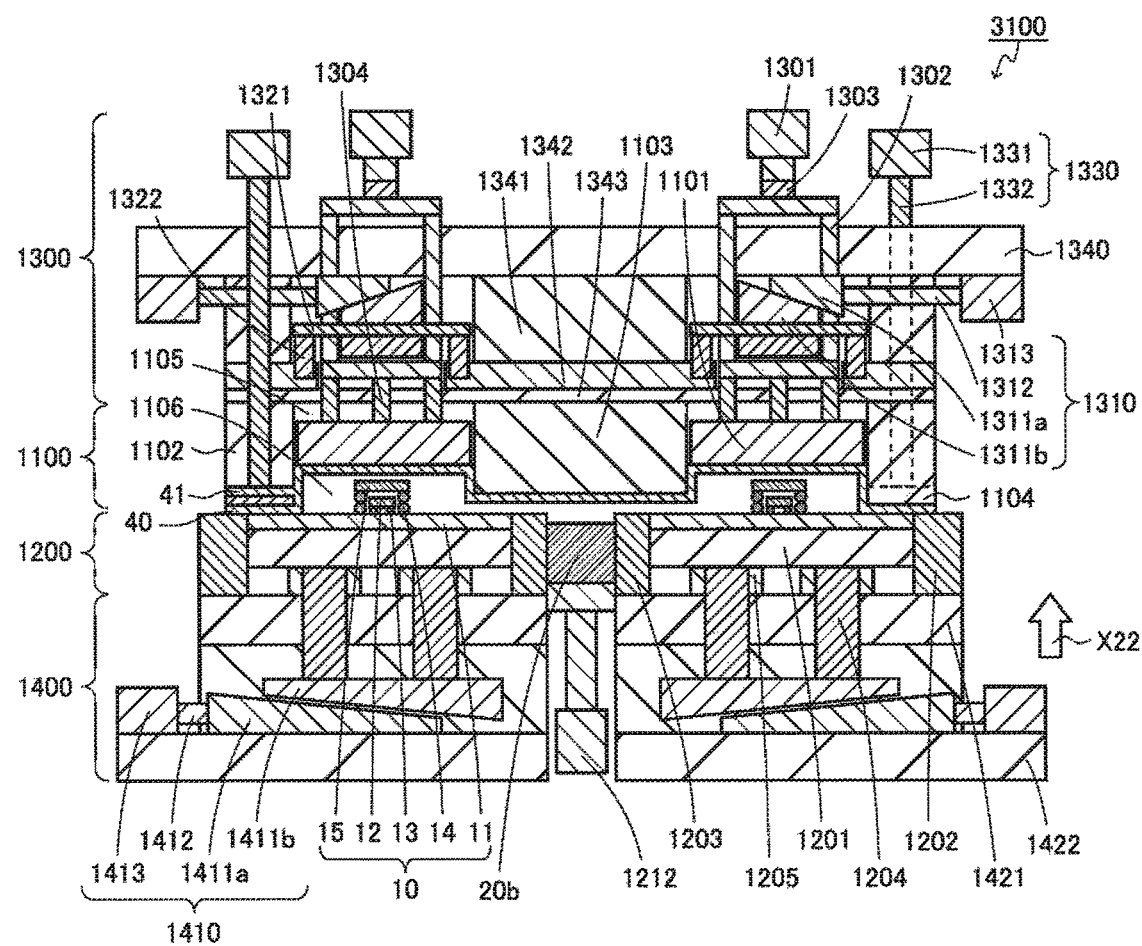
FIG. 41 is a cross-sectional view schematically showing further another process of the same method for manufacturing a resin molded product as in FIG. 38.

Next, as shown in FIG. 41, the lower mold 1200 is further raised in a direction of an arrow X22. Thereby, an upward pressure caused by the lower mold cavity block 1201 is applied to the first substrate 11 sandwiched between the lower mold cavity block 1201 and the upper mold cavity frame member 1102. In this way, the first substrate 11 is sandwiched, pressed, and clamped between the lower mold cavity block 1201 and the upper mold cavity frame member 1102 (the clamping process for the object to be molded).

Figure 42:
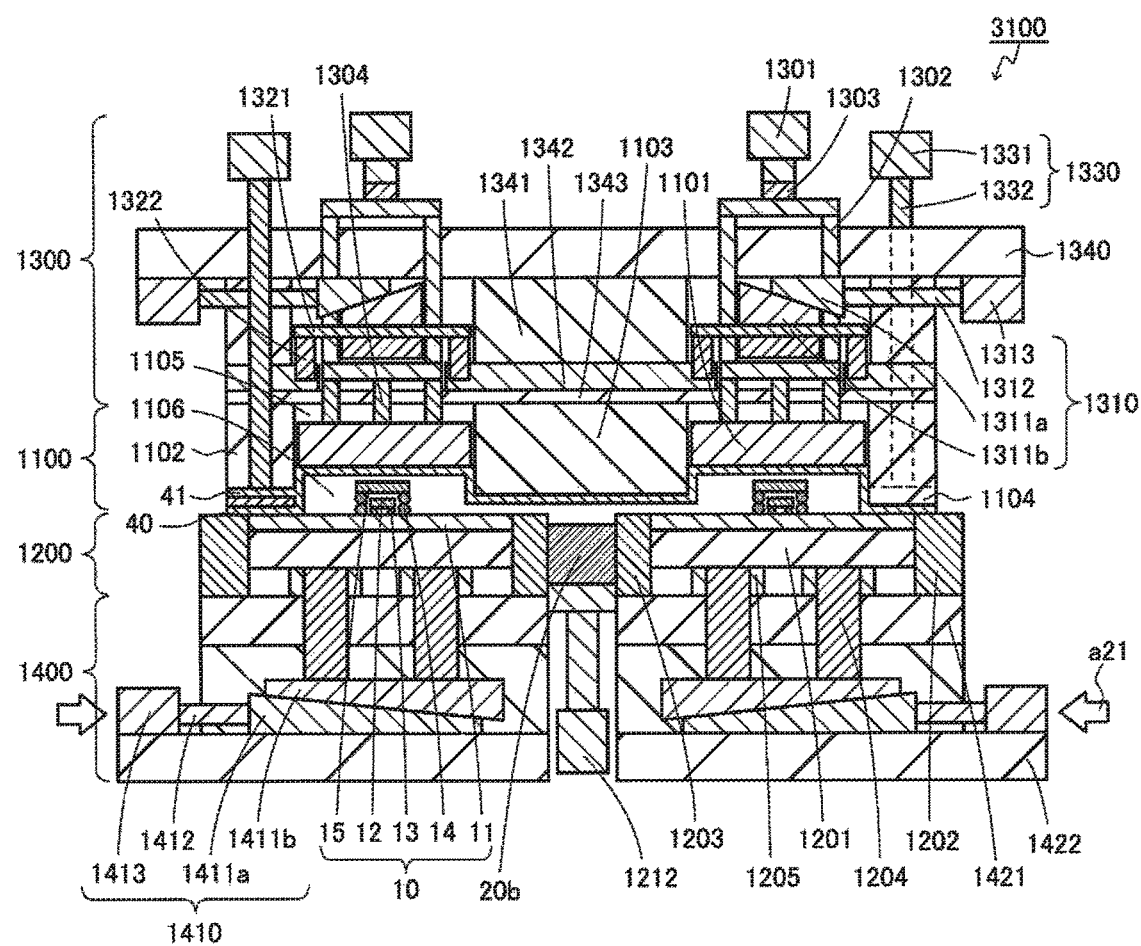
FIG. 42 is a cross-sectional view schematically showing further another process of the same method for manufacturing a resin molded product as in FIG. 38.

Next, as shown in FIG. 42, the lower mold first wedge member 1411a is moved in the front end direction thereof (a direction of an arrow a21) and brought into contact with the lower mold second wedge member 1411b. By fixing the lower mold first wedge member 1411a and the lower mold second wedge member 1411b at this position, the position of the lower mold cavity block 1201 in the mold opening/closing direction is fixed at this position.

Figure 43:
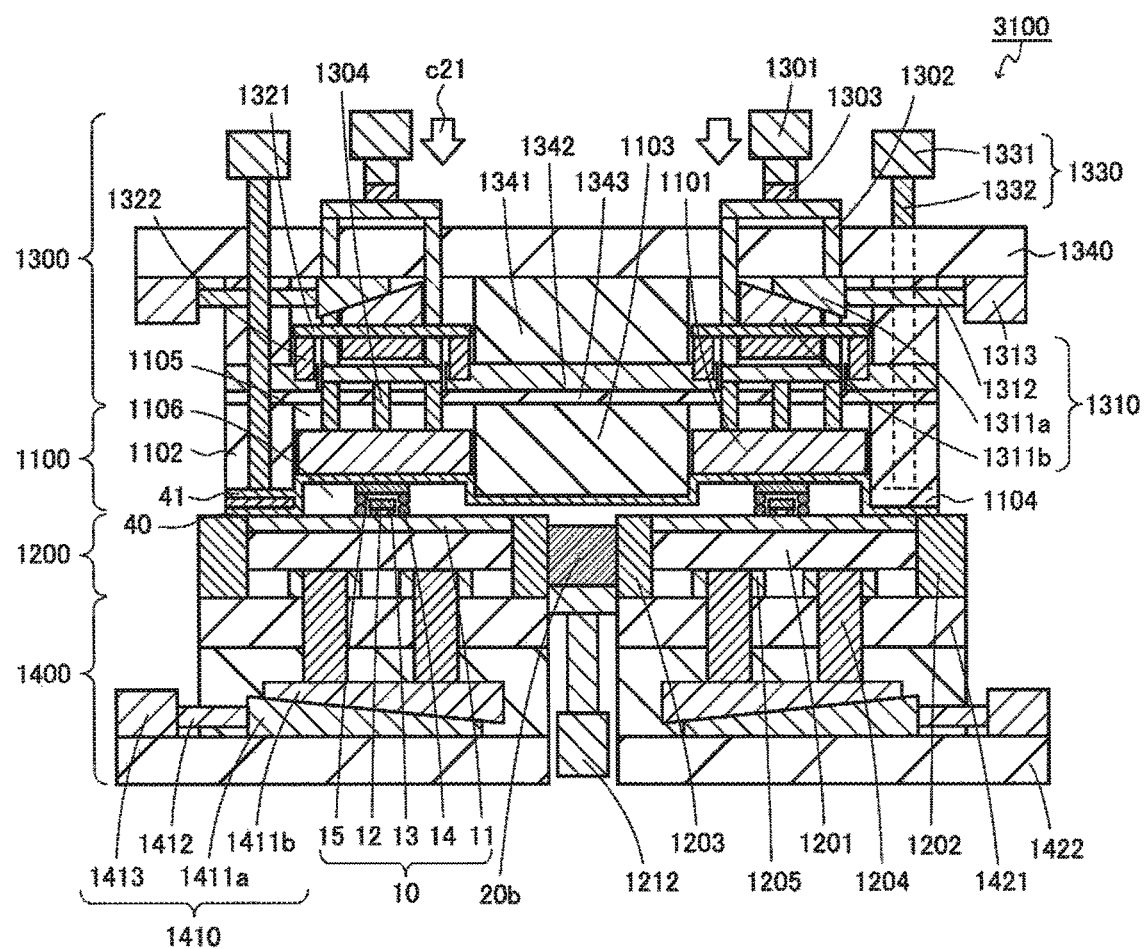
FIG. 43 is a cross-sectional view schematically showing further another process of the same method for manufacturing a resin molded product as in FIG. 38.

Next, as shown in FIG. 43, the upper mold cavity block 1101 is lowered in a direction of an arrow c21 by the upper mold cavity block driving mechanism 1301. Thereby, the upper mold cavity block 1101 and the second substrate 15 are brought into contact with each other via the mold releasing film 40, and the height position of the upper mold cavity block 1101 is set. At this time, a pressing force (clamping force) of the second substrate 15 caused by the upper mold cavity block 1101 is measured by the load cell 1303. Thereby, the pressing force of the second substrate 15 can be controlled. In this way, the object to be molded 10 can be prevented from being damaged due to an overly strong pressing force.

Figure 44:
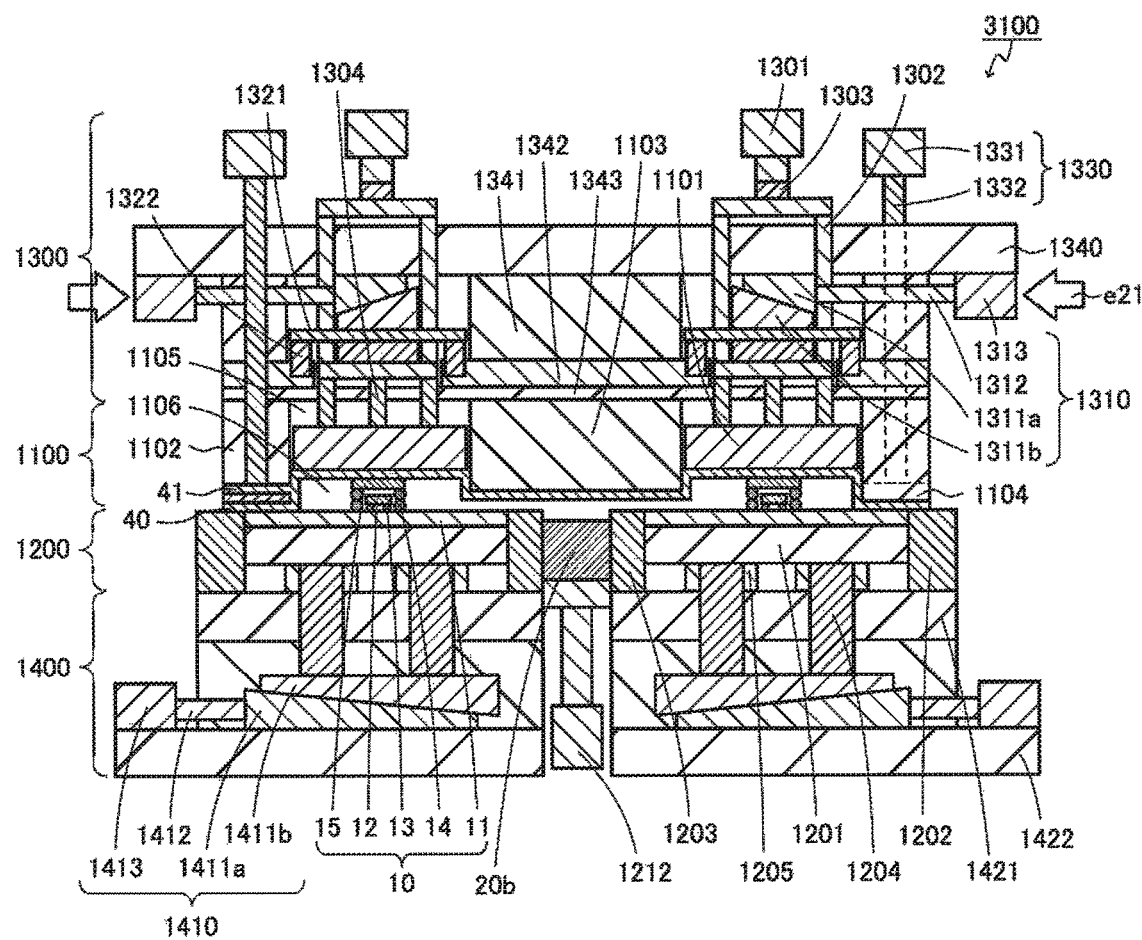
FIG. 44 is a cross-sectional view schematically showing further another process of the same method for manufacturing a resin molded product as in FIG. 38.

Next, as shown in FIG. 44, the upper mold first wedge member 1311a is moved in the front end direction thereof (a direction of an arrow e21). Thereby, the length of the upper mold cotter (the upper mold first wedge member 1311a and the upper mold second wedge member 1311b) in the thickness direction is increased, and as shown in the drawing, the upper mold second wedge member holding member 1321 is pushed down and brought into contact with the upper mold cavity block holding member 1302. By fixing the upper mold first wedge member 1311a, the upper mold second wedge member 1311b, and the upper mold cavity block holding member 1302 at this position, the position of the upper mold cavity block 1101 in the mold opening/closing direction is fixed at this position (the fixing process of the one mold cavity block). In other words, the upper mold cotter (the upper mold first wedge member 1311a and the upper mold second wedge member 1311b) is used to fix the upper mold cavity block 1101 having been moved to the height position so as to limit the position in a direction away from the lower mold.

Figure 45:
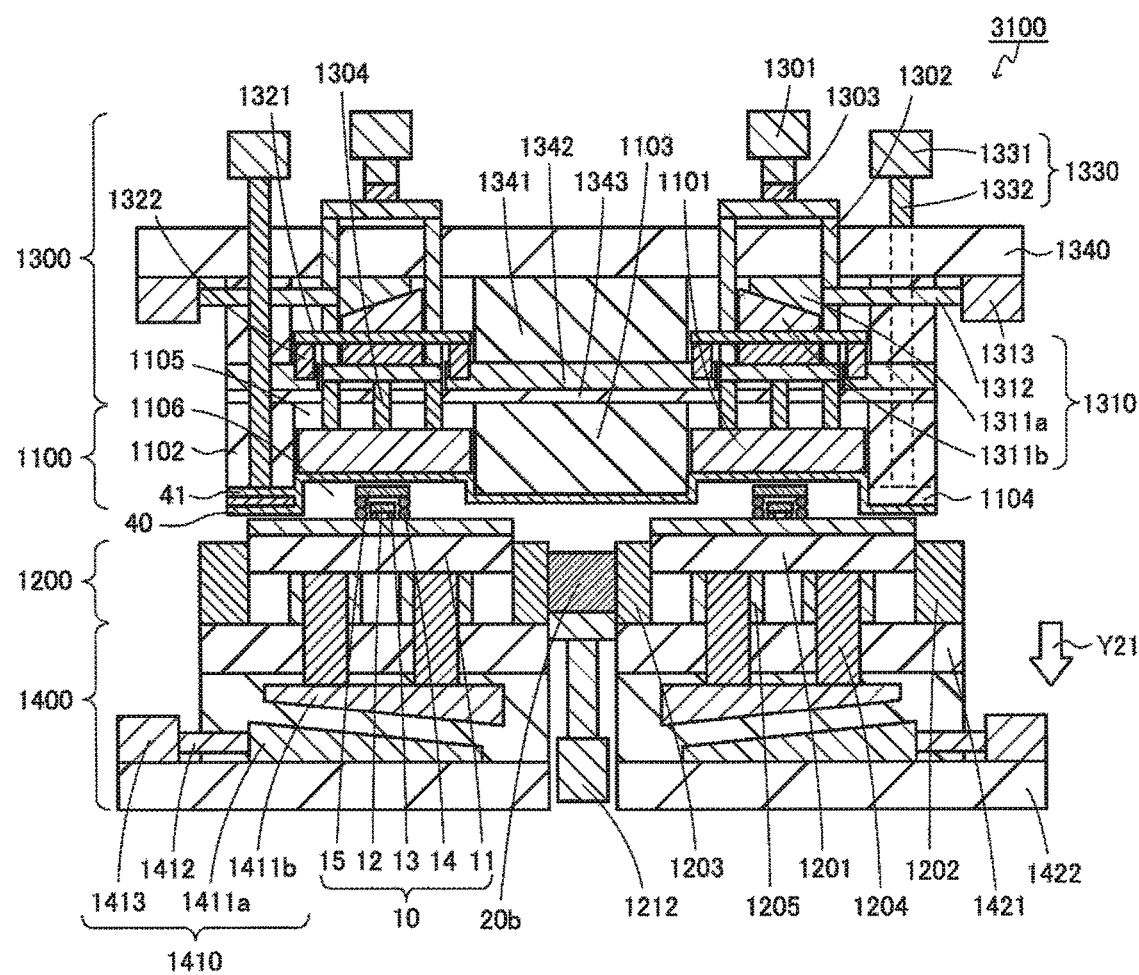
FIG. 45 is a cross-sectional view schematically showing further another process of the same method for manufacturing a resin molded product as in FIG. 38.

Next, as shown in FIG. 45, the lower mold 1200 is lowered in a direction of an arrow Y21 to slightly open the mold. The "slightly opening the mold" described above means that the mold is opened in order that the second substrate 15 and the mold releasing film 40 are not in contact with each other. Specifically, although not particularly limited, a distance between the second substrate 15 and the mold releasing film 40 may be set to a slight distance, for example, about 0.1 mm.

Figure 46:
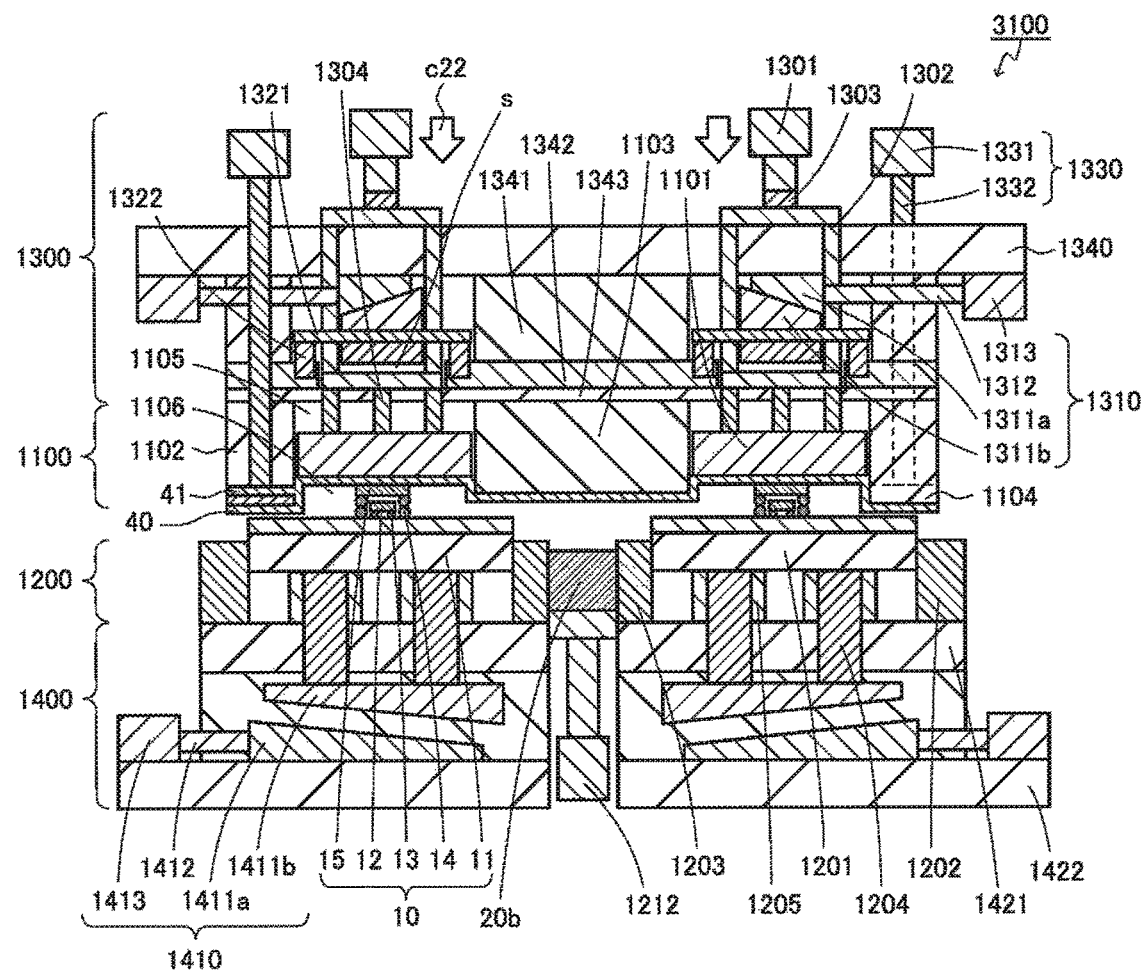
FIG. 46 is a cross-sectional view schematically showing further another process of the same method for manufacturing a resin molded product as in FIG. 38.

Next, as shown in FIG. 46, the upper mold cavity block 1101 is lowered again by the upper mold cavity block driving mechanism 1301 in a direction of an arrow c22. Thereby, as shown in the drawing, the upper mold cavity block 1101 and the second substrate 15 are brought into contact with each other again via the mold releasing film 40. In this way, by lowering the upper mold cavity block 1101 again in the direction of the arrow c22, a space s for lowering the upper mold second wedge member 1311b can be formed between the upper mold cavity block holding member 1302 and the upper mold second wedge member holding member 1321.

Figure 47:
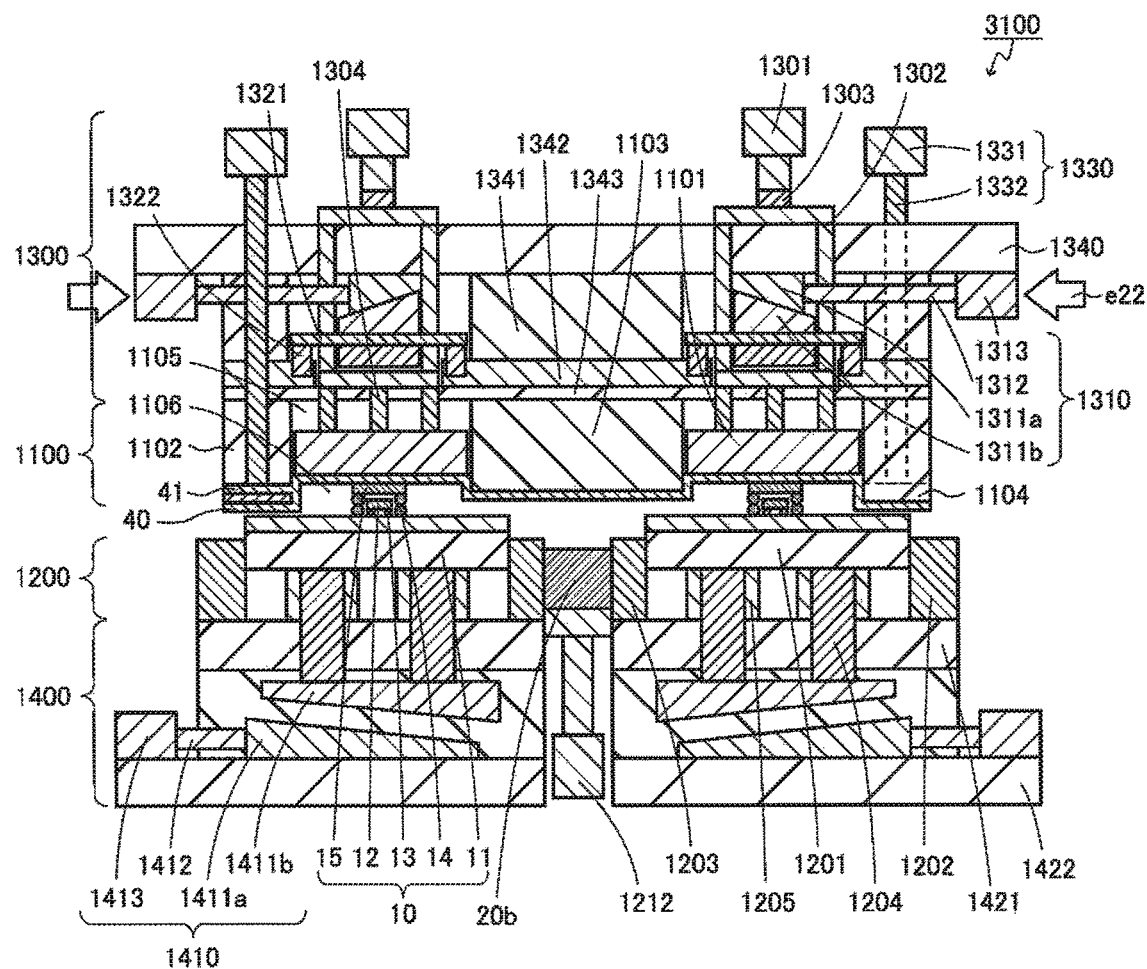
FIG. 47 is a cross-sectional view schematically showing further another process of the same method for manufacturing a resin molded product as in FIG. 38.

Next, as shown in FIG. 47, the upper mold first wedge member 1311a is slightly moved in the front end direction thereof (a direction of an arrow e22). In this way, as shown in FIG. 47, the upper mold second wedge member 1311b is slightly lowered from the state of FIG. 46 in consideration of clamping allowance of the second substrate 15 (allowance of a dimension of contracting in the mold clamping direction). By considering the clamping allowance of the second substrate 15 in this way, the resin can be suppressed or prevented from entering the space between the second substrate 15 and the mold releasing film 40.

Figure 48:
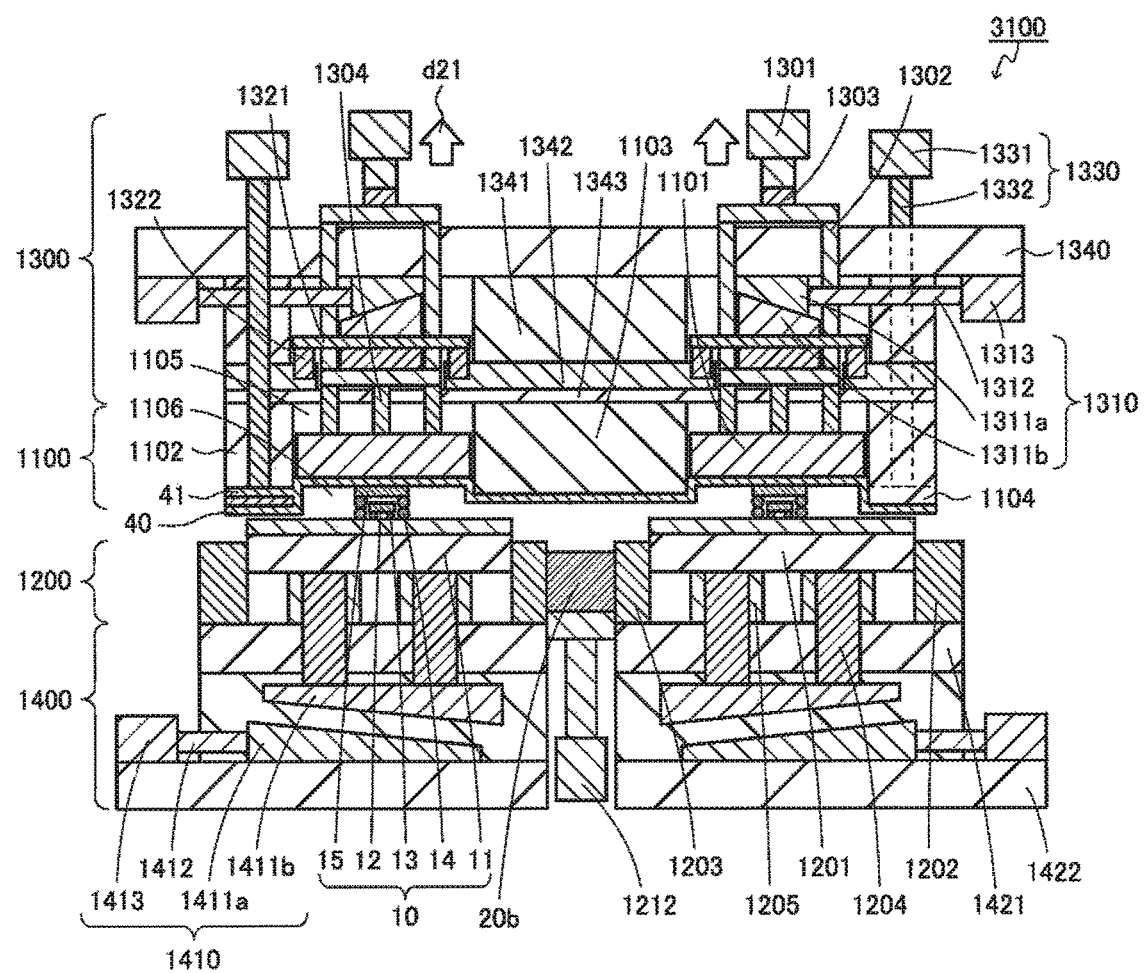
FIG. 48 is a cross-sectional view schematically showing further another process of the same method for manufacturing a resin molded product as in FIG. 38.

Next, as shown in FIG. 48, the upper mold cavity block 1101 is raised in a direction of an arrow d21 using the upper mold cavity block driving mechanism 1301. Thereby, as shown in the drawing, the upper mold cavity block holding member 1302 and the upper mold second wedge member holding member 1321 are brought into contact with each other.

Moreover, the "one mold cavity block position change process" in the method for manufacturing a resin molded product of the present invention can be performed, for example, as described with reference to FIGS. 44 to 48, but the method is not limited thereto and is arbitrary. For example, in FIGS. 44 to 48, both the upper mold wedge mechanism (the one mold wedge mechanism) 1310 and the upper mold cavity block driving mechanism (the one mold cavity block driving mechanism) 1301 are used to perform the "one mold cavity block position change process". However, the "one mold cavity block position change process" may be performed using, for example, only one of both of the above mechanisms or neither of the above mechanisms. In addition, a specific method and procedure for performing the "one mold cavity block position change process" is not limited to the method and procedure shown in FIGS. 44 to 48 and is arbitrary.

Figure 49:
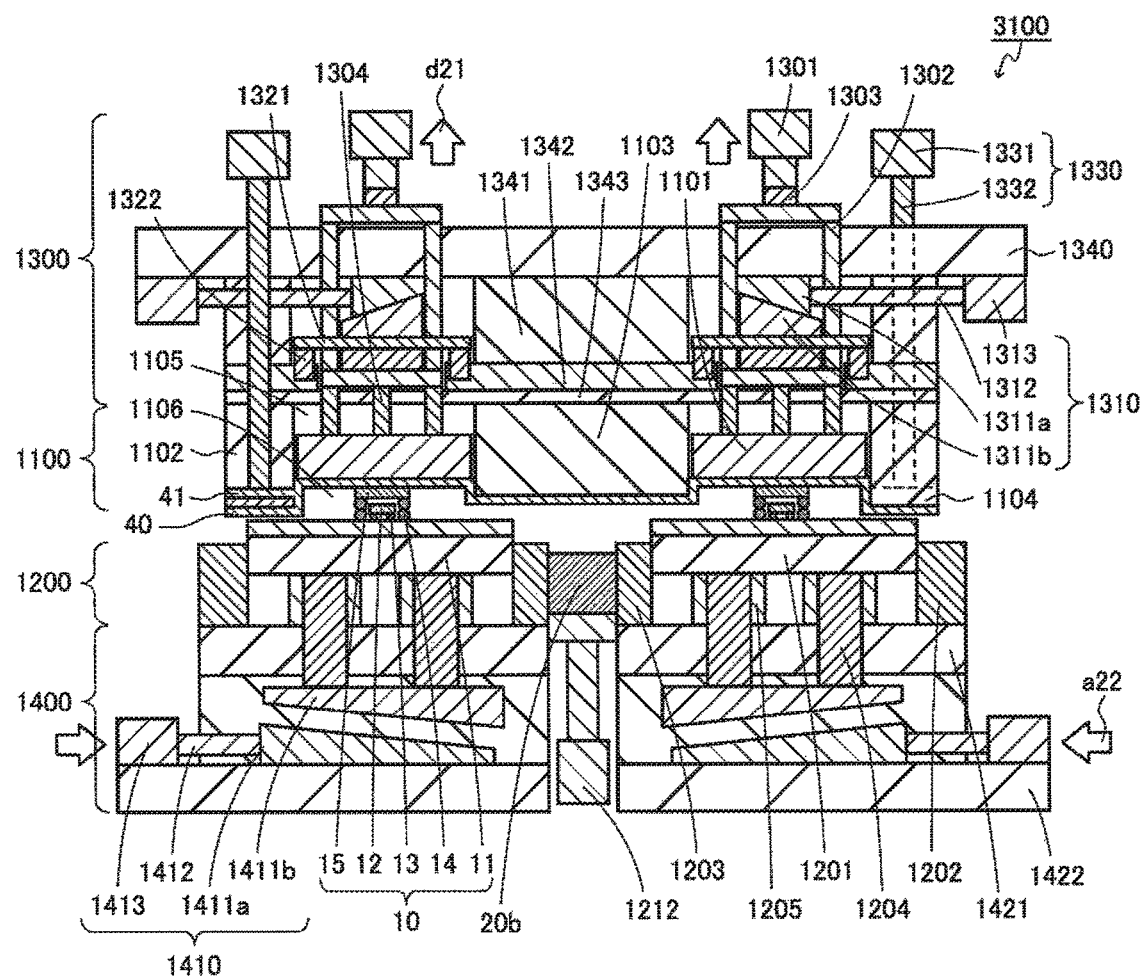
FIG. 49 is a cross-sectional view schematically showing further another process of the same method for manufacturing a resin molded product as in FIG. 38.

Next, as shown in FIG. 49, the lower mold first wedge member 1411a is slightly moved in the front end direction (a direction of an arrow a22). Thereby, the length of the pair of lower mold cotters including the lower mold first wedge member 1411a and the lower mold second wedge member 1411b in the thickness direction is slightly increased in consideration of clamping allowance of the first substrate 11. At this time, as shown in the drawing, an upward force is continuously applied to the upper mold cavity block holding member 1302 in the direction of the arrow d21 by the upper mold cavity block driving mechanism 1301.

Figure 50:
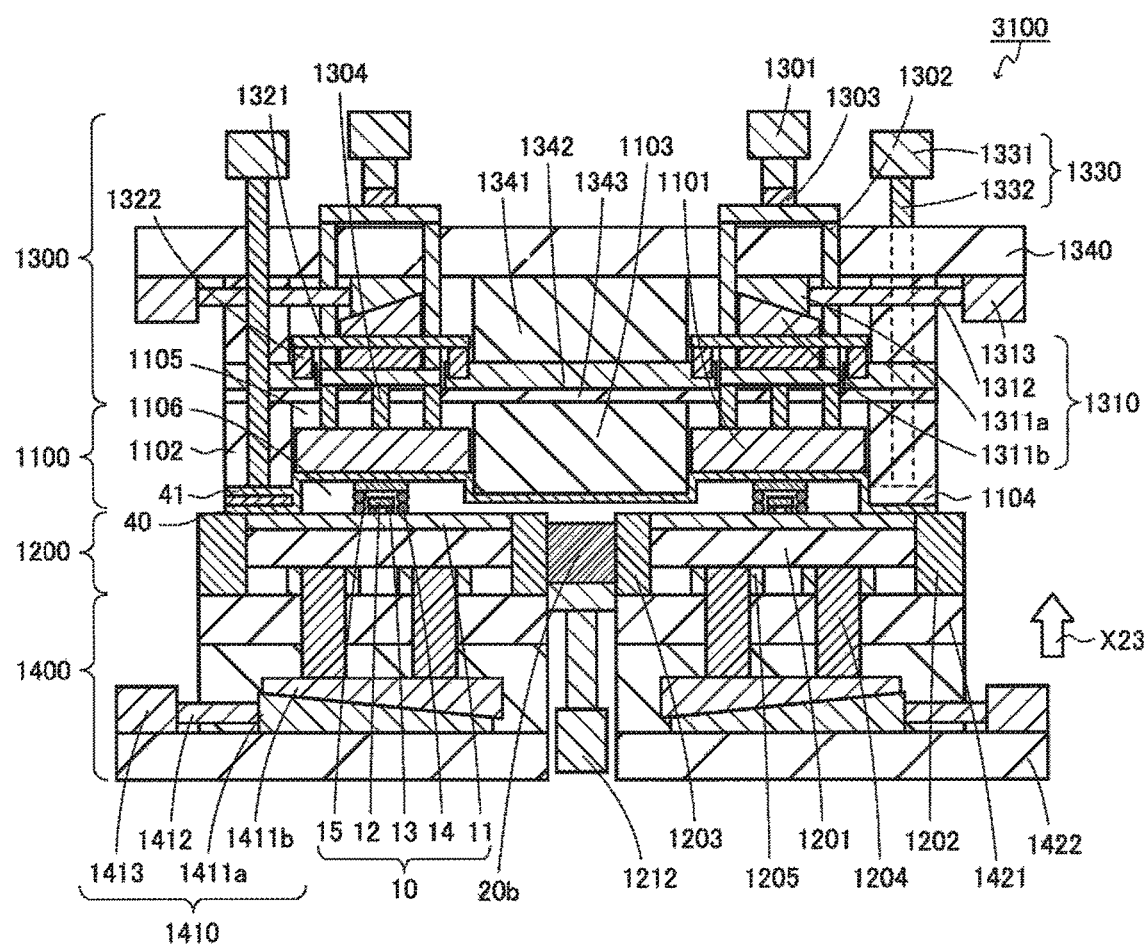
FIG. 50 is a cross-sectional view schematically showing further another process of the same method for manufacturing a resin molded product as in FIG. 38.
Figure 51:
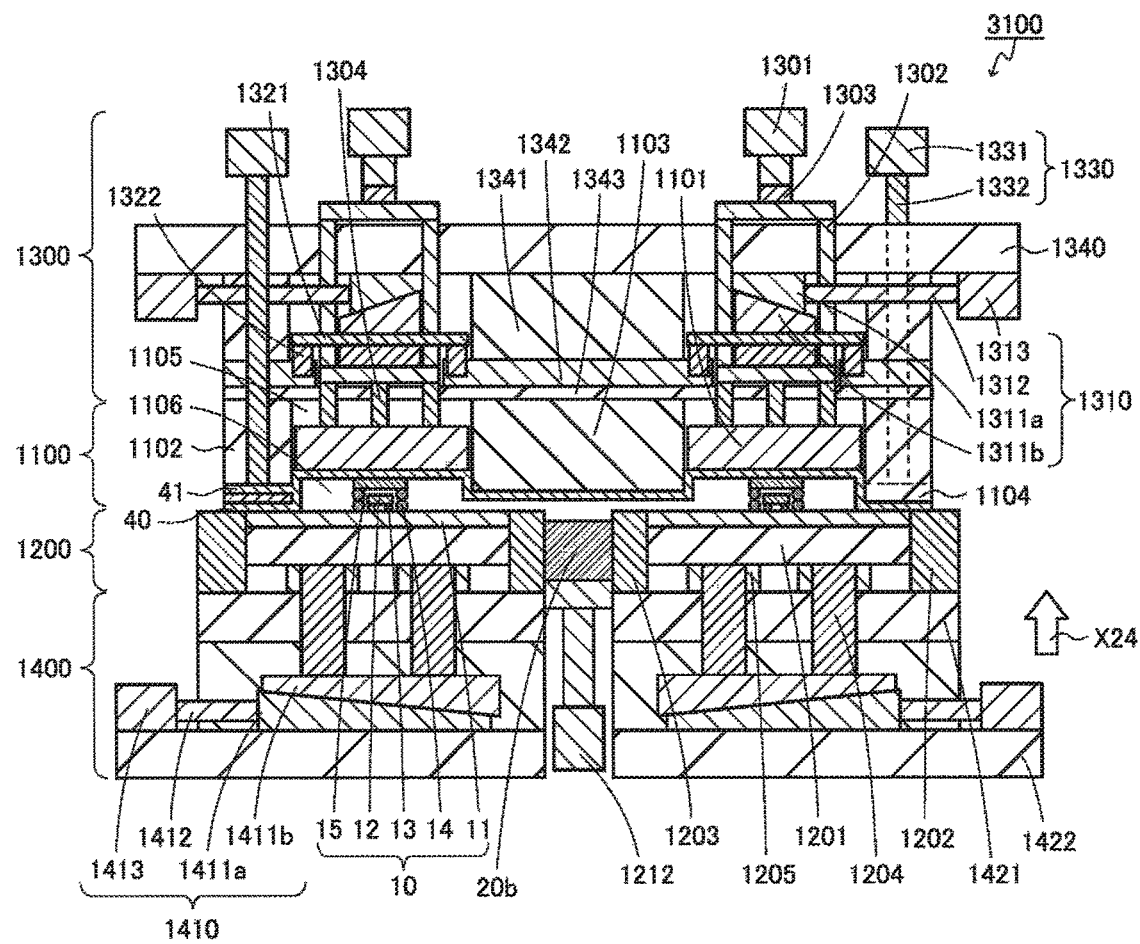
FIG. 51 is a cross-sectional view schematically showing further another process of the same method for manufacturing a resin molded product as in FIG. 38.

Next, as shown in FIG. 50, the lower mold 1200 is raised in a direction of an arrow X23, and the molding mold is clamped again. Thereby, the resin-molded substrate (the object to be molded) 10 is pressed by the upper mold cavity block 1101 via the mold releasing film 40 (the pressing process for the object to be molded). Furthermore, a depressurization mechanism (not shown) is used to depressurize the inside of the molding mold (the inside of the upper mold cavity 1106, and the like). At this time, as shown in FIG. 51, an upward force is continuously applied to the lower mold 1200 in a direction of an arrow X24.

Figure 52:
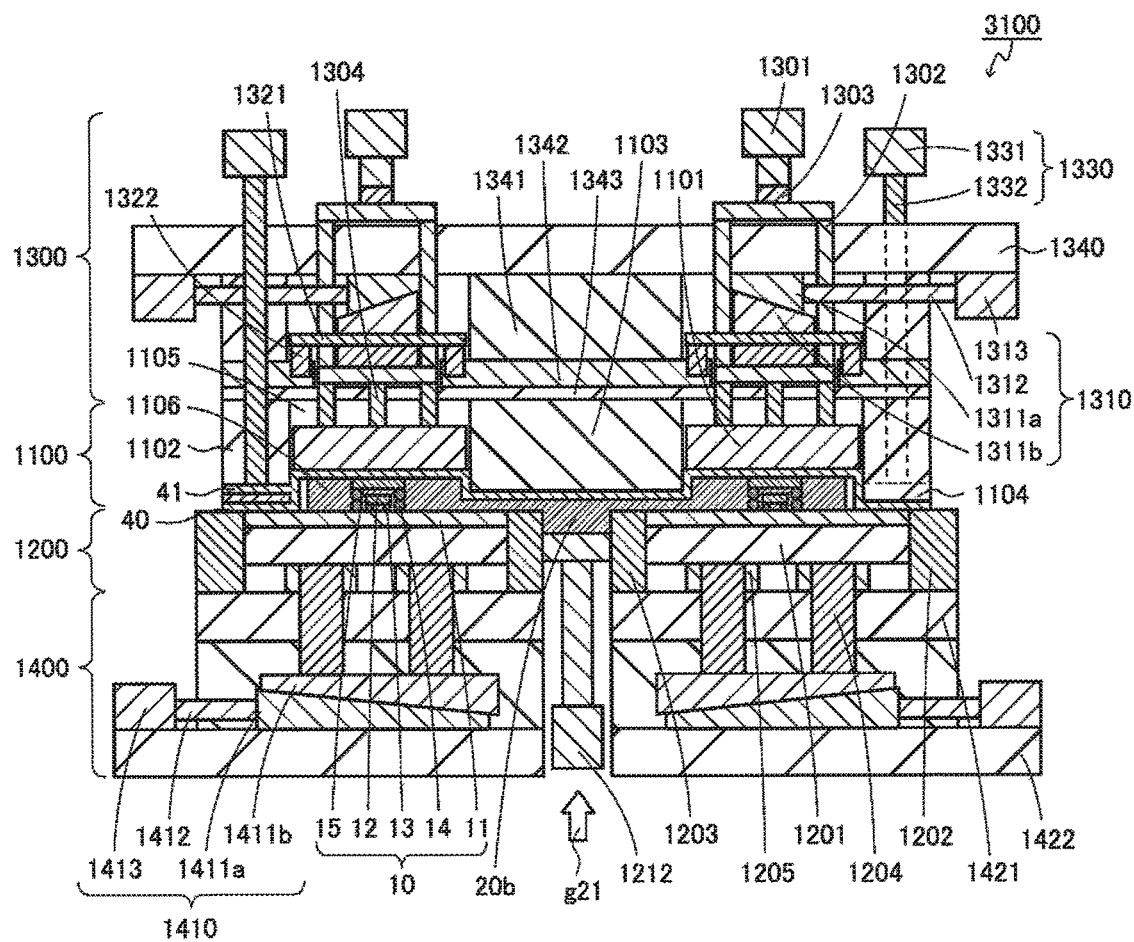
FIG. 52 is a cross-sectional view schematically showing further another process of the same method for manufacturing a resin molded product as in FIG. 38.

Next, as shown in FIG. 52, the plunger 1212 is moved upward (in a direction of an arrow g21) to push the fluid resin 20b in the pot 1211 into the upper mold cavity 1106.

Figure 53:
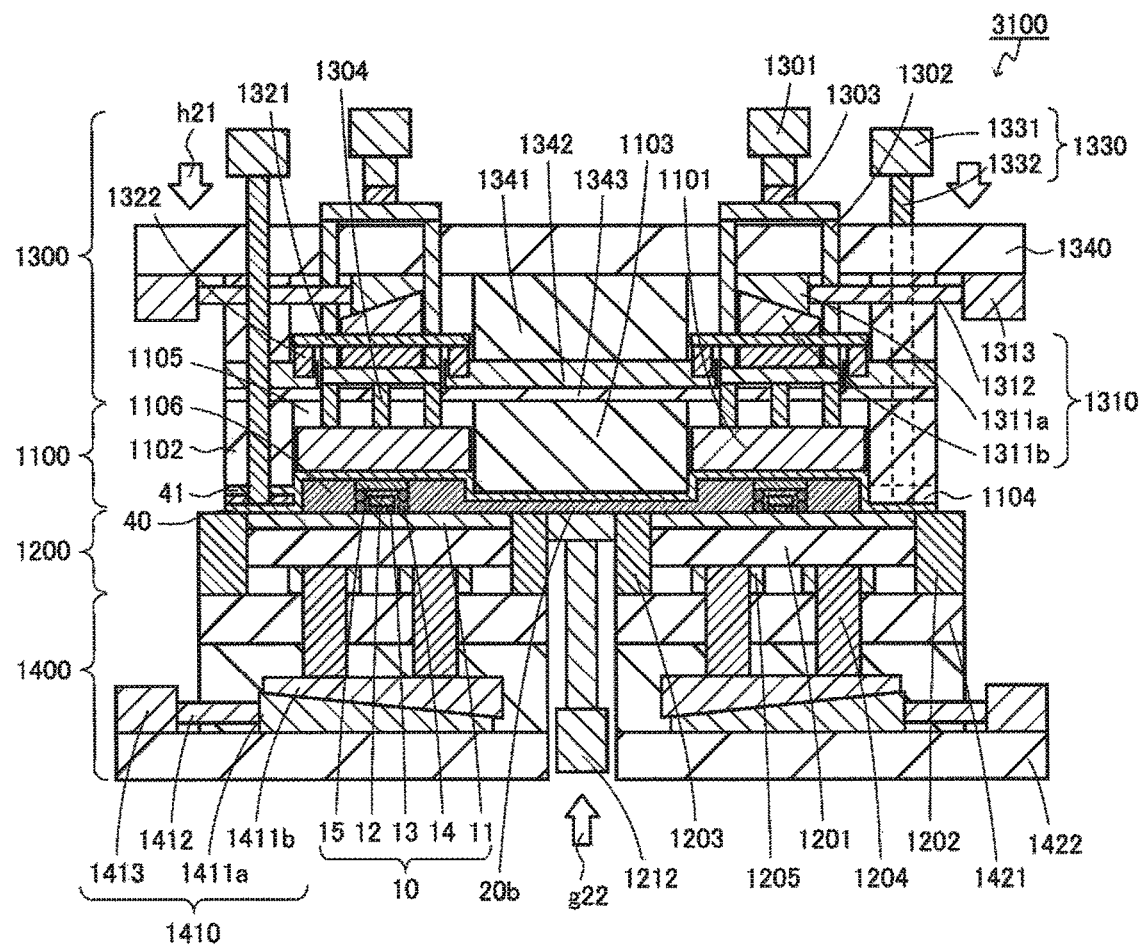
FIG. 53 is a cross-sectional view schematically showing further another process of the same method for manufacturing a resin molded product as in FIG. 38.

Furthermore, as shown in FIG. 53, the air vent pin 1332 is pushed downward (in a direction of an arrow h21) by the air vent pin power mechanism 1331 to block the air vent groove 1104. Thereafter, as shown in the same drawing, the plunger 1212 is further raised in a direction of an arrow g22 to finally fill the upper mold cavity 1106 with the fluid resin 20b. At this time, the upper mold cavity block 1101 is fixed using the upper mold wedge mechanism 1310. Furthermore, the lower mold cavity block 1201 is fixed using the lower mold wedge mechanism 1410. By fixing the upper mold cavity block 1101 and the lower mold cavity block 1201 in this way, even if a resin pressure is applied to the inside of the upper mold cavity 1106, the upper mold cavity block 1101 and the lower mold cavity block 1201 can be suppressed or prevented from moving in the mold opening/closing direction.

Furthermore, similarly to Embodiment 1, the molten resin 20b is cured to obtain the cured resin (the sealing resin) and the surplus resin (the unnecessary resin portion). The resin molding process can be performed as described above. Then, thereafter, the mold is opened to perform mold-releasing (the mold releasing process) in the same manner as in FIGS. 21 to 31, and the manufactured resin molded product is carried out of the press portion of the resin molding apparatus 1000 by an unloader or the like and collected (not shown). As described above, a resin molded product in which the object to be molded 10 is sealed with the cured resin 20 can be manufactured.

In the above, examples of the resin molding apparatus and the method for manufacturing a resin molded product of the present invention have been described with reference to Embodiments 1 to 3. However, the present invention is not limited thereto, and any modification is possible. Specifically, for example, the present invention may be as follows.

In the resin molding apparatus of the present invention, for example, only the molding mold can be replaced with another molding mold. Thereby, it is possible to easily handle resin molding using molding molds having different specifications. Specifically, for example, the shape of the one mold (the upper mold in FIGS. 1 to 54) cavity block may be changed according to a required cavity shape. In addition, for example, the shape of the other mold (the lower mold in FIGS. 1 to 54) cavity block may be changed according to the shape of the used substrate. In addition, for example, the shape of the pot block may be changed according to the number, shape, and the like of the used resin tablet (the resin material). In addition, for example, the air vent opening/closing mechanism may be moved according to the shape of the molding mold.

In the resin molding apparatus of the present invention, for example, as shown in FIGS. 1 to 54, the wedge mechanism (the cotter mechanism) is not incorporated as a part of the molding mold, and the molding mold and the wedge mechanism (the cotter mechanism) are configured separately. Thereby, for example, even if the wedge mechanism (the cotter mechanism) is not replaced or another wedge member (a cotter) is not prepared, the molding mold can be easily replaced. Therefore, according to the resin molding apparatus of the present invention, for example, it is easy to replace the molding mold for replacing the type of the resin molded product.

In addition, in the present invention, for example, as shown in Embodiments 1 to 3, the depth of the one mold cavity can be changed. Thereby, for example, even if the thickness of the object to be molded is different, the method for manufacturing a resin molded product can be performed. Specifically, for example, as described above, the depth of each upper mold cavity 1106 may be set to a different depth in the left and right molding molds in FIGS. 1 to 54. In addition, in the present invention, an example corresponding to the change in the thickness of the object to be molded is not limited thereto. Specifically, for example, in the method for manufacturing a resin molded product performed once, when the thicknesses of all the objects to be molded are made the same and the method for manufacturing a resin molded product is performed again, if necessary, the thickness of the object to be molded may be correspondingly changed to the thickness of the previous times. Moreover, in FIGS. 1 to 55, the case where the resin molding apparatus of the present invention has a plurality of molding molds was described as an example. The resin molding apparatus of the present invention is not limited thereto, and may have only one molding mold. However, when the resin molding apparatus of the present invention has a plurality of molding molds, it is preferable because the manufacturing efficiency of the resin molded product is good.

Furthermore, the present invention is not limited to the embodiments described above, and can be arbitrarily and appropriately combined, modified, or selected to be adopted as necessary without departing from the spirit of the present invention.

What is claimed is:

1. A method for manufacturing a resin molded product using a resin molding apparatus, wherein the resin molding apparatus comprises:
   a molding mold;
   one mold wedge mechanism; and
   one mold cavity block driving mechanism;
   wherein the molding mold comprises: one mold, and the other mold;
   the one mold comprises: one mold cavity frame member, and one mold cavity block;
   the one mold cavity block is movable in the one mold cavity frame member in a mold opening/closing direction of the molding mold;

one mold cavity is formed by a surface of the one mold cavity block facing the other mold and an inner surface of the one mold cavity frame member;

the one mold cavity block is moved in the mold opening/closing direction using the one mold cavity block driving mechanism;

a position of the one mold cavity block in the mold opening/closing direction is fixed using the one mold wedge mechanism;

wherein the method comprises:

a resin molding process in which a resin molding is performed using the molding mold; and a mold releasing process in which a molded resin is released from the molding mold after the resin molding process;

after setting a height position of the one mold cavity block by the one mold cavity block driving mechanism, and fixing a position of the one mold cavity block moved to the height position in a direction away from the other mold by the one mold wedge mechanism, the mold releasing process performs a mold releasing operation by the one mold wedge mechanism and the one mold cavity block driving mechanism.

2. The method according to claim 1, wherein
providing the resin molding apparatus so as to set the height position of the one mold cavity block in a state that clamps a part of an object to be molded by the one mold cavity frame member and the other mold.

3. The method according to claim 1, wherein
the resin molding apparatus further comprises a plunger, and has a pot capable of accommodating a resin; and
in the mold releasing operation, after separating the plunger from an unnecessary resin portion in the pot, moving the plunger to a position where the plunger supports the unnecessary resin portion in the pot.

4. The method according to claim 3, wherein
the resin molding apparatus further comprises: a mold clamping mechanism;

performing a resin molding in a state that the one mold and the other mold are clamped by the mold clamping mechanism; and after the plunger is moved to the position where the plunger supports the unnecessary resin portion in the pot, moving the other mold in a mold opening direction of the molding mold by the mold clamping mechanism, and thereby moving the one mold cavity block in a mold clamping direction of the molding mold.

5. The method according to claim 4, wherein
providing the resin molding apparatus so that, after moving the other mold in the mold opening direction of the molding mold by the mold clamping mechanism, moving the one mold cavity block in the mold clamping direction of the molding mold by the one mold cavity block driving mechanism.

6. The method according to claim 5, wherein
providing the resin molding apparatus so that, after moving the one mold cavity block in the mold clamping direction of the molding mold by the one mold cavity block driving mechanism, operating the one mold wedge mechanism to make the one mold cavity block movable in the mold opening direction of the molding mold.

7. The method according to claim 6, wherein
providing the resin molding apparatus so that, after operating the one mold wedge mechanism to make the one mold cavity block movable in the mold opening direction of the molding mold, moving the one mold cavity block in the mold opening direction of the molding mold by the one mold cavity block driving mechanism.

8. The method according to claim 6, wherein
providing the resin molding apparatus so that, after moving the one mold cavity block in the mold opening direction of the molding mold by the one mold cavity block driving mechanism, moving the other mold in the mold opening direction of the molding mold to be in a mold-opened state by the mold clamping mechanism.

* * * * *